US008320675B1

(12) United States Patent
Silver et al.

(10) Patent No.: US 8,320,675 B1
(45) Date of Patent: Nov. 27, 2012

(54) METHOD FOR FAST, ROBUST, MULTI-DIMENSIONAL PATTERN RECOGNITION

(75) Inventors: William M. Silver, Nobleboro, ME (US); E. John McGarry, La Jolla, CA (US); Sanjay Nichani, San Diego, CA (US); Adam Wagman, Stow, MA (US)

(73) Assignee: Cognex Corporation, Natick, MA (US)

( * ) Notice: Subject to any disclaimer, the term of this patent is extended or adjusted under 35 U.S.C. 154(b) by 1712 days.

(21) Appl. No.: 11/026,004

(22) Filed: Dec. 31, 2004

Related U.S. Application Data

(63) Continuation of application No. 09/114,335, filed on Jul. 13, 1998, now Pat. No. 7,016,539.

(51) Int. Cl.
*G06K 9/00* (2006.01)
(52) U.S. Cl. ........ 382/181; 382/141; 382/190; 382/197; 382/209; 382/176
(58) Field of Classification Search .................. 382/118, 382/141, 181, 190, 197, 209, 279, 266; 348/92, 348/125
See application file for complete search history.

(56) References Cited

U.S. PATENT DOCUMENTS

| | | | |
|---|---|---|---|
| 3,059,654 A | 12/1962 | Hough | |
| 3,560,930 A | 2/1971 | Howard | |
| 3,816,722 A | 6/1974 | Sakoe et al. | |
| 3,898,617 A | 8/1975 | Kashioka et al. | |
| 3,899,240 A | 8/1975 | Gabor | |
| 3,899,771 A | 8/1975 | Saraga et al. | |
| 3,936,800 A | 2/1976 | Ejiri et al. | |
| 3,986,007 A | 10/1976 | Ruoff | |
| 4,115,702 A | 9/1978 | Nopper | |
| 4,115,762 A | 9/1978 | Akiyama | |
| 4,146,924 A | 3/1979 | Birk et al. | |
| 4,183,013 A | 1/1980 | Agrawala et al. | |
| 4,200,861 A | 4/1980 | Hubach et al. | |
| 4,213,150 A | 7/1980 | Robinson et al. | |
| 4,295,198 A | 10/1981 | Copeland et al. | |
| 4,441,205 A | 4/1984 | Berkin et al. | |
| 4,441,206 A | 4/1984 | Kuniyoshi et al. | |
| 4,441,248 A | 4/1984 | Sherman et al. | |

(Continued)

FOREIGN PATENT DOCUMENTS

DE 44 06 020 C 1 6/1995

(Continued)

OTHER PUBLICATIONS

"Apex Model Object", *Cognex Corporation*, acuWin version 1.5,(1997),pp. 1-17.

(Continued)

*Primary Examiner* — Stephen R Koziol

(57) ABSTRACT

Disclosed is a method for determining the absence or presence of one or more instances of a predetermined pattern in an image, and for determining the location of each found instance within a multidimensional space. A model represents the pattern to be found, the model including a plurality of probes. Each probe represents a relative position at which a test is performed in an image at a given pose, each such test contributing evidence that the pattern exists at the pose. The method further includes a comparison of the model with a run-time image at each of a plurality of poses. A match score is computed at each pose to provide a match score surface. Then, the match score is compared with an accept threshold, and used to provide the location any instances of the pattern in the image.

42 Claims, 32 Drawing Sheets

Block diagram

U.S. PATENT DOCUMENTS

| | | |
|---|---|---|
| 4,567,610 A | 1/1986 | McConnell |
| 4,570,180 A | 2/1986 | Baier et al. |
| 4,581,762 A | 4/1986 | Lapidus et al. |
| 4,618,989 A | 10/1986 | Tsukune et al. |
| 4,637,055 A | 1/1987 | Taylor |
| 4,651,341 A | 3/1987 | Nakashima et al. |
| 4,672,676 A | 6/1987 | Linger |
| 4,685,143 A | 8/1987 | Choate |
| 4,688,088 A | 8/1987 | Hamazaki et al. |
| 4,707,647 A | 11/1987 | Coldren et al. |
| 4,736,437 A | 4/1988 | Sacks et al. |
| 4,763,280 A | 8/1988 | Robinson et al. |
| 4,783,826 A | 11/1988 | Koso |
| 4,783,829 A | 11/1988 | Miyakawa et al. |
| 4,799,175 A | 1/1989 | Sano et al. |
| 4,809,348 A | 2/1989 | Meyer et al. |
| 4,823,394 A | 4/1989 | Berkin et al. |
| 4,843,631 A | 6/1989 | Steinpichler et al. |
| 4,845,765 A | 7/1989 | Juvin et al. |
| 4,849,914 A | 7/1989 | Medioni et al. |
| 4,860,374 A | 8/1989 | Murakami et al. |
| 4,876,457 A | 10/1989 | Bose |
| 4,876,728 A | 10/1989 | Roth |
| 4,893,346 A | 1/1990 | Bishop |
| 4,903,313 A | 2/1990 | Tachikawa |
| 4,922,543 A | 5/1990 | Ahlbom et al. |
| 4,955,062 A | 9/1990 | Terui |
| 4,959,898 A | 10/1990 | Landman et al. |
| 4,972,359 A | 11/1990 | Silver et al. |
| 4,979,223 A | 12/1990 | Manns et al. |
| 4,980,971 A | 1/1991 | Bartschat et al. |
| 5,003,166 A | 3/1991 | Girod |
| 5,020,006 A | 5/1991 | Sporon-Fiedler |
| 5,027,417 A | 6/1991 | Kitakado et al. |
| 5,033,099 A | 7/1991 | Yamada et al. |
| 5,040,231 A | 8/1991 | Terzian |
| 5,046,109 A | 9/1991 | Fujimori et al. |
| 5,048,094 A | 9/1991 | Aoyama et al. |
| 5,060,276 A | 10/1991 | Morris et al. |
| 5,072,384 A | 12/1991 | Doi et al. |
| 5,086,478 A | 2/1992 | Kelly-Mahaffey et al. |
| 5,093,867 A | 3/1992 | Hori et al. |
| 5,111,516 A | 5/1992 | Nakano et al. |
| 5,113,565 A | 5/1992 | Cipolla et al. |
| 5,161,201 A | 11/1992 | Kaga et al. |
| 5,168,530 A | 12/1992 | Peregrim et al. |
| 5,177,559 A | 1/1993 | Batchelder et al. |
| 5,206,917 A | 4/1993 | Ueno et al. |
| 5,220,621 A | 6/1993 | Saitoh |
| 5,226,095 A | 7/1993 | Okumura et al. |
| 5,245,674 A | 9/1993 | Cass et al. |
| 5,253,306 A | 10/1993 | Nishio |
| 5,268,999 A | 12/1993 | Yokoyama |
| 5,272,657 A | 12/1993 | Basehore et al. |
| 5,280,351 A | 1/1994 | Wilkinson |
| 5,313,532 A | 5/1994 | Harvey et al. |
| 5,343,028 A | 8/1994 | Figarella et al. |
| 5,343,390 A | 8/1994 | Doi et al. |
| 5,347,595 A | 9/1994 | Bokser |
| 5,351,310 A | 9/1994 | Califano et al. |
| 5,371,690 A | 12/1994 | Engel et al. |
| 5,384,711 A | 1/1995 | Kanai et al. |
| 5,398,292 A | 3/1995 | Aoyama |
| 5,406,642 A | 4/1995 | Maruya |
| 5,459,636 A | 10/1995 | Gee et al. |
| 5,471,541 A | 11/1995 | Burtnyk et al. |
| 5,481,712 A | 1/1996 | Silver et al. |
| 5,495,537 A | 2/1996 | Bedrosian et al. |
| 5,497,451 A | 3/1996 | Holmes |
| 5,500,906 A | 3/1996 | Picard et al. |
| 5,513,275 A | 4/1996 | Khalaj et al. |
| 5,515,453 A | 5/1996 | Hennessey et al. |
| 5,524,064 A | 6/1996 | Oddou et al. |
| 5,537,669 A | 7/1996 | Evans et al. |
| 5,539,841 A | 7/1996 | Huttenlocher et al. |
| 5,544,254 A | 8/1996 | Hartley et al. |
| 5,545,887 A | 8/1996 | Smith et al. |
| 5,548,326 A | 8/1996 | Michael |
| 5,550,763 A | 8/1996 | Michael et al. |
| 5,550,937 A | 8/1996 | Bell et al. |
| 5,555,317 A | 9/1996 | Anderson |
| 5,555,320 A | 9/1996 | Irie et al. |
| 5,557,684 A | 9/1996 | Wang et al. |
| 5,559,901 A | 9/1996 | Lobregt |
| 5,568,563 A | 10/1996 | Tanaka et al. |
| 5,570,430 A | 10/1996 | Sheehan et al. |
| 5,586,058 A | 12/1996 | Aloni et al. |
| 5,602,937 A | 2/1997 | Bedrosian et al. |
| 5,602,938 A | 2/1997 | Akiyama et al. |
| 5,613,013 A | 3/1997 | Schuette |
| 5,621,807 A | 4/1997 | Eibert et al. |
| 5,623,560 A | 4/1997 | Nakajima et al. |
| 5,625,707 A | 4/1997 | Diep et al. |
| 5,625,715 A | 4/1997 | Trew et al. |
| 5,627,912 A | 5/1997 | Matsumoto |
| 5,627,915 A | 5/1997 | Rosser et al. |
| 5,631,975 A | 5/1997 | Riglet et al. |
| 5,633,951 A | 5/1997 | Moshfeghi |
| 5,638,116 A | 6/1997 | Shimoura et al. |
| 5,638,489 A | 6/1997 | Tsuboka |
| 5,640,200 A | 6/1997 | Michael |
| 5,650,828 A | 7/1997 | Lee |
| 5,657,403 A | 8/1997 | Wolff et al. |
| 5,663,809 A | 9/1997 | Miyaza et al. |
| 5,673,334 A | 9/1997 | Nichani et al. |
| 5,676,302 A | 10/1997 | Petry |
| 5,686,973 A | 11/1997 | Lee |
| 5,694,482 A | 12/1997 | Maali et al. |
| 5,694,487 A | 12/1997 | Lee |
| 5,703,960 A | 12/1997 | Soest |
| 5,703,964 A | 12/1997 | Menon et al. |
| 5,708,731 A | 1/1998 | Shmotori et al. |
| 5,717,785 A | 2/1998 | Silver |
| 5,754,226 A | 5/1998 | Yamada et al. |
| 5,757,956 A | 5/1998 | Koljonen et al. |
| 5,768,421 A | 6/1998 | Gaffin et al. |
| 5,793,901 A | 8/1998 | Matsutake et al. |
| 5,796,868 A | 8/1998 | Dutta-Choudhury et al. |
| 5,815,198 A | 9/1998 | Vachtsevanos et al. |
| 5,822,742 A | 10/1998 | Alkon et al. |
| 5,825,913 A | 10/1998 | Rostami et al. |
| 5,825,922 A | 10/1998 | Pearson et al. |
| 5,828,769 A | 10/1998 | Burns |
| 5,828,770 A | 10/1998 | Leis et al. |
| 5,835,622 A | 11/1998 | Koljonen et al. |
| 5,845,007 A | 12/1998 | Ohashi et al. |
| 5,845,288 A | 12/1998 | Syeda-Mahmood |
| 5,848,184 A | 12/1998 | Taylor et al. |
| 5,848,189 A | 12/1998 | Pearson et al. |
| 5,850,466 A | 12/1998 | Schott et al. |
| 5,850,469 A | 12/1998 | Martin et al. |
| 5,859,923 A | 1/1999 | Petry, III et al. |
| 5,862,245 A | 1/1999 | Renouard et al. |
| 5,864,779 A | 1/1999 | Fujimoto |
| 5,871,018 A | 2/1999 | Delp et al. |
| 5,875,040 A | 2/1999 | Matraszek et al. |
| 5,881,170 A | 3/1999 | Araki et al. |
| 5,890,808 A | 4/1999 | Neff et al. |
| 5,912,984 A | 6/1999 | Michael et al. |
| 5,912,985 A | 6/1999 | Morimoto et al. |
| 5,917,733 A | 6/1999 | Bangham |
| 5,926,568 A | 7/1999 | Chaney et al. |
| 5,930,391 A | 7/1999 | Kinjo |
| 5,933,516 A | 8/1999 | Tu et al. |
| 5,933,523 A | 8/1999 | Drisko et al. |
| 5,937,084 A | 8/1999 | Crabtree et al. |
| 5,940,535 A * | 8/1999 | Huang .......................... 382/201 |
| 5,943,442 A | 8/1999 | Tanaka |
| 5,950,158 A | 9/1999 | Wang |
| 5,974,169 A | 10/1999 | Bachelder |
| 5,974,365 A | 10/1999 | Mitchell |
| 5,982,475 A | 11/1999 | Bruning et al. |
| 5,987,172 A | 11/1999 | Michael |
| 5,995,648 A | 11/1999 | Drisko et al. |
| 5,995,953 A | 11/1999 | Rindtorff et al. |
| 6,002,793 A | 12/1999 | Silver et al. |
| 6,005,978 A | 12/1999 | Garakani |

| | | |
|---|---|---|
| 6,021,220 A | 2/2000 | Anderholm |
| 6,023,530 A | 2/2000 | Wilson |
| 6,026,186 A | 2/2000 | Fan |
| 6,026,359 A | 2/2000 | Yamaguchi et al. |
| 6,035,066 A | 3/2000 | Michael |
| 6,052,489 A * | 4/2000 | Sakaue .................. 382/266 |
| 6,061,086 A | 5/2000 | Reimer et al. |
| 6,064,388 A | 5/2000 | Reyzin |
| 6,064,958 A | 5/2000 | Takahashi et al. |
| 6,067,379 A | 5/2000 | Silver |
| 6,070,160 A | 5/2000 | Geary et al. |
| 6,078,700 A | 6/2000 | Sarachik |
| 6,081,620 A | 6/2000 | Anderholm |
| 6,111,984 A | 8/2000 | Fukasawa |
| 6,115,052 A | 9/2000 | Freeman et al. |
| 6,118,893 A | 9/2000 | Li |
| 6,122,399 A | 9/2000 | Moed |
| 6,128,405 A | 10/2000 | Fujii |
| 6,137,893 A | 10/2000 | Michael et al. |
| 6,151,406 A | 11/2000 | Chang et al. |
| 6,154,566 A | 11/2000 | Mine et al. |
| 6,154,567 A | 11/2000 | McGarry |
| 6,173,066 B1 | 1/2001 | Peurach et al. |
| 6,173,070 B1 | 1/2001 | Michael et al. |
| 6,178,261 B1 | 1/2001 | Williams et al. |
| 6,178,262 B1 | 1/2001 | Picard et al. |
| 6,215,915 B1 | 4/2001 | Reyzin |
| 6,226,418 B1 | 5/2001 | Miller et al. |
| 6,246,478 B1 | 6/2001 | Chapman et al. |
| 6,272,244 B1 | 8/2001 | Takahashi et al. |
| 6,272,245 B1 | 8/2001 | Lin |
| 6,311,173 B1 | 10/2001 | Levin |
| 6,324,298 B1 | 11/2001 | O'Dell et al. |
| 6,324,299 B1 | 11/2001 | Sarachik et al. |
| 6,345,106 B1 | 2/2002 | Borer |
| 6,363,173 B1 | 3/2002 | Stentz et al. |
| 6,381,366 B1 | 4/2002 | Taycher et al. |
| 6,381,375 B1 | 4/2002 | Reyzin |
| 6,385,340 B1 | 5/2002 | Wilson |
| 6,408,109 B1 | 6/2002 | Silver et al. |
| 6,421,458 B2 | 7/2002 | Michael et al. |
| 6,424,734 B1 | 7/2002 | Roberts et al. |
| 6,453,069 B1 | 9/2002 | Matsugu et al. |
| 6,457,032 B1 | 9/2002 | Silver |
| 6,462,751 B1 | 10/2002 | Felser et al. |
| 6,466,923 B1 | 10/2002 | Young et al. |
| 6,529,852 B2 | 3/2003 | Knoll et al. |
| 6,532,301 B1 | 3/2003 | Krumm et al. |
| 6,594,623 B1 | 7/2003 | Wang |
| 6,625,303 B1 | 9/2003 | Young et al. |
| 6,636,634 B2 | 10/2003 | Melikian et al. |
| 6,658,145 B1 * | 12/2003 | Silver et al. .................. 382/149 |
| 6,681,151 B1 | 1/2004 | Weinzimmer et al. |
| 6,687,402 B1 | 2/2004 | Taycher et al. |
| 6,690,842 B1 | 2/2004 | Silver et al. |
| 6,691,126 B1 | 2/2004 | Syeda-Mahmood |
| 6,691,145 B1 | 2/2004 | Shibata et al. |
| 6,714,679 B1 | 3/2004 | Scola et al. |
| 6,728,582 B1 | 4/2004 | Wallack |
| 6,751,338 B1 | 6/2004 | Wallack |
| 6,751,361 B1 | 6/2004 | Wagman |
| 6,760,483 B1 | 7/2004 | Elichai et al. |
| 6,771,808 B1 | 8/2004 | Wallack |
| 6,785,419 B1 | 8/2004 | Jojic et al. |
| 6,850,646 B1 | 2/2005 | Silver |
| 6,856,698 B1 | 2/2005 | Silver et al. |
| 6,859,548 B2 | 2/2005 | Yoshioka et al. |
| 6,909,798 B1 | 6/2005 | Yukawa et al. |
| 6,959,112 B1 | 10/2005 | Wagman |
| 6,973,207 B1 | 12/2005 | Akopyan et al. |
| 7,043,055 B1 | 5/2006 | Silver |
| 7,065,262 B1 | 6/2006 | Silver et al. |
| 7,239,929 B2 | 7/2007 | Ulrich et al. |
| 2002/0054699 A1 | 5/2002 | Roesch et al. |
| 2005/0117801 A1 | 6/2005 | Davis et al. |

FOREIGN PATENT DOCUMENTS

| | | |
|---|---|---|
| DE | 4406020 | 6/1995 |
| JP | 6378009 | 4/1988 |
| JP | 06-160047 | 6/1994 |
| JP | 6160047 | 7/1994 |
| JP | 3598651 | 9/2004 |
| JP | 3598651 | 12/2004 |
| WO | 97/18524 A2 | 5/1997 |

OTHER PUBLICATIONS

"Apex Search Object", *acuWin version 1.5*, (1997),pp. 1-35.

"Apex Search Object Library Functions", *Cognex Corporation*, (1998).

"Cognex 2000/3000/4000 Vision Tools", *Cognex Corporation*, Chapter 2 Searching Revision 5.2 P/N 590-0103,(1992), pp. 2-1 to 2-62.

"Cognex 3000/4000/5000 Programmable Vision Engines, Vision Tools", *Chapter 1 Searching, Revision 7.4 590.1036*, (1996),pp. 1-68.

"Cognex 3000/4000/5000 Programmable Vision Engines, Vision Tools", *Chapter 14 Golden Template Comparision*, (1996), pp. 569-595.

"Description of Sobel Search", *Cognex Corporation*, (1998).

Ballard, D. H., et al., "Generalizing the Hough Transform to Detect Arbitrary Shapes", *Pattern Recognition*, vol. 13, No. 2 Pergamon Press Ltd. UK, (1981),pp. 111-122.

Ballard, et al., "Searching Near and Approximate Location", *Section 4.2, Computer Vision*, (1982), pp. 121-131.

Ballard, et al., "The Hough Method for Curve Detection", *Section 4.3, Computer Vision*, (1982), pp. 121-131.

Brown, Lisa G., "A Survey of Image Registration Techniques", *ACM Computing Surveys*, vol. 24, No. 4 Association for Computing Machinery, (1992),pp. 325-376.

Caelli, et al., "Fast Edge-Only Matching Techniques for Robot Pattern Recognition", *Computer Vision, Graphics and Image Processing 39*, Academic Press, Inc., (1987),pp. 131-143.

Caelli, et al., "On the Minimum Number of Templates Required for Shift, Rotation and Size Invariant Pattern Recognition", *Pattern Recognition*, vol. 21, No. 3, Pergamon Press plc, (1988),pp. 205-216.

Crouzil, et al., "A New Correlation Criterion Based on Gradient Fields Similarity", *Proceedings of the 13th International Conference on Pattern Recognition vol. I Track A*, Computer Vision, (1996), pp. 632-636.

Grimson, et al., "On the Sensitivity of the Hough Transform for Object Recognition", *IEEE Transactions on Pattern Analysis and Machine Intelligence*, vol. 12. No. 3,(1990),pp. 255-274.

Hsieh, et al., "Image Registration Using a New Edge-Based Approach", *Computer Vision and Image Understanding*, vol. 67, No. 2,(1997),pp. 112-130.

Joseph, S. H., "Fast Optimal Pose Estimation for Matching in Two Dimensions", *Image Processing and its Applications, Fifth International Conference*, (1995).

Rosenfeld, et al., "Coarse-Fine Template Matching", *IEEE Transactions on Systems, Man, and Cybernetics*, (1997),pp. 104-107.

Tian, et al., "Algorithms for Subpixel Registration", *Computer Vision Graphics and Image Processing 35*, Academic Press, Inc.,(1986),pp. 220-233.

Borgefors, Gunilla "Hierarchical Chamfer Matching: A Parametric Edge Matching Algorithm", *IEEE Transaction on Pattern Analysis and Machine Intelligence*, vol. 10, No. 6, (Nov. 1988).

Huttenlocher, Daniel P., "Comparing Images using the Hausdorff Distance", *IEEE Transactions on Pattern Analysis and Machine Intelligence*, vol. 15, No. 9,(Sep. 1993).

"Complaint and Jury Demand", *US District Court, District of Massachusetts, Cognex Corp. and Cognex Technology and Investment Corp. v. MVTEC Software GMBH; MVTEC, LLC; and Fuji America Corp.* Case No: 1:08-cv-10857-JLT,(May 21, 2008).

"Fuji America's Answer and Counterclaims", *United States District Court District of Massachusetts, Cognex Corp. and Cognex Technology and Investment Corp. v. MVTEC Software GMBH; MVTEC, LLC; and Fuji America Corp.* Case No: 1:08-cv-10857-JLT,(Aug. 8, 2008).

"Plaintiffs Cognex Corporation and Cognex Technology & Investment Corporation's Reply to Counterclaims of MVTEC Software GMBH and MVTEC LLC", *Cognex Corp. and Cognex Technology* and Investment Corp. v. MVTEC Software GMBH; MVTEC, LLC; and Fuji America Corp. Case No: 1:08-cv-10857-JLT, (Aug. 2008).
Wallack, Aaron S., "Robust Algorithms for Object Localization", *International Journal of Computer Vision*, (May, 1998),243-262.
Gdalyahu, Yoram et al., "Self-Organization in Vision: Stochastic Clustering for Image Segmentation, Perceptual Grouping, and Image Database Organization", *IEEE Transactions on Pattern Analysis and Machine Intelligence*, IEEE Inc., New York, US, vol. 23, No. 10, Oct. 2001,1053-1074.
Pauwels, E. J., et al., "Finding Salient Regions in Images", *Computer Vision and Image Understanding*, Academic Press, San Diego, CA, US, vol. 75, No. 1-2, (Jul. 1999),73-85.
Scanlon, James et al., "Graph-Theoretic Algorithms for Image Segmentation", *Circuits and Systems, ISCAS '99 Proceedings of the 1999 IEEE International Symposium on* Orlando, FL, IEEE, (May 30, 1999),141-144.
Shi, Jianbo et al., "Normalized Cuts and Image Segmentation", *Computer Vision and Pattern Recognition, Proceedings, IEEE Computer Society Conference on* San Juan, IEEE Comput. Soc., (Jun. 17, 1997),731-737.
Xie, Xuanli L., et al., "A New Fuzzy Clustering Validity Criterion and its Application to Color Image Segmentation", *Proceedings of the International Symposium on Intelligent Control*, New York, IEEE, (Aug. 13, 1991),463-468.
Mehrotra, Rajiv et al., "Feature-Based Retrieval of Similar Shapes", *Proceedings of the International Conference on Data Engineering*, Vienna, IEEE Comp. Soc. Press, vol. COnf. 9, (Apr. 19, 1993),108-115.
Belongie, S. et al., "Shape Matching and Object Recognition Using Shape Contexts", *IEEE Transactions on Pattern Analysis and Machine Intelligence*, IEEE Inc. New York, vol. 24, No. 4, (Apr. 2003),509-522.
Ohm, Jens-Rainer "Digitale Bildcodierung", *Springer Verlag*, Berlin 217580, XP0002303066, Section 6.2 Bewegungschatzung,(1995).
Wei, Wen et al., "Recognition and Insprection of Two-Dimensional Industrial Parts Using Subpolygons", *Pattern Recognition*, Elsevier, Kidlington, GB, vol. 25, No. 12, (Dec. 1, 1992),1427-1434.
Bileschi, S. et al., "Advances in Component-based Face Detection", *Lecture notes in Computer Science*, Springer Verlag, New York, NY, vol. 2388, (2002),135-143.
Fitzpatrick, J M., et al., "Handbook of Medical Imaging", vol. 2: *Medical image Processing and Analysis*, SPIE Press, Bellingham, WA,(2000),447-513.
Bookstein, F L., "Principal Warps: Thin-Plate Splines and the Decomposition of Deformations", *IEEE Transactions on pattern Analysis and Machine Intelligence*, IEEE Inc., New York, vol. 11, No. 6,(Jun. 1, 1989).
Zhang, Zhengyou "Parameter estimation techniques: A tutorial with application to conic fitting", *Imag Vision Comput; Image and Vision computing*; Elsevier Science Ltd, Oxford England, vol. 15, No. 1,(Jan. 1, 1997).
Stockman, G et al., "Matching images to models for registration and object detection via clustering", *IEEE Transaction of Pattern Analysis and Machine Intelligence*, IEEE Inc., New York, vol. PAMI-4, No. 3,,(1982).
Geiger, et al., "Dynamic Programming for Detecting, Tracking, an Matching Deformable contours", *IEEE*, (1995),pp. 294-302.
Cootes, T. F., et al., "Active Shape Models—Their Training and Application", *Computer Vision and Image Understanding*, vol. 61, No. 1,(Jan. 1995),38-59.
Shi, Jianbo et al., "Normalized Cuts and Image Segmentation", *IEEE Transaction on Pattern Analysis and Machine Intelligence*, vol. 22, No. 8, (Aug. 2000),888-905.
Alexander, et al. "The Registration of MR Images Using Multiscale Robust Methods " Magnetic Resonance Imaging, vol. 14, No. 5, pp. 453-468 (1996).
Anisimov, V, et al. "Fast hierarchical matching of an arbitrarily oriented template, " Pattern Recognition Letters, vol. 14, No. 2, pp. 95-101 (1993).
Anuta, P., Spatial Registration of Multispectral and Multitemporal Digital Imagery Using Fast Fourier Transform Techniques, IEEE Transactions on Geoscience Electronics, Oct. 1970, pp. 353-368, vol. GE-8, No. 4.

Araujo, H. et al. "A Fully Projective Formulation of Lowe's Tracking Algorithum", Technical Report 641, Computer Science Department, University of Rochester (1996).
Ashburner, J., et al, "Incorporating Prior Knowledge into Image Registration, " Neuroimage, vol. 6, No. 4, pp. 344-352 (1977).
Ashburner, J., et al., "Nonlinear Spatial Normalization Using Basis Functions," Human Brain Mapping, vol. 7, No. 4, pp. 254-266 (1999).
Ashburner, J., et al., "Nonlinear Spatial Normalization Using Basis Functions," The Wellcome Depart. Of Cognitive Neurology, Institute of Neurology, Queen Square, London, UK, pp. 1-34, 1999.
Bachelder, I. et al. "Contour Matching Using Local Affine Transformations," Massachusetts Institute of Technololy Artificial Intelligence Laboratory, A.I. Memo No. 1326 (Apr. 1992).
Baker, J. "Multiresolution Statistical Object Recognition," Master's thesis, Massachusetts Institute of Technology (1994).
Baker, J. et al. "Multiresolution Statistical Object Recognition, " Artificial Intelligence. Laboratory, Massachusetts Institute of Technology, pp. 1-6, 1994.
Balkenius, C. et al: "Elastic Template Matching as a Basis for Visual Landmark Recognition and Spatial Navigation," Lund University Cognitive Science, 1997 pp. 1-10.
Balkenius, C. et al. "The XT-I Vision Architecture," Symposium on image Analysis, Lund University Cognitive Science, 1996, pp. 1-5.
Besl P. et al., A Method for Registration of 3-D Shapes, IEEE Transactions on Pattern Analysis and Machine Intelligence, Feb. 1992, pp. 239-256, vol. 14, No. 2.
Bichsel, M. et al. "Strategies of Robust Object Recognition for the Automatic Identification of Human Faces," (1991), pp. 1-157, PhD thesis, ETH, Zurich.
Blais 0. et al. "Registering Multiyiew Range Data to Create 3D Computer Objects," IEEE Transactions on Pattern Analysis and Machine Intelligence, vol. 17. No. 8, pp. 820-824 (Aug. 1995).
Breuel, T. "Geometric Aspects of Visual Object Recognition, " Technical Report 1374, MIT Artificial Intelligence Laboratory, May 1992, pp. 1-173.
Bruckstein, Alfred M., and Larry O'Gorman and Alon Orlitsky, "Design of Shapes for Precise Image Registration," IEEE Transactions on Information Theory, vol. 44, No. 7, Nov. 1998.
Buzug, T.M., et al., "Using an Entropy Similarity M.easure to Enhance the Quality of DSA. Images with an Algorithm Based on Template Matching," Visualization in Biomedical Computer, pp. 235-240, 1996.
Chen, Y. et al. "Object Modeling by Registration of Multiple Range Images," in IEEE ICRA, pp. 2724-2729 (1991).
Chen, Y. et al. "Object modeling registration of multiple range images," Image and Vision Computing, vol. 10, No. 3, pp. 145-155 (1992).
Cognex Corporation, "Chapter 7 CONPLAS," Cognex 3000/4000/5000 Programmable Vision Engines, Vision Tools, Revision 7.4, P/N. 590-0136, pp. 307-340 (1996).
Cognex Corporation, Cognex 3000/4000/5000 Vision Tool, Revision 7.6, Chapter 4, Caliper Tool, 1996.
Cognex Corporation, Cognex 3000/4000/5000 Vision Tool, Revision 7.6, Chapter 5, Inspection, 1996.
Cognex Corporation, Cognex 3000/4400 SMD Tools Release 5.2, SMD 2, 1994.
Cognex Corporation, Cognex 4000/5000 SMD Placement Guidance Package, User's Manual Release 3.8.00, 1998.
Cognex Corporation, Cognex MVS-8000 Series, CVL Vision Tools Guide, pp. 25-136, Release 5.4 590-6271, Natick, MA USA 2000.
Cognex Corporation, "Chapter 13 Golden Template Comparison," Cognex 3000/4000/5000 Vision Tools, pp. 521-626, Natick, MA, USA, 2000.
Cognex Corporation, Cognex MVS-8000 Series, GDE User's Guide, Revision 1.1, Apr. 7, 2000.
Cox, I. et al., "On the Congruence of Noisy Images to Line Segment Models," International Conference on Computer Vision, pp. 252-258 (1988).
Cox, I. et al., "Predicting and Estimating the Accuracy of a Subpixel Registration Algorithm, " IEEE Transactions on Pattern Analysis and Machine Intelligence, vol. 12, No. 8, pp. 721-734 (Aug. 1990).

Dana, K. et al. Registration of Visible and Infrared Images, pp. 1-12, vol. 1957. 1993.

Declerck, et al. "Automatic Registration and Alignment on a Template of Cardiac Stress & Rest SPECT Images," IEEE Proc. of MMBIA 1996, pp. 212-221.

Defigueiredo et al. Model Based Orientation Independent 3-D Machine Vision Techniques,IEEE Transactions on Aerospace and Electronic Systems. vol. 24, No. 5 Sep. 1988, pp. 597-607.

Dementhon D. et al. "Model-Based Object Pose in 25 Lines of Code," Proceedings of the Second European Conference on Computer Vision, pp, 335-343 (1992).

Dementhon, D. F. et al. Model-Based Object Pose in 25 Lines of Code, International Journal of Computer Vision, 1995, pp. 123-141. Kluwer Academic Publishers, Boston, MA.

Devernay, F., "A Non-Maxima Suppression Method for Edge Detection with Sub-Pixel Accuracy," Institut National de Recherche en Informatique et en Automatique, No. 2724, Nov. 1995, 24 pages.

Dorai, C. et al. "Optimal Registration of Multiple Range Views," IEEE 1994, pp. 569-571.

Drewniok, C. et al. "High-Precision Localization of Circular Landmarks in Aerial Images," Proc. 17, DAGM-Symposium, Musteretkennung 1995, Bielefeld, Germany, Sep. 13-15, 1995, pp. 594-601.

Eric, W. et al., On the Recognition of Parameterized 2D Objects, International Journal of Computer Vision, 1988, Kluwer Academic Publishers, Boston, MA, pp. 353-372.

Feddema, J. T. et al. Weighted Selection of Image Features for Resolved Rate Visual Feedback Control, IEEE Transactions on Robitics and Automation, vol. 7 No. 1, Feb. 1991, pp. 31-47.

Feldmar, et al. "3D-2D projective registration of free-form curves and surfaces," Institut National de Recherche en Informatique et en Automatique, No. 2434, Dec. 1994, 47 pages.

Fischer, Andre, and Thomas Kolbe and Felicitas Lang, On the Use of Gometric and Semantic Models for Component-Based Building Reconstruction: Institue for Photogrammetry, University of Bonn, pp. 101-119, 1999.

Foley, James D., Andries Van Dam, Steven K. Feiner, John F. Hughes, "Second Edition in C, Computer Graphics Principles and Practice," -pp. 48-51, Addison-Wesley Publishing Company, 1996, USA.

Foley, J.D. et al., "Introduction to Computer Graphics," pp. 36-49 (1994).

Forsyth., D. et al., "Invariant Descriptors for 3-D Object Recognition and Pose," IEEE Transactions on Pattern Analysis and Machine Intelligence, vol. 13, No. 10, Oct. 1991, pp, 971-991.

Foster, Nigel J., "Determining objection orientation using ellipse fitting," SPIE vol. 521—Intelligent Robots and Computer Vision, 1985, pp. 34-43.

Foster, Nigel J. et al., "Determining objection orientation from a single image using multiple information sources," CMU-RI-TR-84-15, Jun. 1984, pp. 1-96.

Foster, Nigel J., "Attributed Image Matching Using a Minimum Representation Size Criterion," PhD. Thesis, Carnegie Mellon University, 1987, pp. 1-142.

Gavrila et al. "3-D Model-Based Tracking of Humans in Action: A Multi-View Approach," Computer Vision Laboratory, 1996, pp. 73-80.

Gavrila, D. et al. "3-D Model-Based Tracking of Human Upper Body Movement: A Multi-View Approach," Computer Vision Laboratory, 1995, pp. 253-258.

Gavrila, D. "Multi-feature Hierarchical Template Matching Using Distance Transforms," Daimler-Benz AG, Research and Technology, 6 pages.

Ge, Y. et al, "Surface-based 3-D image registration using the Iterative Closest Point algorithm with a closest point transform," Medical Imaging 1996: Image Processing, M. Loew, K. Hanson, Editors, Proc. SPIE 2710, pp. 358-367 (1996).

Gennery, D. "Visual Tracking of Known Three Dimensional Objects," International Jounial of Computer Vision, vol. 7, No. 3, pp. 243-270 (1992).

Gorman, "Recognition of incomplete polygonal objects" IEEE, pp. 518-522, 1989.

Gottesfeld Brown, L. M. et al. "Registration of Planar Film Radiographs with Computed Tomography," 1996 Workshop on Mathematical Methods in Biomedical Image Analysis (MMBIA '96), pp. 42-51 (1996).

Haag, M. et al. Combination of Edge Element and Optical Flow Estimates for 3D-Model-Based Vehicle Tracking in Traffic Images Sequences, International Journal of Computer Vision, 1999, pp. 295-319.

Han, R. et al., An Edge-Based Block Matching Technique for Video Motion, Image Processing Algorithms and Techniques II, 1991, pp. 395-408, vol. 1452.

Haralick, R., et al,, "Pose Estimation from Corresponding Point Data, " IEEE Trans. On Systems, Man and Cybernetics, vol. 19, No. 6, pp. 1426-1445, 1989.

Hashimoto et at M,, "High-Speed Template Matching Algorithm Using Contour Information," Proc. SPIE, vol. 1657, pp. 374-385 (1992).

Hashimoto, M. et al, "An Edge Point Template Matching Method for High Speed Difference Detection between Similar Images," Industrial Electronics and Systems Development Laboratory Mitsubishi Electric Corp., PRU, vol. 90, No. 3, (1990), 8 pages.

Hashimoto, M. et al. "High Speed Template Matching Algorithm Using Information of Edge Points," Trans, IEICE Technical Report D-II, vol. J74-D-II, No. 10, pp. 1419-1427 (Oct. 1991).

Hashimoto, M. et al, "High-Speed Template Matching Algorithm Using Information of Contour Points," Systems & Computers in Japan. vol. 23, No. 9, pp. 78-87 (1992).

Hauck, A. et al "A Hierarchical World Model with Sensor-and Task-Specific Features," 8 pages, 1996.

Hauck, A. et al. "Hierarchical Recognition of Articulated Objects from Single Perspective Views," 7 pages, 1997.

Havelock, David I., "Geometric Precision in Noise-Fee Digital images," IEEE Transactions on Pattern Analysis and Machine Intelligence, vol. II, No. 10, Oct. 1989.

Hill, John W., Machine Intelligence Research Applied to Industrial Automation, U.S. Department of Commerce, National Technical Information, Service, SRI International Tenth Report, Nov. 1980.

Hill et al, "Medical Image Registration," Institute of Physics Publishing; Phys. Med. Biol. 46, 2001, pp. RI-R45.

Hill, D. et al., "Voxel Similarity Measures for Automated Image Registration ," Proc., SPIE, vol. 2359, pp. 705-216 (1994).

Hirako, K. "Development of an Automated detection system for microcalcifications lesion in mammogtaphy" Trans. IEICE Japan D-II, vol. J78-D-41, No. 9. pp. 1334-1343 (Sep. 1995).

Hirooka, M. et al., "Hierarchical distributed template matching," Proc. SPIE vol. 3029, p. 176-183 (1997).

Hoff, W.A., et al. "Pose Estimation of Artificial Knee Implants in Fluoroscopy Images Using a Template Matching Technique," Proc. of $3^{rd}$IEEE Workshop on Applications of Computer Vision, Dec. 2-4, 1996, 7 pages.

Holden M. et al. "Voxel Similarity Measures for 3-D Serial MR Brain Image Registration, " IEEE Transactions on Medical Imaging, vol. 19, No. 2, pp. 94-102 (2000).

Hoogs, Anthony and Ruzena Bajcsy, Model-based Learning of Segmentation, pp. 494-499, IEEE, 1996.

Hu, et al, "Expanding the Range of Convergence of the CORDIC Algorithm," IEEE Transactions on Computers, vol. 40, No. 1, pp. 13-21 (Jan. 1991).

Hu, Y., "CORDIC-Based VLSI Architectures for Digital Signal Processing," IEEE Signal Processing Magazine, pp. 16-35, 1053-5888/92 (Jul. 1992).

Hugli, et al. "Geometric matching of 3D objects assessing the range of successful initial configurations", IEEE, pp. 101-106, 1997.

Hung, D. et al. "Subpixel Edge Estimation Using Geometrical Edge Models with Noise Miniaturization, " 1994, pp. 112-117.

Hutchinson, Seth, and Greg, Hager and Peter Corke, "A Tutorial on Visual Servo Control," IEEE Transactions on Robotics and Automation, vol. 12, No. 5, Oct. 1996, 20 pages.

Huttenlocher, D. F. et al., "A Multi-Resolution Technique for Comparing Images Using the Hausdorff Distance," 1993 IEEE, pp. 705-706.

Jacobs, D.W., The Use of Grouping in Visual Object Recognition, MIT Artifical Intelligence Laboratory, Office of Naval Research, pp. 1-162, Oct. 1988.

Jähne, B. et al. Geißler, Handbook of Computer Vision and Applications, vol. 2, Academic Press, (1999), Chapter 5, 43 pages.

Jain, A. K. et al. "Object Matching Using Deformable Templates, IEEE Transactions on Pattern Analysis and Machine Intelligence," Mar. 1996, pp. 267-278, vol. 18, No. 3.

Jain, A.K. et al. "Object Matching Using Deformable Templates, IEEE Transactions on Pattern Analysis and Machine Intelligence," Mar. 1996, pp. 267-278, vol. 18, No. 3.

Jain, R. et al., "Machine Vision," McGraw-Hill, 1995, 207 pages.

Jebara, T.S , 3D Pose Estimation and Normalization for Face Recognition, Undergraduate Thesis, Department of Electrical Engineering, McGill University May 1996, 138 pages.

Jiang, H. et al., "A New Approach to 3-D Registration of Multimodality Medical Images by Surface Matching," SPIE vol. 1808, pp. 196-213 (1992).

Jiang, H. et al., "Image Registration of Multimodality 3-D Medical Images by Chamfer Matching," Biomedical Image Processing and Three Dimensional Microscopy, SPIE vol. 1660, pp. 356-366 (1992).

Jokinen, O. "Building 3-D City Models from Multiple Unregistered Profile Maps," First International Conference on Recent Advances in 3-D Digital Imaging and Modeling, pp. 242-249 (1997).

Jokinen, O. "Matching and modeling of multiple 3-D disparity and profile maps," Ph.D Thesis, Helsinki Univ. of Technology, Helsinki, Finland (2000).

Jokinen, O., et al. "Relative orientation of two disparity maps in stereo vision," 6 pages, 1995.

Jokinen, O., Area-Based Matching for Simultaneous Registration of Multiple 3-D Profile Maps, CVIU, vol. 71, No. 3, pp. 431-447 (Sept. 1998).

Jokinen, O., "Area Based Matching for Simulatneous Registration of Multiple 3-D Profile Maps," Institute of Photogrammetry and Remote Sensing, Helsinki Univ. of Tech., 16 pages, 1998.

Jordan, J. "Alignment mark detection using signed-contrast gradient edge maps, " Proc. SPIE, vol. 1661, pp. 396-407 (1992).

Kashioka, Seiji, et al., "A Transistor Wire-Bonding System Utilizing Multiple local Pattern Matching Techniques," pp. 562-570, 1976.

Kawamura, et al. "On-Line Recognition of Freely Handwritten Japanese Characters Using Directional Feature Densities", IEEE, pp. 183-186, 1992.

Kersten, T. et al. "Automatic Interior Orientation of Digital Aerial Images," Photogrammetric Engineering & Remote Sensing, vol. 63, No. 8, pp. 1007- 1011 (1997).

Kersten, T. et al. "Experiences with Semi-Automatic Aerotriangulation on Digital Photogrammetric Stations," Great Lakes Conference on Digital Photogrammetry and Remote Sensing, (1995).

Koller, D. et al. "Model-Based Object Tracking in Monocular Image Sequences of Road Traffic Scenes, International Journal of Computer Vision," 1993, pp. 257-281.

Kollnig, H. et al. 3D Post Estimation by Fitting Image Gradients Directly to Polyhedral Models, IEEE, 1995, pp. 569-574.

Kollnig, H. et al., 3D Estimation by Directly Matching Polyhedral Models to Gray Value Gradients, International Journal Computer Vision, 1997, pp. 283-302.

Kovalev et al., "An Energy Minimization Approach to the Registration, Matching and Recognition of Images," Lecture Notes in Computer Science, vol. 1296, Proceedings of the 7th International Conference on Computer Analysis of Images and Patterns, pp. 613-620 (1997).

Lamdan, Y. et al., Affine Invariant Model-Based Object Recognition, IEEE Transactions on Robotics and Automation, Oct. 1990, pp. 578-589, vol. 6, No. 5.

Lang, G. K. et al. Robust Classification of Arbitrary Object Classes Based on Hierarchical Spatial Feature-Matching, Machine Vision and Applications, 1997, pp. 123-135.

Lanser, S. et al., "Robust Video-Based Object Recognition Using CAD Models," 8 pages, 1995.

Lanser, S. et al., "MORAL—A Vision-Based Object Recognition System for Autonomous Mobile Systems," 9 pages, 1997.

Lemieux, L. et al., "A Patient-to-Computer-Tomography Image Registration Method Based on Digitally Reconstructed Radiographs," Med. Phys., vol. 21, No. 11, pp. 1749-1760 (Nov. 1994).

Li, H. et al. A Contour-Based Approach to Multisensor Image Registration, IEEE Transactions on Image Processing, Mar. 1995, pp. 320-334, vol. 4, No. 3.

Li, Z. et al., On Edge Preservation in Multiresolution Images, Graphical Models and Image Processing, 1992, pp. 461-472, vol. 54, No. 6.

Lin, et al., "On-Line CORDIC Algorithms," IEEE Transactions on Computers, pp. 1038-1052, vol. 39, No. 8, 1990.

Lindeberg, T. Discrete Derivative Approximations with Scale-Space Properties: A Basis for Low-Level Feature Extraction, Journal of Mathematical Imaging and Vision, 1993, pp. 349-376.

Lu, F. Shape Registration Using Optimization for Mobile Robot Navigation, Department of Computer Science, University of Toronto, 1995, pp. 1-163.

Maes et al., "Multimodality Image Registration by Maximization of Mutual Information," IEEE Transactions on Medical Imaging, vol. 16, No. 2, Apr. 1997, pp. 187-198.

Maes, F. "Segmentation and Registration of Multimodal Medical Images," PhD thesis, Katholieke Universiteit Leuven (1998).

Maes, F. et al. "Comparative evaluation of multiresolution optimization strategies for multimodality image registration by maximization of mutual information," Medical Image Analysis, vol. 3, No. 4, pp. 373-386 (1999).

Maio, D. et al. Real-time face location on Gray-Scale Static Images, Pattern Recognition, The Journal of the Pattern Recognition Society, 2000, pp. 1525-1539.

Makous, W., "Optimal Patterns for Alignment," Applied Optics, vol. 13, No. 3, Mar. 1974, 6 pages.

Marchand, E, et al., "Robust Real-Time Visual Tracking Using a 2D-3D Model-Based Approach," IEEE, 7 pages, 1999.

Marchand, E. et al., "A 2D-3D Model-Based Approach to Real-Time Visual Tracking," Institut National de Recherche en Informatique et en Autonlaticlue, No. 3920, Mar. 2000, 33 pages.

Masuda et al., "A Robust Method for Registration and Segmentation of Multiple Range Images, " Computer Vision and Image Understanding, vol. 61 No. 3 May pp. 295-307 (1995).

Masuda, et al., "Detection of partial symmetry using correlation with rotatedreflected images," Pattern Recognition, vol. 26, No. 88, pp. 1245-1253 (1993).

Medina-Mora, R., "An Incremental Programming Environment," IEEE Transactions on Software Engineering Sep. 1981, pp. 472-482, vol. SE-7, No. 5, 1992.

Meijering et al., "Image Registration for Digital Subtraction Angiography," International Journal of Computer Vision, vol. 3 1, No. 2, pp. 227-246 (1999).

Miller, et al. (Template. Based Method of Edge Linking Using a Weighted Decision), IEEE, pp. 1808-1815, 1993.

Neveu, C. F, et at "Two-Dimensional Object Recognition Using Multiresolution Models, Computer Vision, Graphics, and Image Processing," 1986, pp. 52-65.

Newman, Timothy S., Anil K. Jain and H.R. Keshavan, "3D CAD-Based Inspection I: Coarse Verification," IEEE, 1992, pp. 49-52.

O'Gorman, Lawrence, "Subpixel Pre of Straight-Edged Shapes for Registration and Measurement," IEEE Transactions on Pattern Analysis and Machine Intelligence, vol. 18, No. 7, Jul. 1996, 6 pages.

Oberkampf, D. et al., "Iterative Pose Estimation Using Coplanar Feature Points," Computer Vision and Image Understanding, vol. 63, No. 3, pp. 495-511 (1996).

Oberkampf, D. et al., "Iterative Pose Estimation Using Coplanar Points," International Conference on Computer Vision and Pattern Recognition, pp. 626-627 (1993).

Olson, C.F. et al. "Automatic Target Recognition by Matching Oriented Edge Pixels, IEEE Transactions on Image Processing," Jan. 1997, pp. 103-113, vol. 6, No. 1.

Olson, C.F. et at. "Recognition by matching dense, oriented edge pixels," in Proc. Int. Symp. Comput. Vision, pp. 91-96 (1995).

Perkins, W. A., "Inspector: A Computer Vision System That Learns to Inspect Parts," IEEE Transactions on Pattern Analysis and Machine Intelligence, Nov. 1983, pp. 584-592, vol. PAMI-5, No. 6.

Pluim et al., "Interpolation Artifacts in Mutual Information-Based Image Registration," Computer Vision and Image Understanding 77, 211-232 (2000).

Pluim, J. "Multi-Modality Matching Using Mutual Information," Master's thesis, Department of Computing Science, University of Groningen (1996).

Pluim, J. P. W., et al., "Mutual information matching and interpolation artefacts," Proc. SPIE, vol. 3661, (1999), 10 pages.

Pratt, W. K., "Digital Image Processing," $2^{nd}$ Edition, Wiley-Interscience, pp. 651-673, 2002.

Rignot, E. et al. "Automated Multisensor Registration: Requirements and Techniques," Photogrammetric Engineering & Remote Sensing, vol. 57, No. 8, pp. 1029-1038 (1991).

Roche, A. et al. "Generalized Correlation Ratio for Rigid Registration of 3D Ultrasound with MR Images," Medical Image Computing and Computer-Assisted Intervention—MICCAI 2000, pp. 567-577 (2000).

Roche, A. et al, "Multimodal Image Registration by Maximization of the Correlation Ratio," Rapport de Récherche No. 3378, Unitéde Recherche INRIA Sophia Antipolis. INRIA (Aug. 1998).

Roche, A. et al. "The Correlation Ratio as a New Similarity Measure for Multimodal Image Registration," Medical Image Computing and Computer-Assisted Intervention—MICCAI'98, pp. 1115-1124 (1998).

Rueckert, D. et al. "Nonrigid Registration Using Free-Form Deformations: Application to Breast MR Images," IEEE Transactions on Medical imaging, vol. 18, No. 8, pp. 712-721 (1999).

Rueckert, D. it al., "Non-rigid Registration of Breast MR images Using Mutual Information", Proceedings of the Medical Image Computing and Computer Assisted Intervention Society, pp. 1144-1152 (1998).

Rummel, P. et al., "Workpiece Recognition and Inspection by a Model-Based Scene Analysis System," Pattern Recognition, 1984, pp. 141-148, vol. 17, No. 1.

Sakai, T. et al., "Line Extraction and Pattern Detection in a Photograph," Pattern Recognition, 1969, pp. 233-248, vol. 1.

Sanderson, Arthur, and Nigel Foster, "Attributed Image Matching Using a Minimum Representation Size Criterion," IEEE 1989, pp. 360-365.

Schütz. H. et a. "Recognition of 3-D Objects with a Closest-Point Matching Algorithm," Proc. conference ISPRS intereommission workshop, vol. 30, issue 5W1 (1995), 6 pages.

Seitz, P. "The robust recognition of object primitives using local axes of symmetry," Signal Processing, vol. 18, pp. 89-108 (1989).

Seitz, P. et al "The Robust Recognition of Traffic Signs From a Moving Car," pp. 287-794, 1991.

Seitz, P., "Using Local Orientational Information as Image Primitive for Robust Object Recognition," Visual Communications and Image Processing IV, 1989, pp. 1630-1639, vol. 1199.

Shekhar, C. et al, "Multisensor image registration by feature consensus," Pattern Recognition, vol. 32, No. 1, pp. 39-52 (1999).

Steger, C. "An Unbiased Detector of Curvilinear Structures," Technische Universitat Munchen, Technical Report FGBV-96-03, Jul. 1996, 32 pages.

Stevens, M. R. et al. "Precise Matching of 3-D Target Models to Multisensor Data," IEEE Transactions on Image Processing, vol. 6, No. 1, Jan. 1997, pp. 126-142.

Stimets, R. W. et al., "Rapid Recognition of Object Outlines in Reduced Resolution Images," Pattern Recognition, 1986, pp. 21-33, vol. 19, No. 1.

Streilein, A. et al. "Towards Automation in Architectural Photogrammetry: CAD Based 3D-Feature Extraction," ISPRS Journal of Photogrammetry and Remote Sensing, pp. 4-15.

Studholme et al., "An Overlap Invariant Entropy Measure of 3D Medical Image Alignment," Pattern Recognition, The Journal of the Pattern Recognition Society, Pattern Recognition 32, 71-86 (1999).

Studholme, C. "Measures of '3D Medical Image Alignment," PhD thesis, University of London (1997).

Suk, M. et al. "New Measures of Similarity Between Two Contours Based on Optimal Bivanate Transfomis," Computer Vision, Graphics and Image Processing, 1984, pp. 168-182.

Sullivan, G. D. et al, "Model-based Vehicle Detection and Classification Using Orthographic Approximations," Image and Vision Computing 15, 1997, pp. 649-654.

Sullivan, G. et al, "Model-based vehicle detection and classification tsing orthographic approximations," The University of Reading, 10 pages, 1996.

Sullivan, Neal T., "Semiconductor Pattern Overlay," Digital Equipment Corp. Advanced Semiconductor Development, Critical Dimension Metrology and Process Control, Critical Reviews, vol. CR52, 29 pages, 1996.

Tanaka, M. et al "Picture Assembly Using a Hierarchical Partial-Matching Technique," IEEE Transactions on Systems, Man, and Cybernetics. vol. SMC-8, No. 11, pp. 812-819 (Nov. 1978).

Tangelder. I. W. H. et al . "Measurement of Curved Objects Using Gradient Based Fitting and CSG Models," Commission V, Working Group 2, 8 pages, 1999.

Tanimoto, S. L., "Template latching in Pyramids," Computer Graphics and Image Processing, vol. 16, pp. 356-369 (1981).

Thevenaz, P, et al. "Optimization of Mutual Information for Multiresolution Image Registration," IEEE Transactions on Image Processing, vol. 9, No. 12, pp. 2083-2099 (Dec. 2000).

Tretter, D. et al, "A Multiseale Stochastic Image Model for Automated Inspection," IEEE Transactions on Image Processing, Dec. 1995, pp. 1641-1654, vol. 4, No. 12.

Turk, G. et al. "Zippered Polygon Meshes from Range Images," SIGGraph/ACM 1994, 8 pages.

Ullman, S. et al., "Recognition by Linear Combinations of Models," A.I. Memo No. 1152, Massachusetts Institute of Technology Artificial Intelligence Laboratory, 1989, 43 pages.

Ullman, S., "Aligning pictorial descriptions: An approach to object recognition," Cognation vol. 32, No. 3, pp. 193-254, Aug. 1989.

Umeyama, S., "Least-Squares Estimation of Transformation Parameters Between Two Point Patterns," IEEE Trans. on Pattern Analysis and Machine Intelligence, vol. 13, No. 2, pp. 119-152, 1994.

Valkenburg, R. J. et al.. "An Evaluation of Subpixel Feature Localisation Methods for Precision Measurement," SPIE vol. 2350, 1994, 10 pages.

Van Herk, M. et al. "Automatic three-dimensional correlation of CT-CT, CTMRI, and CT- SPECT using chamfer Matching," Medical Physics, vol. 21, No. 7, pp. 1163-1178 (1994).

Vosselman, G. "Interactive Alignment of Parameterised Object Models to Images,"Commission III, Working Group 3, 7 pages, 1998.

Wachter S. et al., "Tracking Persons in Monocular image Sequences," Computer Vision and Image Understanding, vol. 74, No. 3, Jun. 1999, pp. 174-192.

Wallack, Aaron, "Algorithms and. Techniques for Manufacturing," Ph.D. Thesis, University of California at Berkeley, 1995, Chapter 4, 93 pages.

Weese, J. et. al,"Gray-Value Based Registration of CT and MR Images by Maximization of Local Correlation," Medical Image Computing, and Computer-Assisted Intervention—MICCAI'98, pp. 656-664 (1998).

Wells et al,, "Multi-modal Volume Registration by Maximization of Mutual information," Medical Image Analysis (1996) vol. 1, No. 1, pp. 35-51.

Wells, "Statistical Approaches to Feature-Based Object Recognition," International Journal of Computer Vision, vol. 21, No. 112, pp. 63-98 (1997).

Wells, W., "Statistical Object Recognition," Ph.D, Thesis Submitted to the Massachusetts Institute of Technology, Department of Electrical Engineering and Computer Science, 1993, 177 pages.

Westling, M.D., et al., "Object recognition by hypothesis generation and reasoning about object interactions," 7 pages, 1996.

Whichello, A. et al, "Document Image Mosaicing," IEEE, 3 pages, 1998.

White et al., "Two Methods of Image Extension," Computer Vision, Graphics, and Image Processing 50, 342-352 (1990).

Wilson, S. "Vector morphology and conic neural networks," IEEE Trans. System Man Cybernet., vol. 19, No. 19, pp. 1.636-1644 (1989).

Wong, R. et al. "Sequential hierarchical scene matching," IEEE Trans. Comput., vol. C-27, pp. 359-366 (1978).

Worrall, A. D. et al, "Pose Refinement of Active Models Using Forces in 3D," 10 pages, 1994.

Wunsch, P. "Registration of CAD-Models to Images by Interative Inverse Perspective Matching," International Conference on Pattern Recognition, vol. 1, pp. 78-83 (1996).
Yamada, H, "Matching-Elastic Strztpc Matching by Multi-Angled Parallelism," Apr. 1990, pp. 553-561, vol. J73-D-II, No. 4.
Zhang, Z., "Iterative Point Matching for Registration of Free-Form Curves," INRIA, Rapports de 1992, Recherche No. 1658, Program Robotique, Image et. Vision, Unité De Recherche Inria-Sophia Antipolis (Mar. 1992).
ZHANG, Z. "On Local Matching of Free-Form Curves," British Machine Vision Conference, pp. 347-356 (1992).
Zhang, Z. "Iterative point matching for registration of free-form curves and surfaces," IJCV, vol. 13, No. 2, pp. 119-152 (1994).
Expert Report of David Forsyth Regarding invalidity of U.S. Patent Nos. 7,016,539 and 7,065,262, Certain Machine Vision Software, Machine Vision Systems, and Products Containing Same, ICT Investigation No. 337-TA-680, Feb. 19, 2010.
Rebuttal Expert Report of Dr. Berthold K.P. Horn, Certain Machine Vision Systems, Machine Vision Systems, and Products Containing Same, ICT Investigation No. 337-TA-680, Mar. 9, 2010.
Oct. 16, 2008 Amendment and Response, U.S. Appl. No. 11/023,177.
Oct. 16, 2008 Amendment and Response, U.S. Appl. No. 11/022,896.
Mar. 31, 2009 Amendment and Response, U.S. Appl. No. 11/022,896.
Oct. 29, 2009 Amendment and Response, U.S. Appl. No. 11/022,896.
Dec. 21, 2009 Amendment and Response, U.S. Appl. No. 11/022,896.
Apr. 10, 2009 Amendment and Response, U.S. Appl. No. 11/023,230.
Jan. 05, 2010 Amendment and Response, U.S. Appl. No. 11/023,230.
Jan. 22, 2009 Amendment and Response, U.S. Appl. No. 11/022,895.
Apr. 5, 2009 Amendment and Response, U.S. Appl. No. 11/022,895.
Nov. 13, 2009 Amendment and Response, U.S. Appl. No. 11/022,895.
Nov. 30, 2009 Amendment and Response.U.S. Appl. No. 11/022,895.
Dec. 31, 2008 Amendment and Response, U.S. Appl. No. 11/028,007.
Jun. 22, 2009 Amemdment and Response, U.S. Appl. No. 11/028,007.
Dec. 29, 2009 Amendment and Response, U.S. Appl. No. 11/028,007.
Jan. 5, 2010 Amendment and Response, U.S. Appl. No. 11/029,116.
Jan. 22, 2009 Amendment and Response, U.S. Appl. No. 11/029,116.
Jul. 9, 2009 Amendment and Response, U.S. Appl. No. 11/029,116.
Jan. 5, 2010 Amendment and Response, U.S. Appl. No. 11/028,008.
Apr. 10, 2009 Amendment and Response U.S. Appl. No. 11/028,008.
Jul. 30, 2008 Amendment and. Response, U.S. Appl. No. 11/028,353.
Feb. 12, 2008 Amendment and Response, U.S. Appl. No. 11/028,353.
Feb. 25, 2009 Amendment and Response U.S. Appl. No. 11/028,353.
Sep. 24, 2009 Amendment and Response, U.S. Appl. No. 11/028,353.
Mar. 2, 2009 Amendment and Response; U.S. Appl. No. 11/028,996.
Aug. 13, 2009 Amendment and Response, U.S. Appl. No. 11/026,003.
Mar. 19, 2009 Amendment and Response, U.S. Appl. No. 11/028,255.
Dec. 31, 2008 Amendment and Response, U.S. Appl. No. 11/027,962.
Nov. 3, 2009 Amendment and Response, U.S. Appl. No. 11/027,962.
Nov. 30, 2008 Amendment and Response, U.S. Appl. No. 11/027,962.
Apr. 7, 2009 Amendment and Response, U.S. Appl. No. 11/027,962.
Mar. 19, 2009 Amendmentandl Response. U.S. Appl. No. 11/028,076.
Dec. 15, 2009 Amendment and Response, U.S. Appl. No. 11/028,076.
Sep. 24, 2009 Amendment and Response, U.S. Appl. No. 11/028,076.
Mar. 2, 2009 Amendment and Response, U.S. Appl. No. 11/027,963.
Mar. 2, 2009 Amendment and Response, U.S. Appl. No. 11/029,104.
Jul. 27, 2009 Amendment and Response, U.S. Appl. No. 11/029,104.
Oct. 19, 2007 Amendment and Response, U.S. Appl. No. 10/625,201.
May 31, 2007 Amendment and Response, U.S. Appl. No. 10/625,201.
Jun. 3, 2009 Amendment and Response, U.S. Appl. No. 10/625,201.
Jun. 30, 2008 Amendment and Response, U.S. Appl. No. 11/670,199.
Oct. 13, 2009 Amendment and Response, U.S. Appl. No. 11/670,199.
Apr. 29, 2009 Amendment and Response, U.S, Appl. No. 11/670,199.
Feb. 16, 2010 Appeal Brief, U.S. Appl. No. 10/949,530.
Dec. 27, 2007 Amendment and Response, U.S. Appl. No. 11/949,530.
Jun. 13, 2008 Amendment and. Response, U.S. Appl. No. 10/949,530.
Feb. 6, 2009 Amendment and Response, U.S. Appl. No. 10,/949,530.
Jul. 19, 2007 Amendment and Response, U.S. Appl. No. 10/949,530.
Feb. 5, 2008 Submission of Translation to German Patent Reference DE 4406020, U.S. Appl. No. 10/625,201.
U.S. International Trade Commission, in the matter of Certain Machine Vision Software, Machine Vision Systems, and Products Containing Same, Motion of MVTEC SOFTWARE GMBH for Summary Determination of Unpatentability of the 539, '262, and '112 Patents under 35 U.S.C. § 101, Jan. 8, 2010.
U.S. International Trade Commission, in the matter of Certain Machine Vision Software, Machine Vision Systems, and Products Containing Same, Memorandum in Opposition to Respondent MVTEC's Motion for Summary Determination Unpatentability of the 539, '262, and '112 Patents under 35 U.S.C. § 101, Feb. 4, 2010.
U.S. International Trade Commission, in the matter of Certain Machine Vision Software, Machine Vision Systems, and Products Containing Same, Commission Investigative Staff'S Response to MVTEC Software Gmbh'S Motion for Summary Determination of Unpatentability Under § 101, Feb. 4, 2010.
U.S. International Trade Commission, in the matter of Certain Machine Vision Software, Machine Vision Systems, and Products Containing Same, Initial Determination, Administrative Law Judge, Carl C. Charneski, Jul. 16, 2010.
U.S. International Trade Commission, in the matter of Certain Machine Vision Software, Machine Vision Systems, and Products Containing Same, Hearing Transcripts, May 3, 2010, May 4, 2010, 515/2010. May 6, 2010, May 7, 2010, May 10, 2010, May 11, 2010, May 12, 2010.
U.S. International Trade Commission, in the matter of Certain Machine Vision Software, Machine Vision Systems, and.Products Containing Same, Complainants Cognex Corporation and Cognex Technology & Investment Corporation'S Supplemental Brief Regarding the Patent-Eligibility of the Asserted Claims, Jul. 2, 2010. .
U.S. International Trade Commission, in the matter of Certain Machine Vision Software, Machine Vision Systems, and Products Containing Same, Respondents' Memorandum Regarding the Supreme Court'S Opinion in Bilski V. Kappos, Jul. 2, 2010.
U.S. International Trade Commission, in the matter of Certain Machine Vision Software, Machine Vision Systems, and Products Containing Same, Complainants Cognex Corporation and Cognex Technology & Investment Corporation'S Petition for Review of the Initial Determination on Violation of Section 337 and Recommended Determination on Remedy and Bonding and Summary Pursuant to 19 C.F.R. § 210.43(b), Aug. 2, 2010.
U.S. International Trade Commission, in the matter of Certain Machine Vision Software, Machine Vision Systems, and Products Containing Same, Respondents' Contingent Petition for Review of Initial Determination Finding No Violation of Section 337, Aug. 2, 2010.
U.S. International Trade Commission, in the matter of Certain Machine Vision Software, Machine Vision Systems, and.Products Containing Same, Complainants Cognex Corporation and Cognex Technology & Investment Corporation'S Response to Respondents' and Staff'S Petitions for Review, Aug. 10, 2010.
U.S. International Trade Commission, in the matter of Certain Machine Vision Software, Machine Vision Systems, and Products Containing Same, Respondents' Response to Complainants' Petition for Review of Initial Determination Finding No Violation of Section 337, Aug. 10, 2010.
U.S. International Trade Commission, in the matter of Certain Machine Vision Software, Machine Vision Systems, and Products Containing Same, Unopposed Motion of Respondent Mvtec Software Gmbh for Leave to File a Reply in Support of Its Motion for Summary Determination of Unpatentability of the '539, '262, and '112 Patents Under 35 U.S.C. § 101, Feb. 12, 2010.

Response to Office Action, U.S. Appl. No. 11/028,255, Feb. 12, 2010.
Notice of Allowance, U.S. Appl. No. 11/028,255, May 17, 2010.
Final Office Action, U.S. Appl. No. 11/027,962 Feb. 19, 2010.
Response to Office Action, U.S. Appl. No. 11/027,962, Aug. 5, 2010.
Notice of Allowance, U.S. Appl. No. 11/027,962, Aug. 17, 2010.
Appeal Brief, U.S. Appl. No. 11/029,104, Apr. 27, 2010.
Notice of Allowance, U.S. Appl. No. 11/029,104, Aug. 4, 2010.
Non-Final Office Action, U.S. Appl. No. 11/022,895, Aug. 3, 2010.
Final Office Action, U.S. Appl. No. 11/028,007, Mar. 18, 2010.
Final Office Action, U.S. Appl. No. 11/028,008, Mar. 19, 2010.
Non-Final Office Action, U.S. Appl. No. 11/028,353, Mar. 12, 2010.
Response to non-Final Office Action, U.S. Appl. No. 11/026,004, Mar. 19, 2010.
Notice of Allowance, U.S. Appl. No. 11/026,004, Apr. 3, 2010.
In the Matter of Certain Machine Vision Software, Machine Vision Systems, and Products Containing Same, Investigation No. 337-TA-680, United States International Trade Commission Washington, D.C. 20436, Notice of Commission Decision to Modify a Final Initial Determination and to Terminate the Investigation With a Finding of no. Violation of Section 337, Nov. 16, 2010.
In the Matter of Certain Machine Vision Software, Machine Vision Systems, and Products Containing Same, Investigation No. 337-TA-680, United States International Trade Commission Washington, D.C. 20436, Commission Opinion, Nov. 16, 2010.
Marchand, Eric, et al, A 2D-3D model-based approach to real-time visual tracking, Image and Vision Computing vol. 19, Issue 13, Nov. 2001.
Amendment and Response to Final Office Action, U.S. Appl. No. 11/028,008, dated Sep. 20, 2010.
Notice of Allowance, U.S. Appl. No. 11/028,076, dated Feb. 14, 2011.
Non-Final Office Action Response, U.S. Appl. No. 11/022,895, Jan. 3, 2011.
Non-Final Office Action Response, U.S. Appl. No. 11/028,353, Sep. 13, 2010.
Chew, et al., Geometric Pattern Matching under Euclidean Motion, Computational Geometry vol. 7, Issues 1-2, Jan. 1997, pp. 113-124, 1997 Published by Elsevier Science B.V.
"Non-Final Office Action, U.S. Appl. No. 11/023,177 dated Jan. 26, 2009".
"Non-Final Office Action, U.S. Appl. No. 11/023,230, dated Aug. 6, 2009".
"Response to Non-Final Office Action, U.S. Appl. No. 11/023,230, dated Aug. 6 filed Jan. 5, 2010".
"Notice of Allowance, U.S. Appl. No. 11/023,230, dated Mar. 11, 2010".
"Non-Final Office Action, U.S. Appl. No. 11/022,895, dated Aug. 3, 2010".
"Response to Non-Final Office Action, U.S. Appl. No. 11/022,895, dated Aug. 3, 2010, filed Jan. 3, 2011".
"Response to Final Office Action, U.S. Appl. No. 11/028,007, dated Mar. 18, 2010, filed Sep. 20, 2010".
"Notice of Allowance, U.S. Appl. No. 11/028,007, dated Aug. 12, 2011 (C98-035CON5)".
"Non-Final Office Action, U.S. Appl. No. 11/029,116, dated Oct. 7, 2009".
"Response to Non-Final Office Action, U.S. Appl. No. 11/029,116, dated Oct. 7, 2009, filed Jan. 5, 2010".
"Notice of Allowance, U.S. Appl. No. 11/029,116, dated Feb. 22, 2010".
"Non-Final Office Action, U.S. Appl. No. 11/028,008, dated Aug. 6, 2009".
"Response to Non-Final Office Action, U.S. Appl. No. 11/028,008, dated Aug. 6, 2009, filed Jan. 5, 2010".
"Notice of Allowance, U.S. Appl. No. 11/028,008, dated Oct. 5, 2010".
"Notice of Allowance, U.S. Appl. No. 11/027,962, dated Nov. 30, 2010".
"Notice of Allowance, U.S. Appl. No.11/028,076, dated Feb. 14, 2010".
"Notice of Allowance, U.S. Appl. No. 11/029,104, dated Jun. 29, 2010".
Prosecution History of US Patent No. 6,850,646, issued Feb. 1, 2005.
Prosecution History of US Patent Nol. 7016539, issued Mar. 21, 2006.
Prosecution History of US Patent No. 6856698, issued Feb. 15, 2005.
Prosecution History of US Patent No. 7065262, Issued Jun. 20, 2006.
Request for Expartes Reexam Control No. 95/001,177, Patent No. 6,850,646 (Claim charts Exhibits Aa, Bb, P-Z), Submitted in 14 parts, Jun. 22, 2009.
Request for Expartes Reexam Control No. 90/010514, Patent No. 7016539 (Claim charts Exhibits AA, BB, R-X), submitted in 10 parts, Jun. 22, 2009.
Request for Expartes Reexam Control No. 95/001,182, Patent No. 6856698 (Claim charts Exhibits J-M), Submitted in 5 parts, Jun. 22, 2009.
Request for Expartes Reexam Control No. 95/001, 181, Patent No. 7065262 (Claim charts Exhibits H-L), Submitted in 6 parts.
Araujo, et al., "A Fully Projective Formulation for Lowe's Tracking Algorithm", The University of Rochester Computer Science Department, pp. 1-41, Nov. 1996.
Besl, et al., "A Method for Registration of 3D Shapes", IEEE Transactions on Pattern Analysis and Machine Intelligence, Feb. 1992, pp. 239-256, vol. 14, No. 2.
Dementhon, et al., "Model-Based Object Pose in 25 Lines of Code", International Journal of Computer Vision, 1995, pp. 123-141, Kluwer Academic Publishers, Boston, MA.
Lamdan, et al., "Affine Invariant Model-Based Object Recognition", IEEE Transactions on Robotics and Automation, Oct. 1990, pp. 578-589, vol. 6, No. 5.
Suk, et al., "New Measures of Similarity Between Two Contours Based on Optimal Bivarate Transforms", Computer Vision, Graphics and Image Processing, 1984, pp. 168-182.
Wunsch, et al., "Registration of CAD-Models to Images by Iterative Inverse Perspective Matching", German Aerospace Research Establishment, pp. 78-83, 1996.
Seitz, Peter "Using Local Orientational Information as Image Primitive for Robust Object Recognition", Visual Communications and Image Processing IV, 1989, pp. 1630-1639, vol. 1199.
Han, et al., "An Edge-Based Block Matching Technique for Video Motion", Image Processing Algorithms and Techniques II, 1991, pp. 395-408, vol. 1452.
Olson, et al., "Automatic Target Recognition by Matching Oriented Edge Pixels", IEEE Transactions on Image Processing, Jan. 1997, pp. 103-113, vol. 6, No. 1.
Hashimoto, et al., "High-Speed Template Matching Algorithm Using Imformation of Contour Points", Systems and Computers in Japan, 1992, pp. 78-87, vol. 23, No. 9.
Yamada, Hiromitsu "Map Matching-Elastic Shape Matching by Multi-Angled Parallelism", Apr. 1990, pp. 553-561, vol. J73-D-II, No. 4.
Pratt, William K., "Digital Image Processing", Sun Microsystems, Inc., pp. 651-673, 1991.
Anuta, Paul E., "Spatial Registration of Multispectral and Multitemporal Digital Imagery Using Fast Fourier Transform Techniques", IEEE Transactions on Geoscience Electronics, Oct. 1970, pp. 353-368, vol. GE-8, No. 4.
Nevu, et al., "Two-Dimensional Objet Recognition Using Multiresolution Models, Computer Vision, Graphics, and Image Processing, 1986, pp. 52-65".
Alexander, et al., "The Registration of MR Images Using Multiscale Robust Methods", Magnetic Resonance Imaging, 1996, pp. 453-468, vol. 5.
"On Appeal from the US International Trade Commission Investigation No.337-TA-680", *Cognex Corp. and Cognex Technology & Investment Corporation, Appellants*, v. *International Trade Commission, Appellee, and MvTec Software Gmbh and MvTec, LLC.*, Intervenors, Non-Confidential Reply Brief for Complainant-Appellants, (Aug. 22, 2011).
"On Appeal from the US International Trade Commission Investigation No. 337-.TA-680", *Cognex Corp. and Cognex Technology & Investment Corporation, Appellants*, v. *International Trade Commission, Appellee, and MvTec Software GMBH and MvTec, LLC.*, Intervenors, Non-Confidential Brief of Intervenors MvTec Software GMBH and MvTec, LLC, (Aug. 3, 2011).

"On Appeal from the US International Trade Commission Investigation No. 337-.TA-680", *Cognex Corp. and Cognex Technology & Investment Corporation, Appellants,* v.*International Trade Commission, Appellee, and MvTec Software.GMBH and MvTec, LLC.,* Intervenors, Non-Confidential Brief for.Appellants, (May 12, 2011), Submitted in 2 parts.

"On Appeal from the US International Trade Commission Investigation No. 337-.TA-680", *Cognex Corp. and Cognex Technology & Investment Corporation, Appellants,* v. *International Trade Commission, Appellee, and MvTec Software GMBH and MvTec, LLC.,* Intervenors, Non-Confidential Brief of.Appellee, (Aug. 3, 2011).

Description of AcuFinder boundary, at least as early as Mar. 31, 1997.

Exhibits Y and Z of Corrected Request for Request for Expartes Reexam Control No. 90/010514, Patent No. 7016539 Submitted in 2 parts, Jun. 22, 2009.

Exhibits N—S of Corrected Request for Interparties Reexam Control No. 95/001,182, Patent No. 6856698 Submitted in 6 parts, Jun. 22, 2009.

Cognex Products on Sale as of one year before filing for US7016539, Jul. 12, 1997.

Cognex Corporation, description of Overlap in Cognex search tool and description of Overlap in Cnlpas Tool as of Jul. 12, 1997.

Exhibits Y and Z of Corrected Request for Request for Expartes Reexam Control No. 90/010514, Patent No. 7016539 (Jun. 22, 2009) Submitted in 2 parts.

Exhibits N—S of Corrected Request for Interparties Reexam Control No. 95/001,182, Patent No. 6856698 (Jun. 10, 2009) Submitted in 6 parts.

* cited by examiner

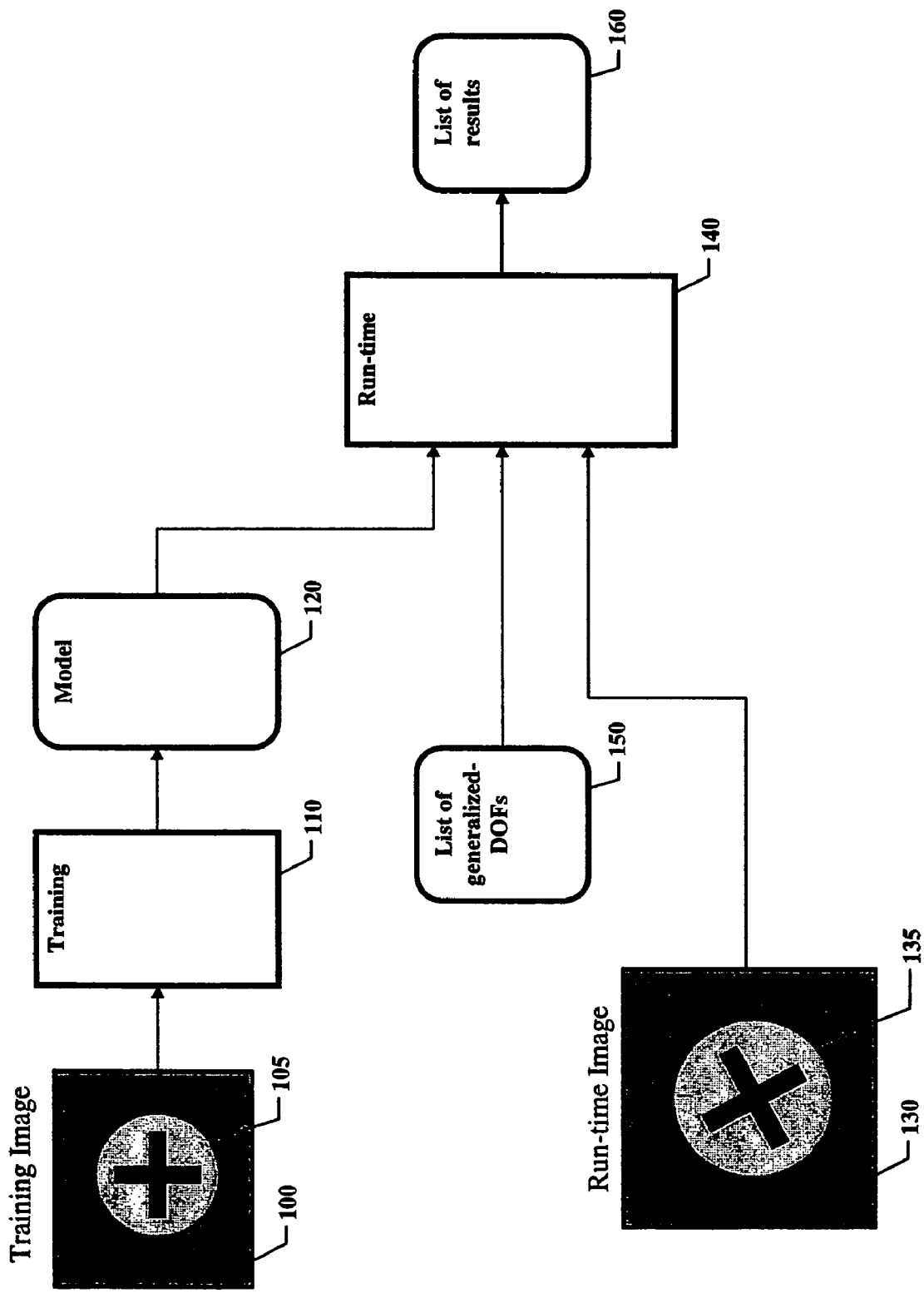
Figure 1 — Block diagram

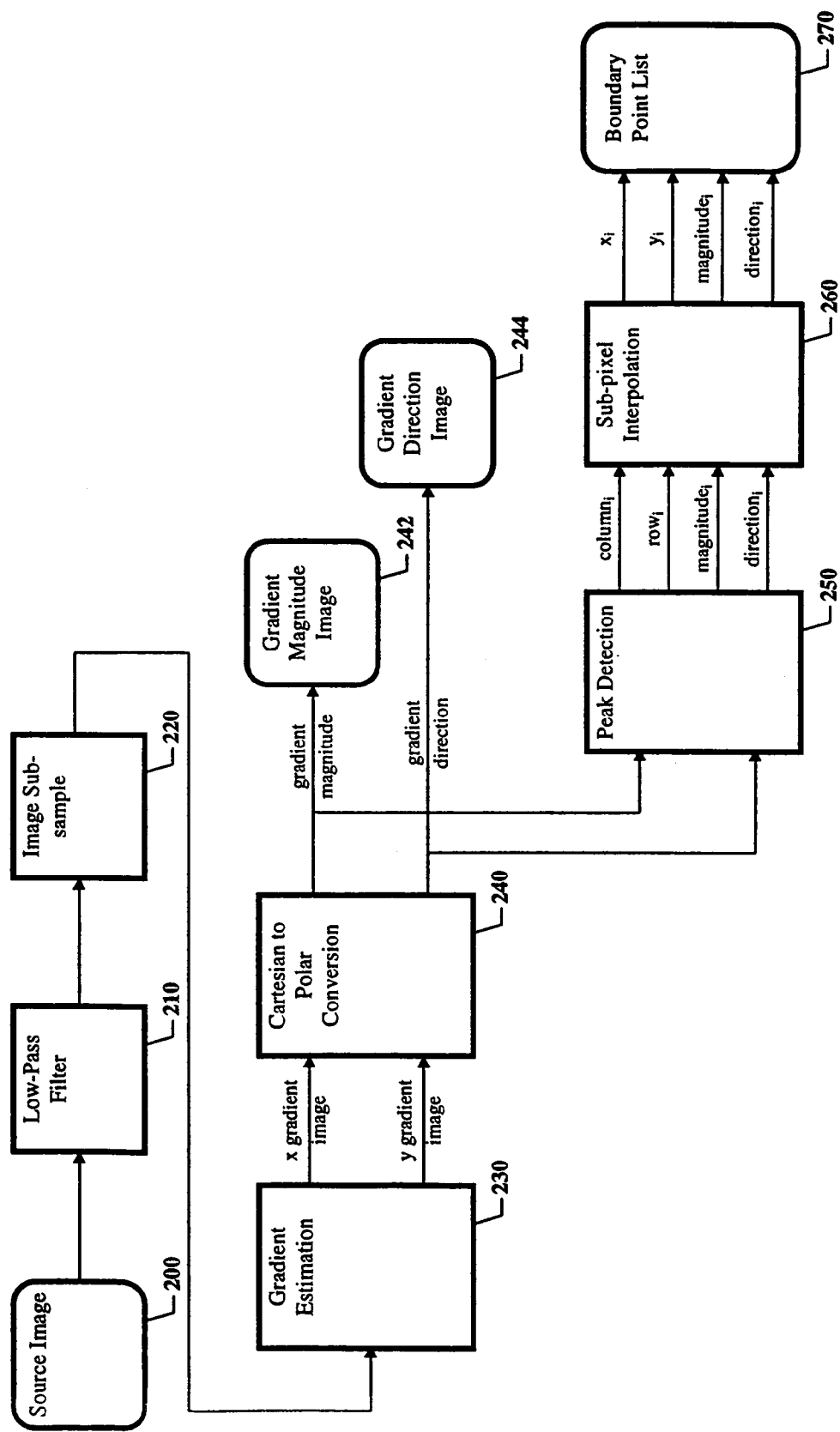
Figure 2 — Granularity control, gradient, and boundary detection

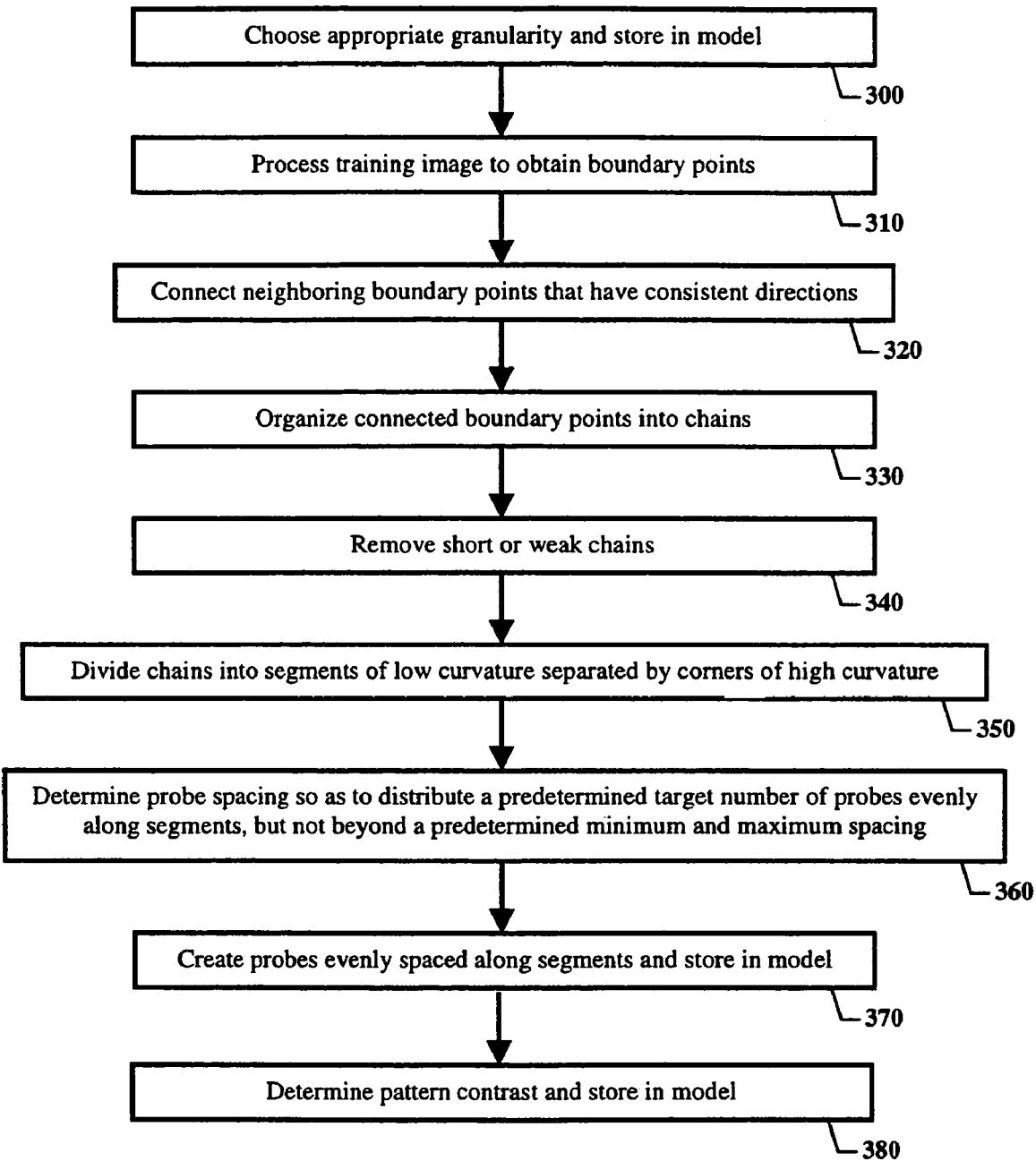
Figure 3 — Training flow chart

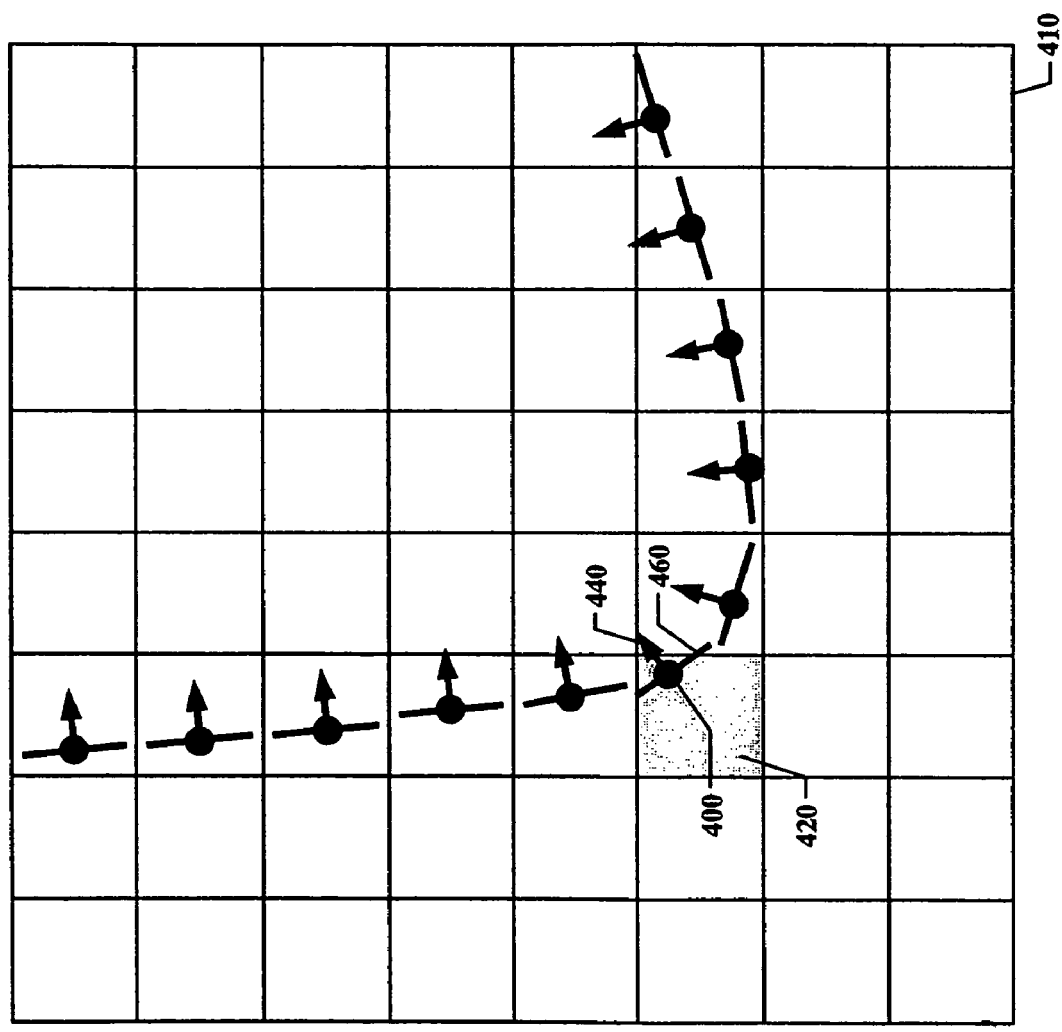
Figure 4 — Boundary points

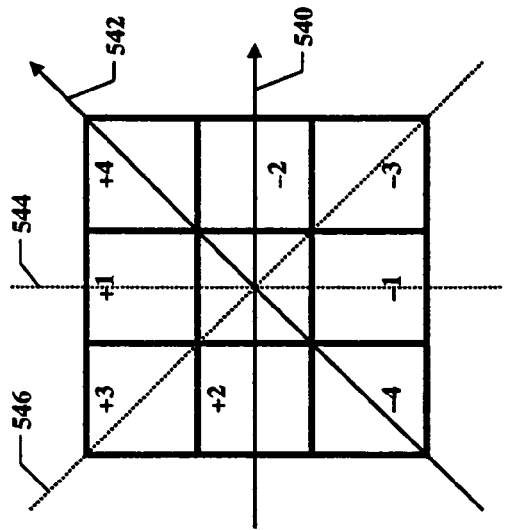
Figure 5b — Neighbor zones 1
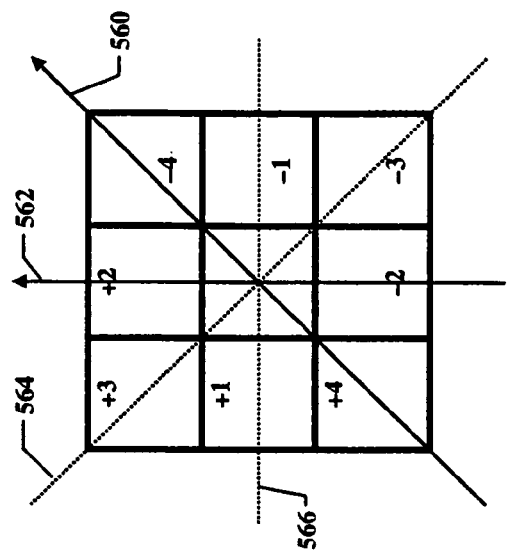
Figure 5c — Neighbor zones 2
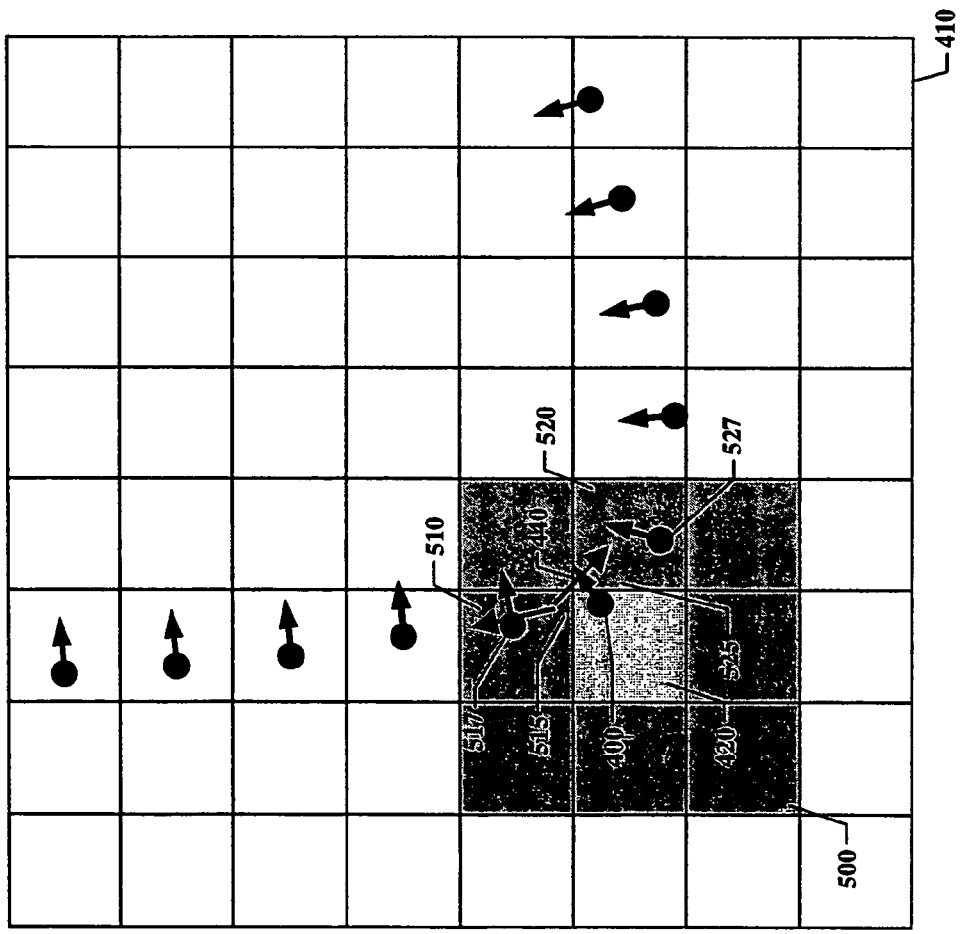
Figure 5a — Boundary point connecting

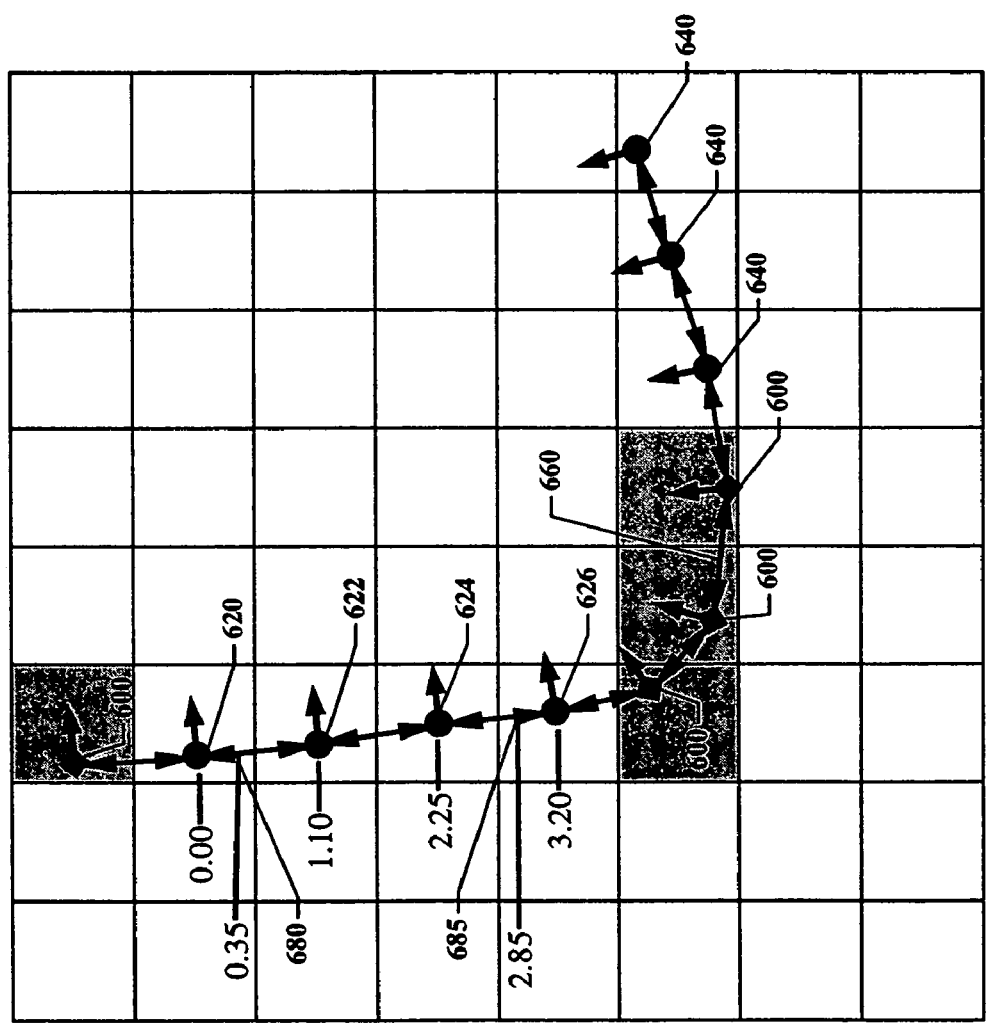
Figure 6 —Chain segmentation and probe selection

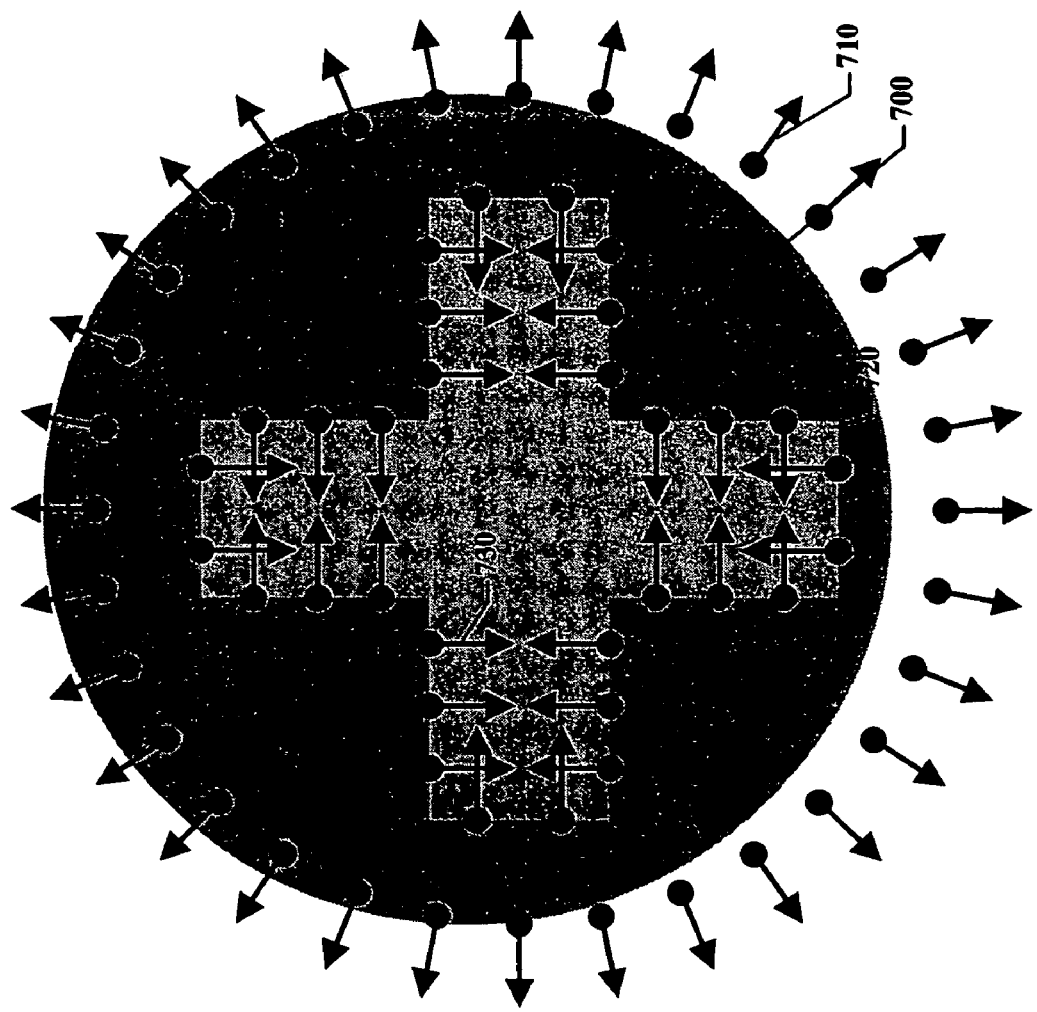
Figure 7 — Probe placement

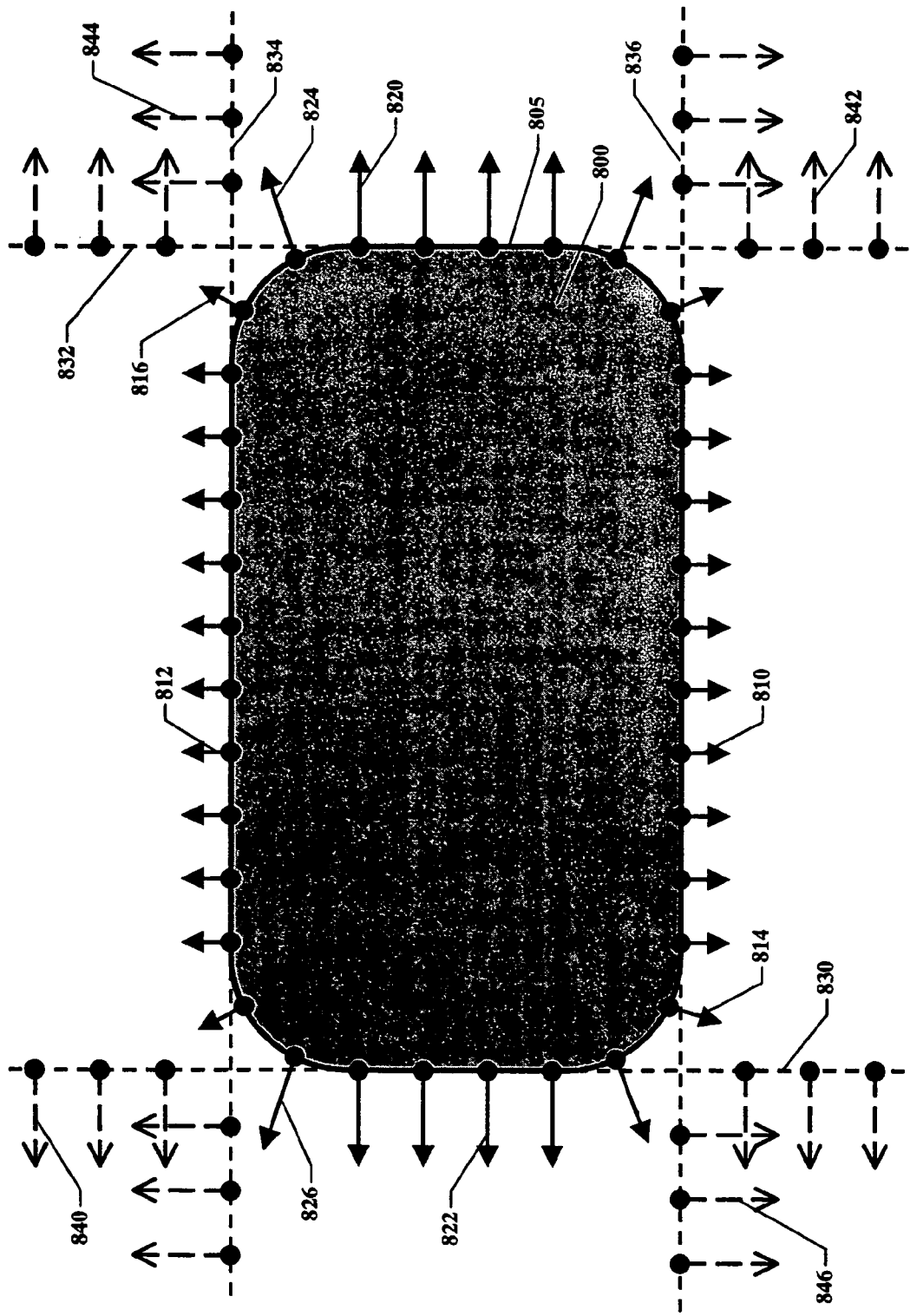
Figure 8 — Probe placement for synthetic training of rounded rectangle

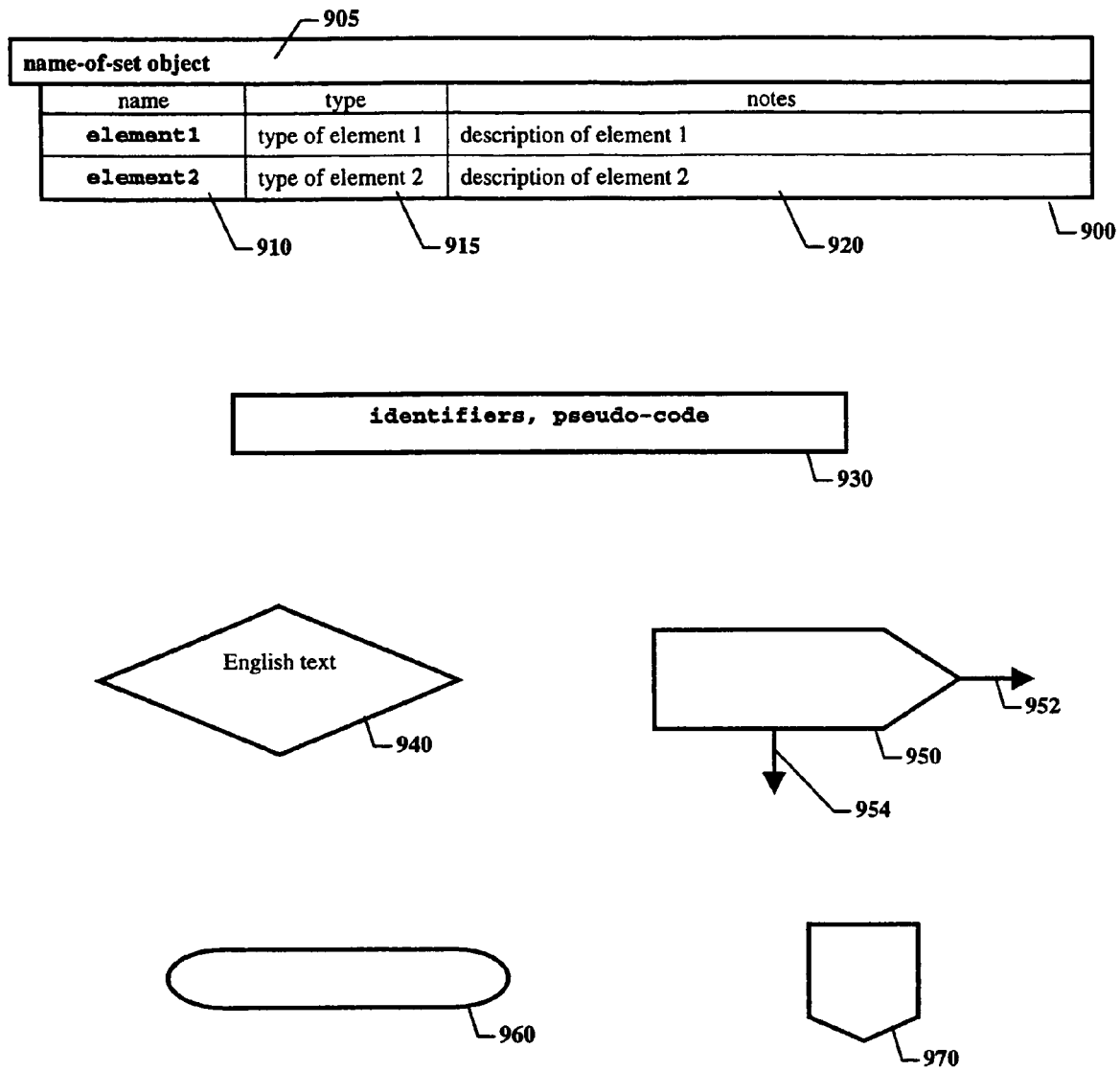
Figure 9 — Typographic and symbolic conventions

| model object | | |
|---|---|---|
| name | type | notes |
| probes | list of probe objects | probes created by training step 370 |
| granularity | real number | granularity chosen during training step 300 |
| contrast | real number | contrast of training pattern determined in training step 380 |

1000 — probes
1010 — granularity
1020 — contrast
└─ 120

Figure 10 — Model

| probe object | | |
|---|---|---|
| name | type | notes |
| position | real 2-vector | probe position, pattern coords |
| direction | binary angle | expected gradient direction, pattern coords |
| weight | real number | probe weight, positive or negative |

1100 — position
1110 — direction
1120 — weight
└─ 1190

Figure 11a — Probe

| compiled-probe object | | |
|---|---|---|
| name | type | notes |
| offset | integer | mapped image pixel address offset |
| direction | binary angle | mapped gradient direction |
| weight | integer | relative weight |

1130 — offset
1140 — direction
1150 — weight
└─ 1195

Figure 11b — Compiled probe

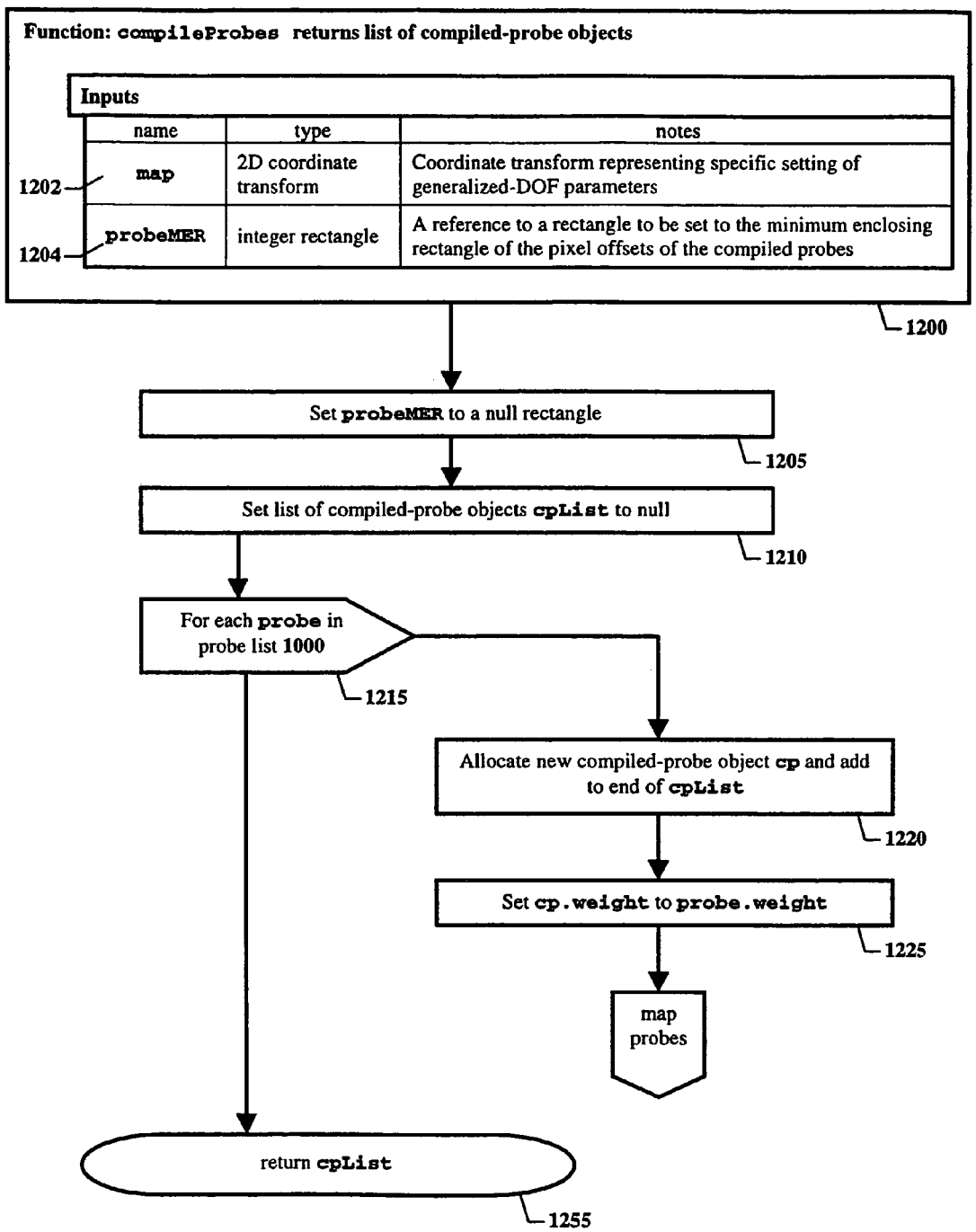
Figure 12a — Probe compiler

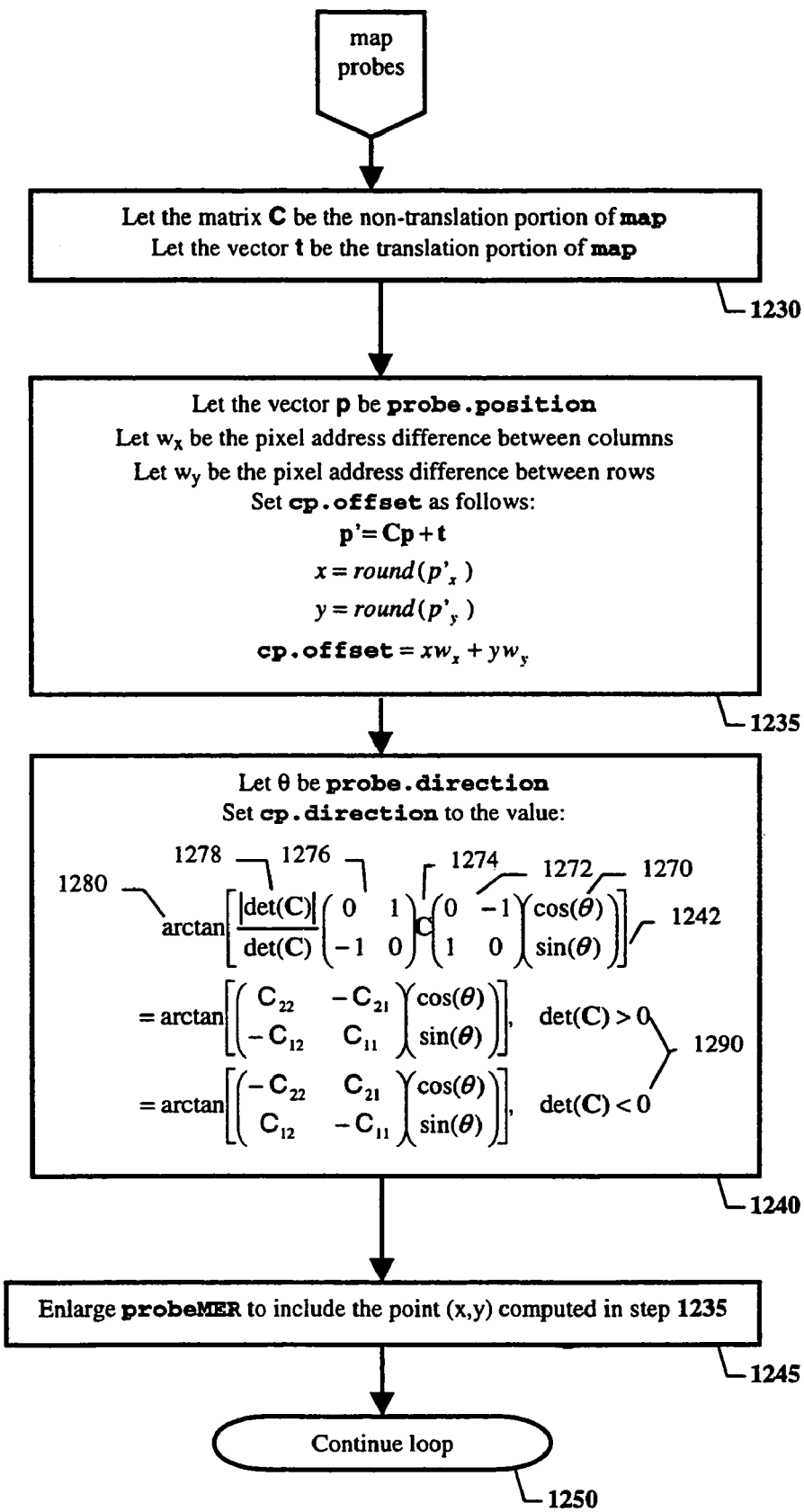
Figure 12b — Probe compiler continued

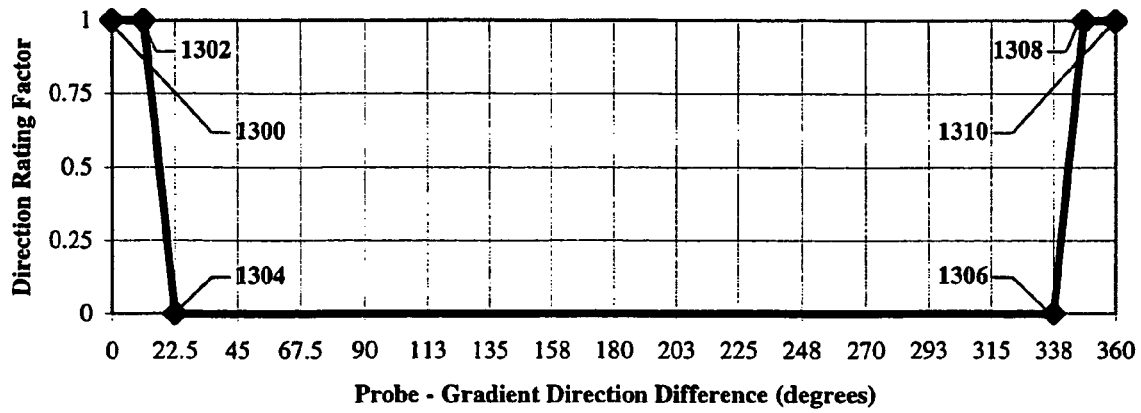
Figure 13a — Direction rating factor function, consider polarity case
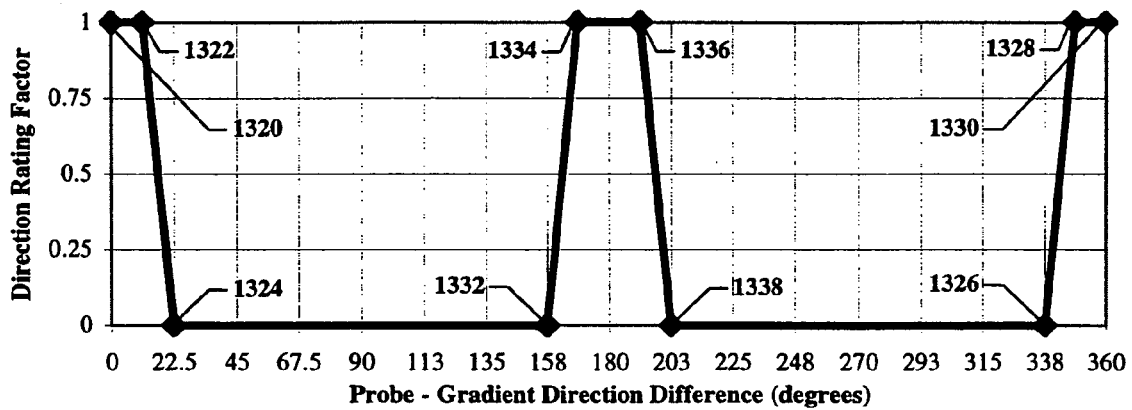
Figure 13b — Direction rating factor function, ignore polarity case
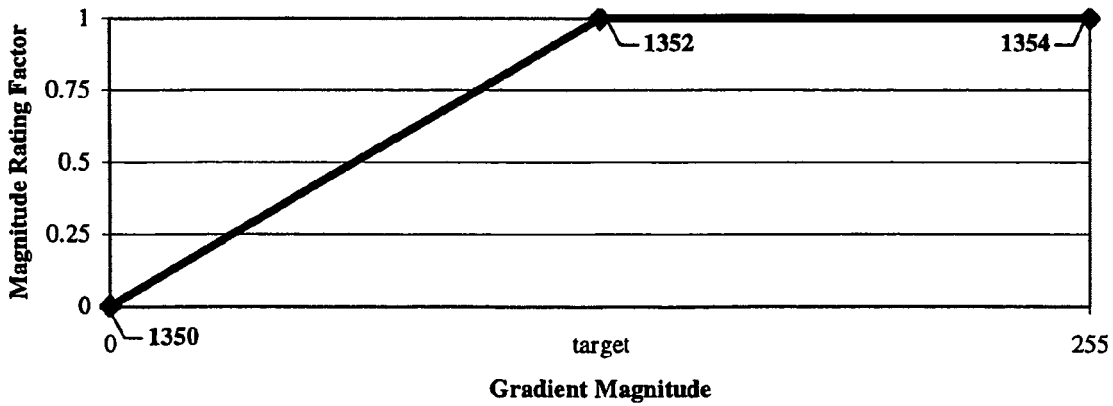
Figure 13c — Magnitude rating factor function

| generalized-DOF object | | |
|---|---|---|
| name | type | notes |
| low | real number | requested low end of search range |
| high | real number | requested high end of search range |
| maxStepSize | real number | maximum step size |
| dupRange | real number | duplicate detection range |
| start | real number | actual low end of search range |
| numCoarseSteps | integer | number of coarse steps from start to stop |
| stepSize | real number | actual step size, derived from maxStepSize and parameter range |
| cycle | real number | if DOF is cyclic, value for one cycle; else 0 |
| mapper | 2D-coordinate-transform-valued function of real argument | convert DOF parameter to corresponding transform |
| stepSizeMatrix | 2x2-matrix | matrix for computing max step size |
| stepSizeFactor | real number | conversion factor for computing max step size |
| scaleFactor | real-valued function | "average" scale factor based on settings of low and high |

Figure 14 — Generalized-DOF

| | parameter | cycle | mapper(x) | stepSizeMatrix | stepSizeFactor | scaleFactor() |
|---|---|---|---|---|---|---|
| 1540 — rotation | angle, degrees | 360 | $\begin{pmatrix} \cos(x) & -\sin(x) \\ \sin(x) & \cos(x) \end{pmatrix}$ | $\begin{pmatrix} 0 & 1 \\ -1 & 0 \end{pmatrix}$ | $180/\pi$ | 1 |
| 1545 — shear | angle, degrees | 360 | $\begin{pmatrix} 1 & -\tan(x) \\ 0 & 1 \end{pmatrix}$ | $\begin{pmatrix} 0 & 1 \\ 0 & 0 \end{pmatrix}$ | $180/\pi$ | 1 |
| 1550 — log size | log scale factor | 0 | $\begin{pmatrix} e^x & 0 \\ 0 & e^x \end{pmatrix}$ | $\begin{pmatrix} 1 & 0 \\ 0 & 1 \end{pmatrix}$ | 1 | $e^{\frac{low+high}{2}}$ |
| 1555 — log x size | log scale factor | 0 | $\begin{pmatrix} e^x & 0 \\ 0 & 1 \end{pmatrix}$ | $\begin{pmatrix} 1 & 0 \\ 0 & 0 \end{pmatrix}$ | 1 | $e^{\frac{low+high}{4}}$ |
| 1560 — log y size | log scale factor | 0 | $\begin{pmatrix} 1 & 0 \\ 0 & e^x \end{pmatrix}$ | $\begin{pmatrix} 0 & 0 \\ 0 & 1 \end{pmatrix}$ | 1 | $e^{\frac{low+high}{4}}$ |
| 1565 — log aspect | log ratio y to x scale factor | 0 | $\begin{pmatrix} e^{-x/2} & 0 \\ 0 & e^{x/2} \end{pmatrix}$ | $\begin{pmatrix} 1/2 & 0 \\ 0 & -1/2 \end{pmatrix}$ | 1 | 1 |
| 1570 — size | scale factor | 0 | $\begin{pmatrix} x & 0 \\ 0 & x \end{pmatrix}$ | $\begin{pmatrix} 1 & 0 \\ 0 & 1 \end{pmatrix}$ | 1 | $\sqrt{low \cdot high}$ |
| 1575 — x size | scale factor | 0 | $\begin{pmatrix} x & 0 \\ 0 & 1 \end{pmatrix}$ | $\begin{pmatrix} 1 & 0 \\ 0 & 0 \end{pmatrix}$ | 1 | $\sqrt[4]{low \cdot high}$ |
| 1580 — y size | scale factor | 0 | $\begin{pmatrix} 1 & 0 \\ 0 & x \end{pmatrix}$ | $\begin{pmatrix} 0 & 0 \\ 0 & 1 \end{pmatrix}$ | 1 | $\sqrt[4]{low \cdot high}$ |
| 1585 — aspect | ratio y to x scale factor | 0 | $\begin{pmatrix} x^{-1/2} & 0 \\ 0 & x^{1/2} \end{pmatrix}$ | $\begin{pmatrix} 1/2 & 0 \\ 0 & -1/2 \end{pmatrix}$ | 1 | 1 |

Figure 15 — Data for specific generalized-DOFs

```
                            dofList
┌─────────────┐   ┌──────────┐   ┌──────────┐   ┌─────────────┐
│ log y size  │   │          │   │          │   │  rotation   │
│ (outermost  │→  │log x size│→  │ log size │→  │ (innermost  │
│    loop,    │   │          │   │          │   │    loop,    │
│  composed   │   │          │   │          │   │  composed   │
│   first)    │   │          │   │          │   │    last)    │
└─────────────┘   └──────────┘   └──────────┘   └─────────────┘
       └─1560         └─1555         └─1550          └─1540
                                                              └─150
```

Figure 16 — List of generalized-DOFs

| result object | | |
|---|---|---|
| name | type | notes |
| position | real 2-vector | probe origin at match position, image coords |
| probeMER | real rectangle | min. enclosing rectangle of probes at match position, image coords |
| score | real number | match score |
| contrast | real number | weighted median gradient magnitude under positive probes |
| DOFParameters | list of real numbers | DOF parameters at match pose |
| DOFIndices | list of integers | DOF step indices at match pose |
| Probe Ratings | list of real numbers | List of individual probe ratings $R_{mag} - R_{dir}$ from third match function $S_3$ |

1700 — position
1710 — probeMER
1720 — score
1730 — contrast
1740 — DOFParameters
1750 — DOFIndices
1760 — Probe Ratings
                                                              1790

Figure 17 — Result

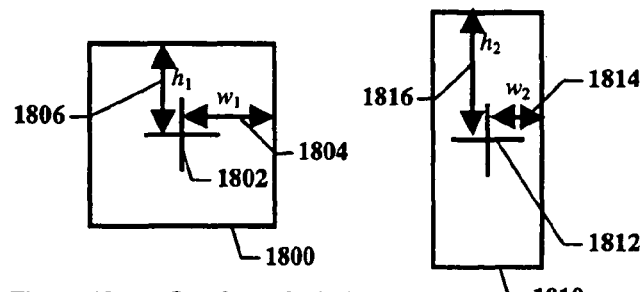
Figure 18a — Overlap calculation
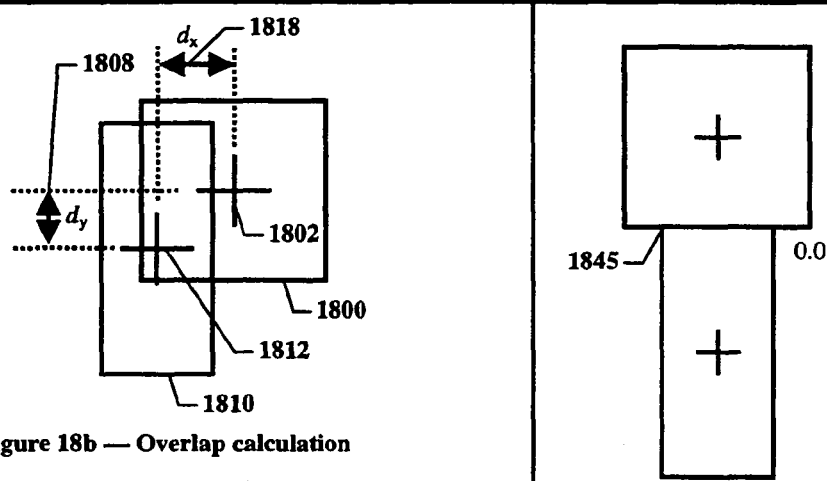
Figure 18b — Overlap calculation
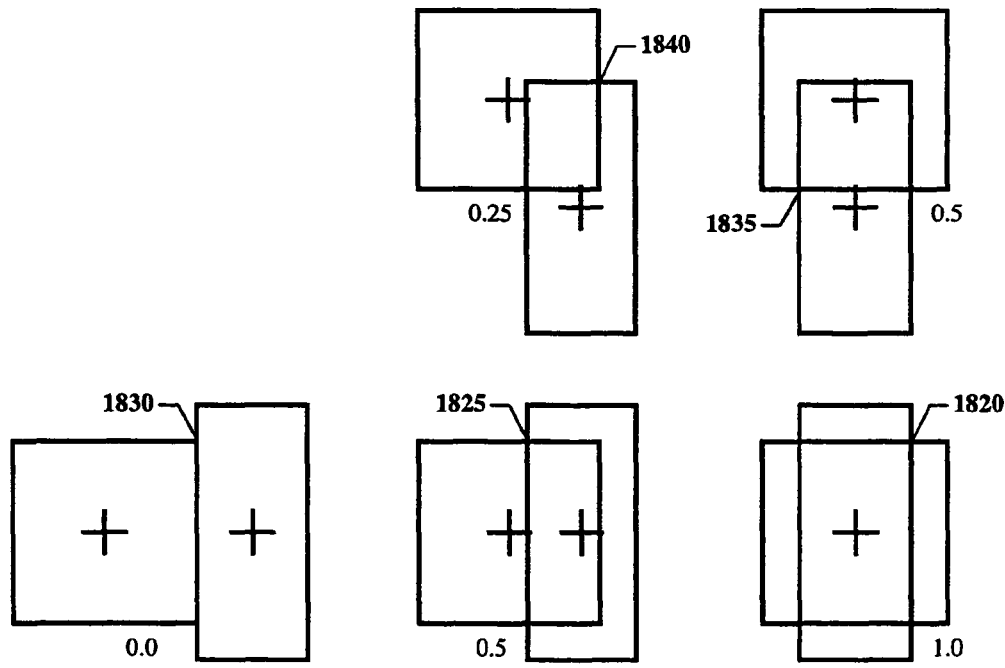
Figure 18c — Overlap examples

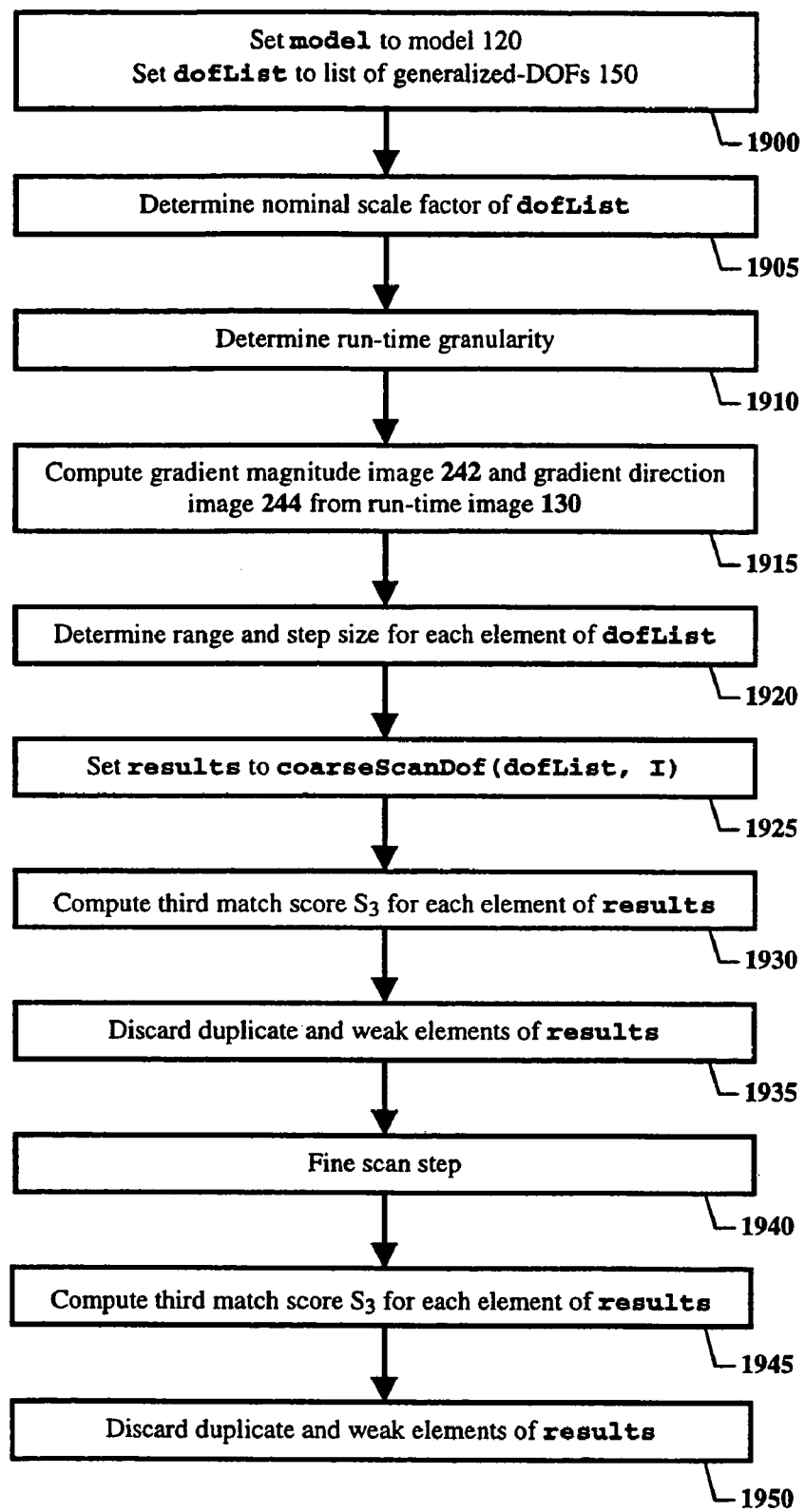
Figure 19 — Flow chart of run-time step 140

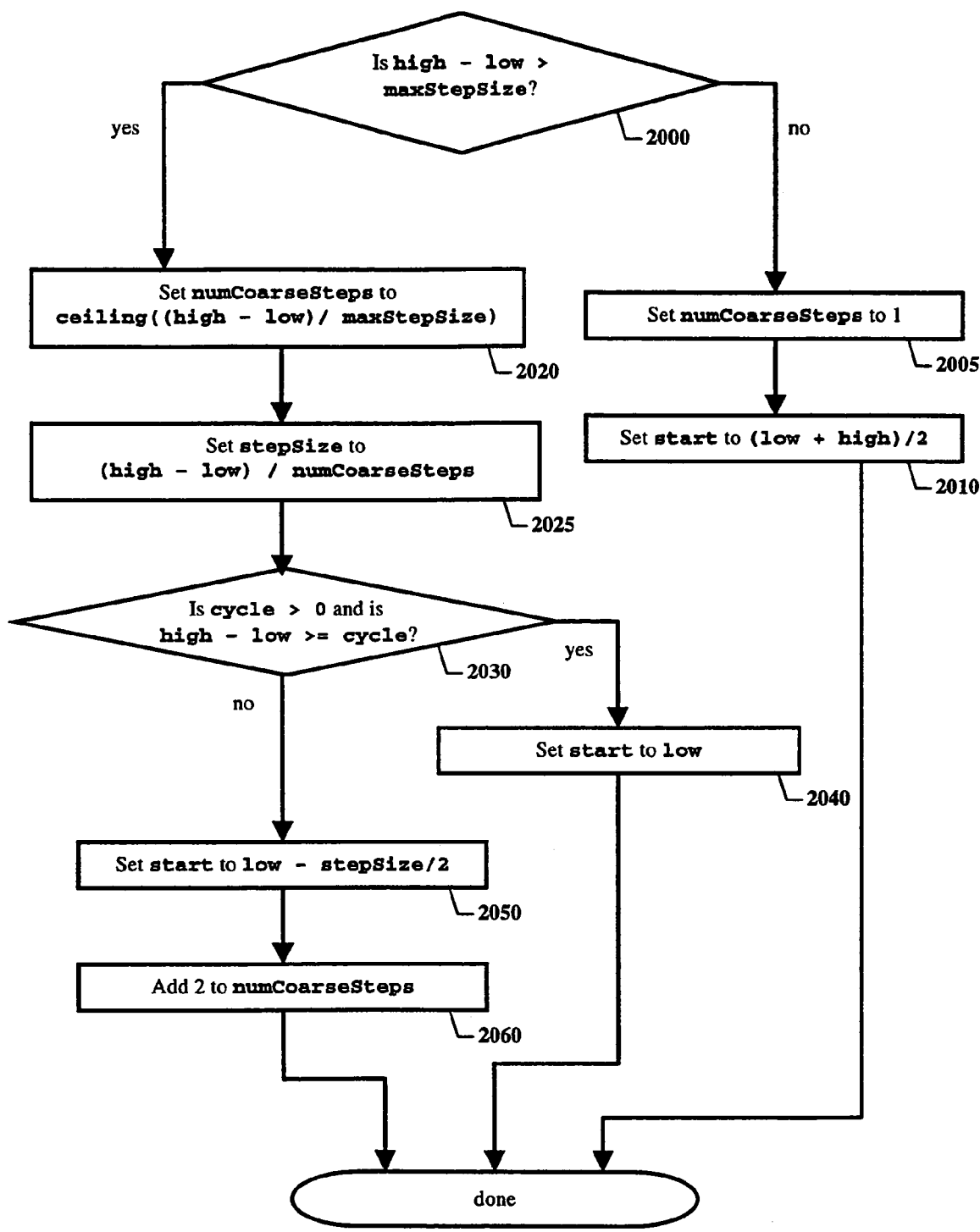
Figure 20 — Flow chart of portion of step 1920

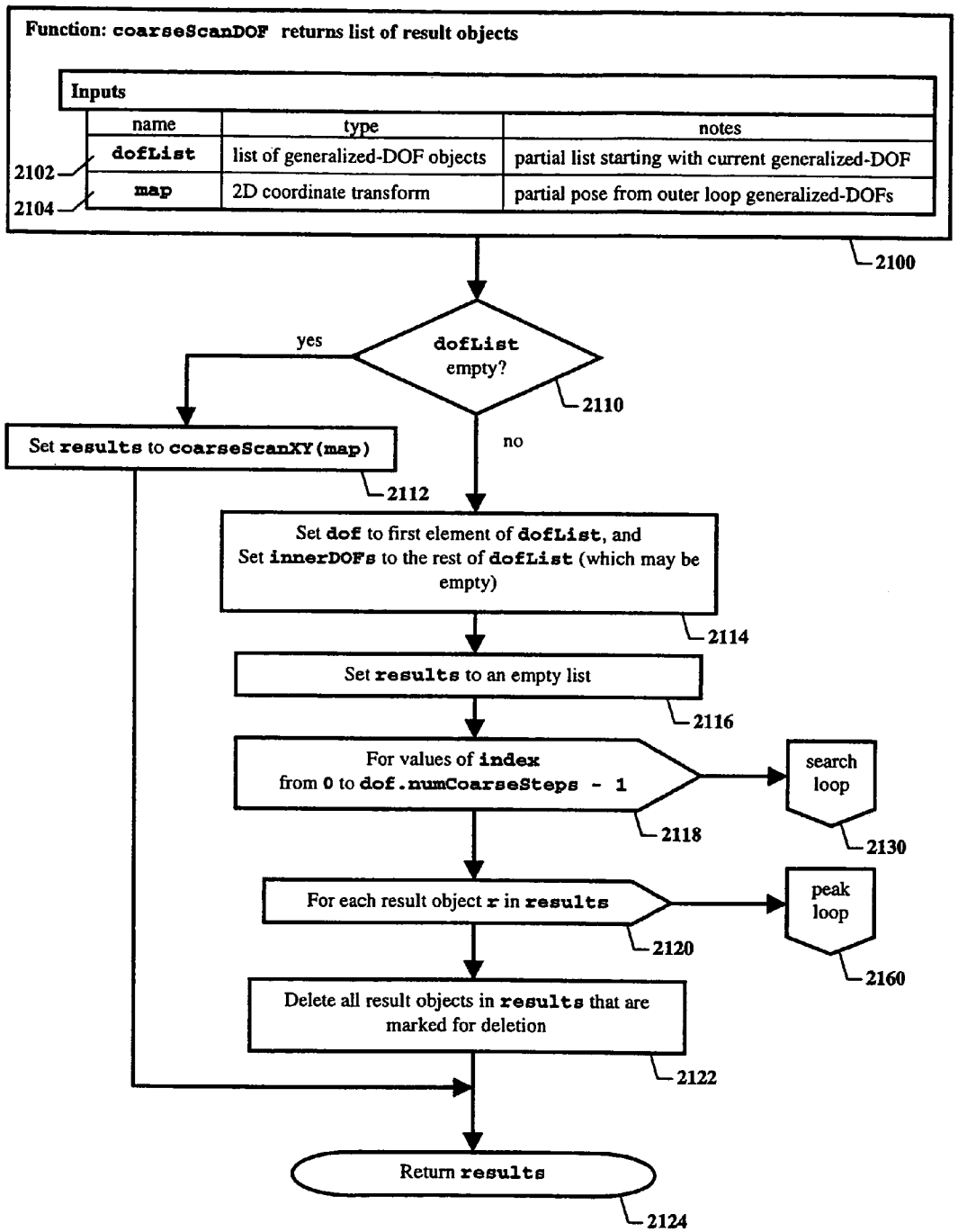
Figure 21a — Coarse scan generalized-DOF

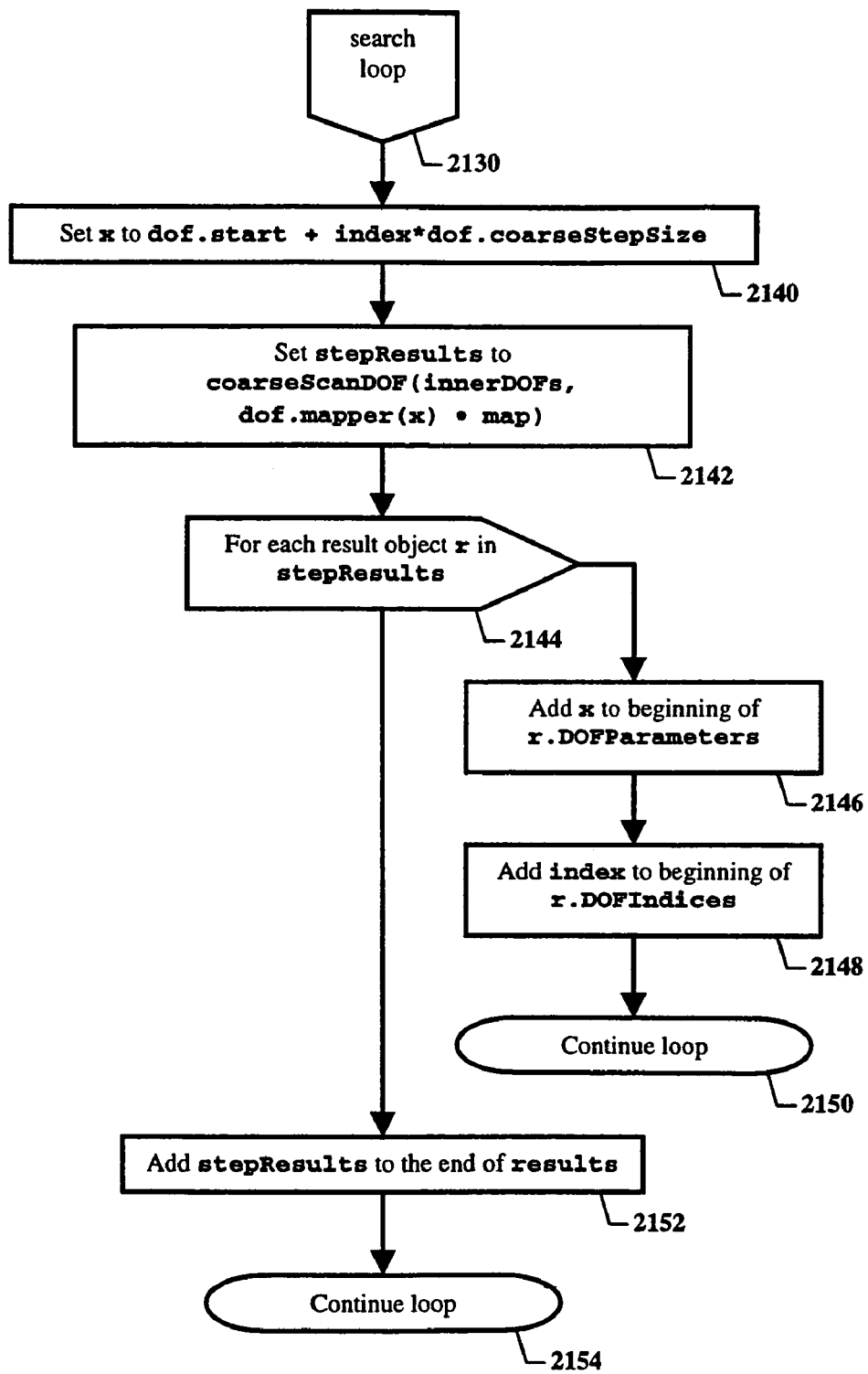
Figure 21b — Coarse scan generalized-DOF continued

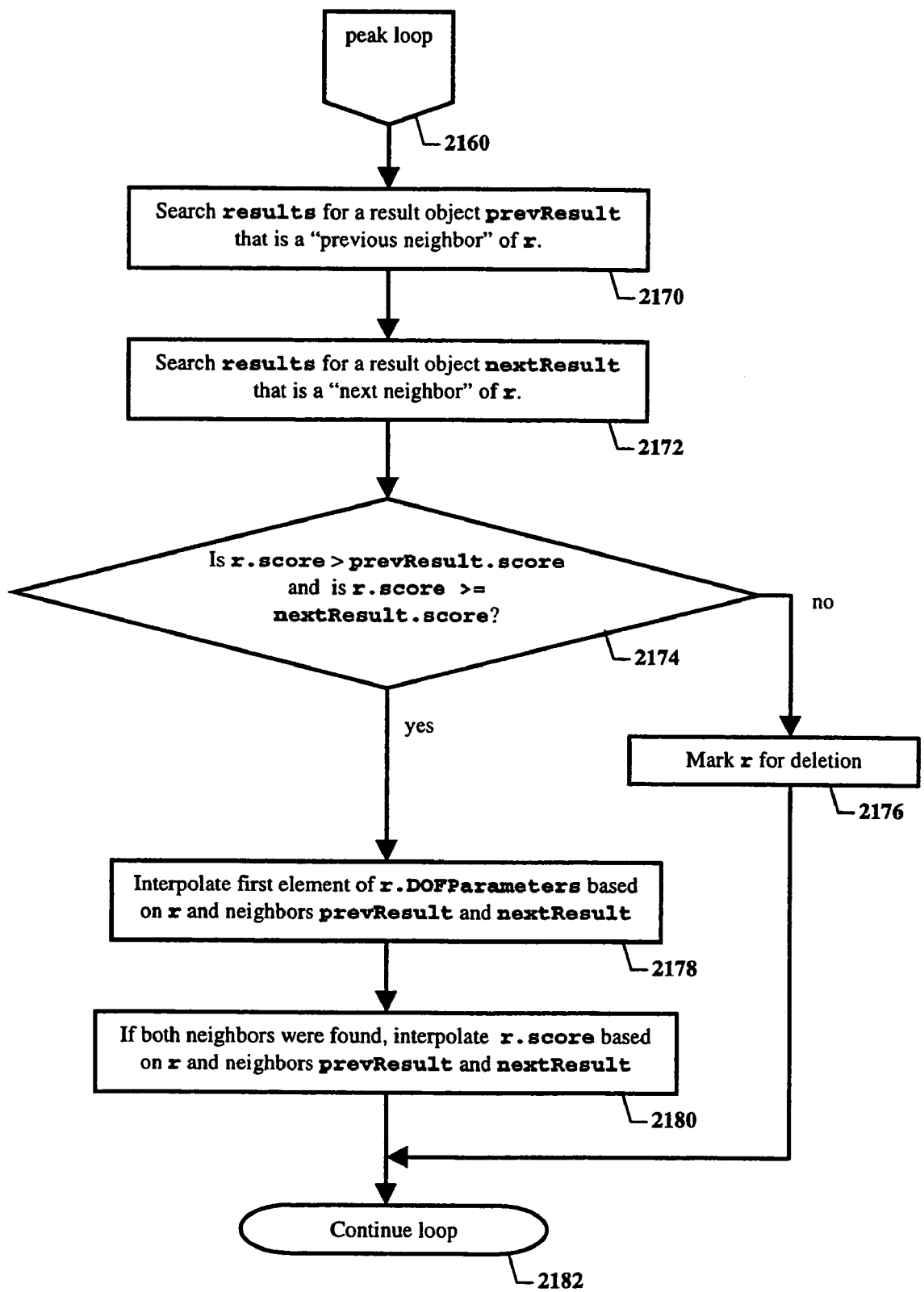
Figure 21c — Coarse scan generalized-DOF continued

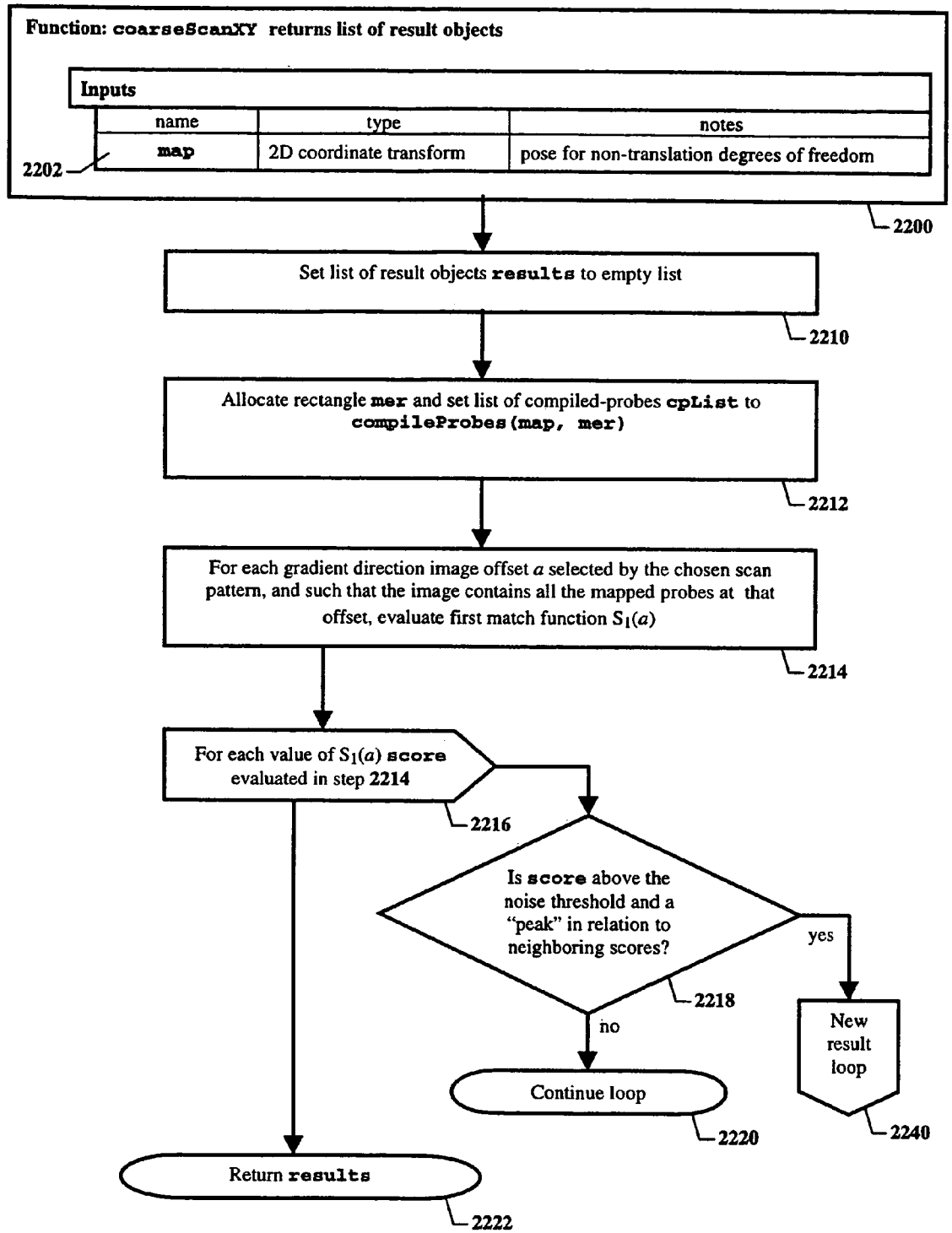
Figure 22a — Coarse scan x-y position

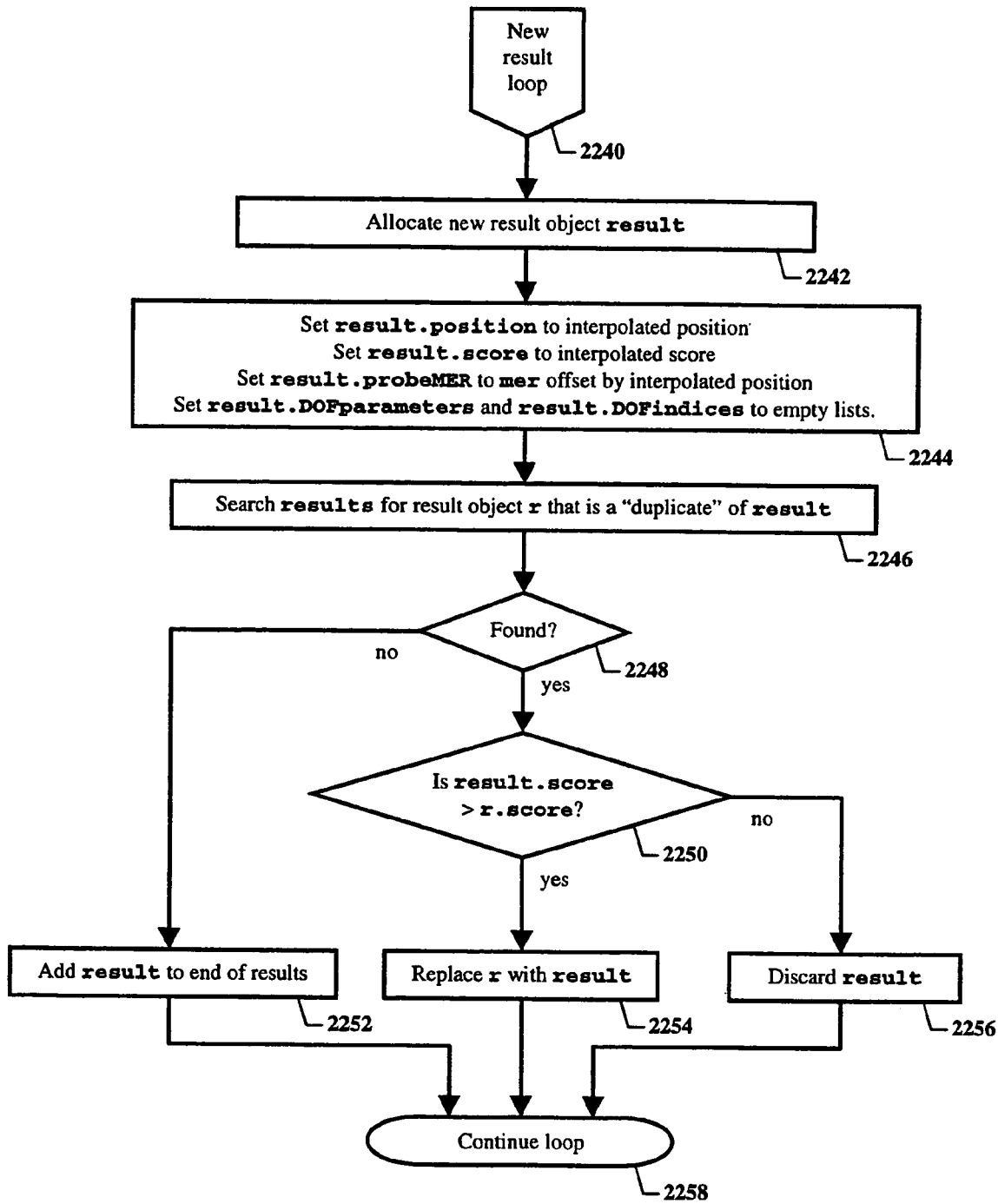
Figure 22b — Coarse scan x-y position continued

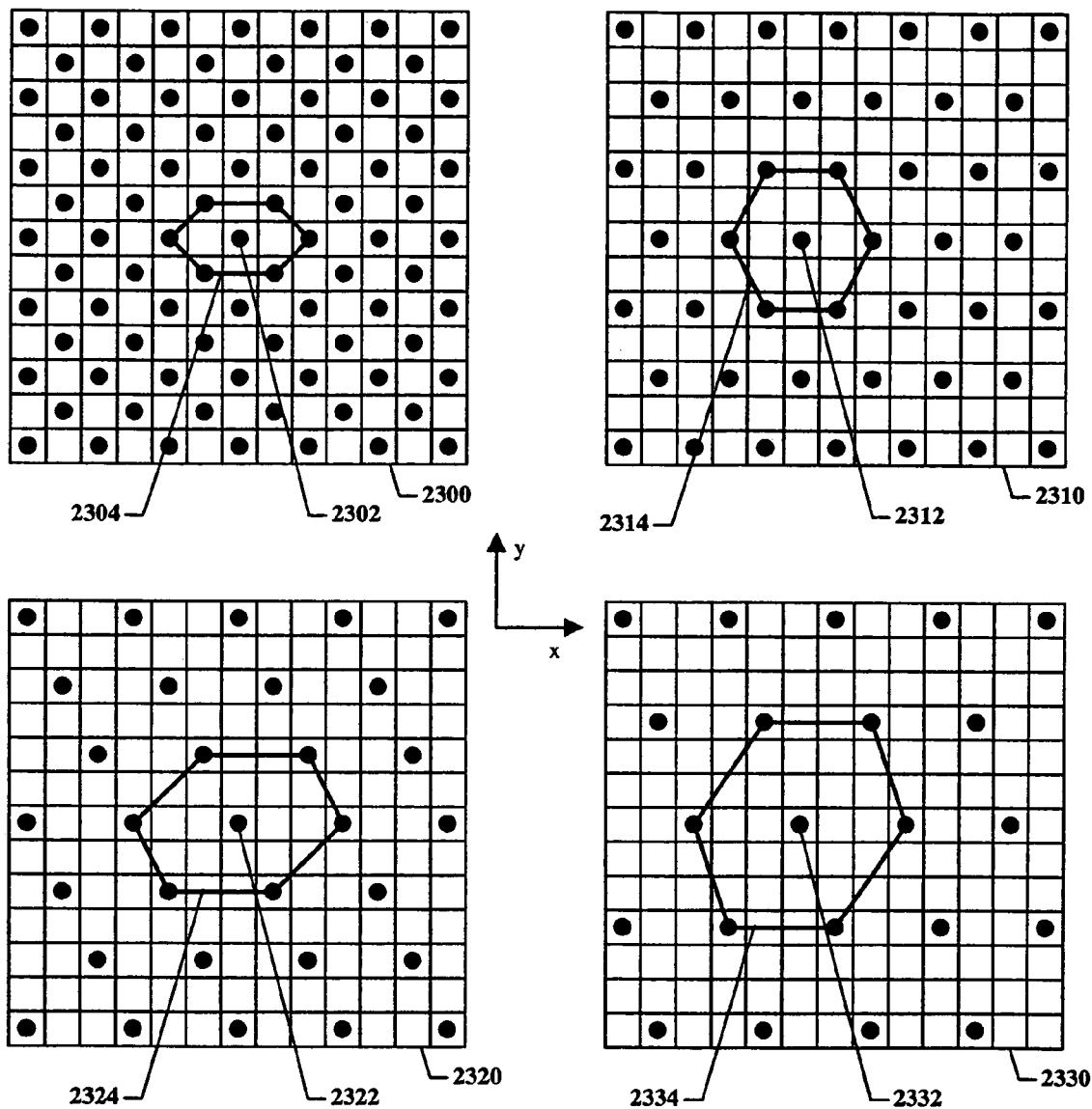
Figure 23 — Coarse x-y scan patterns

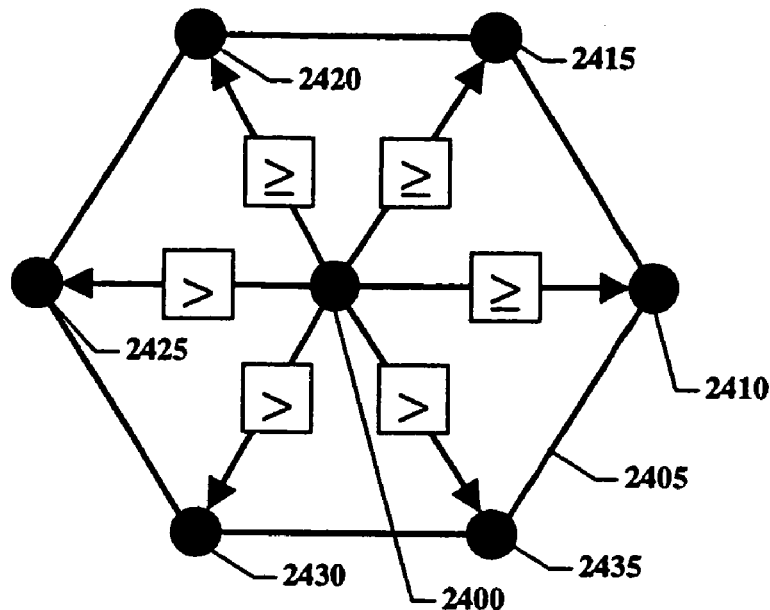
Figure 24a — Hexagonal peak detection
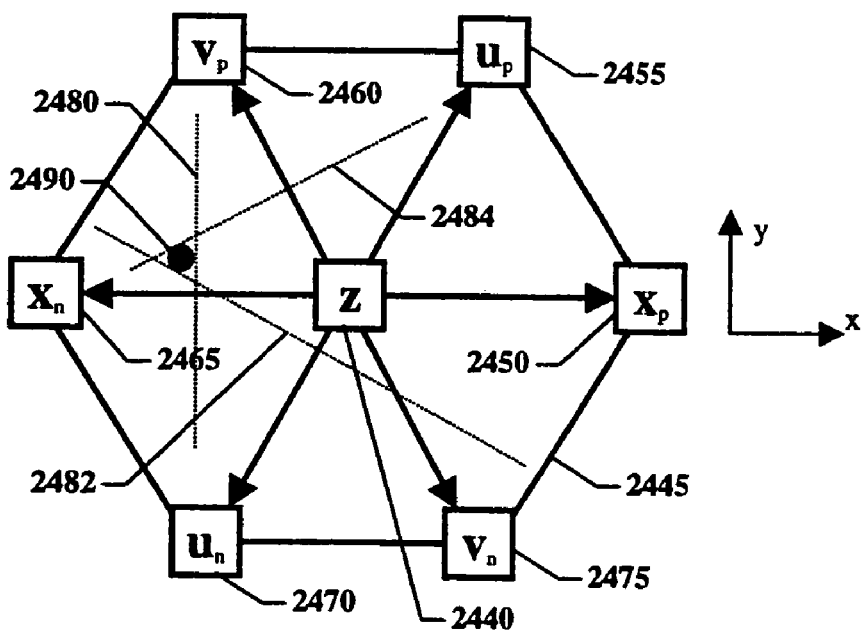
Figure 24b — Hexagonal interpolation

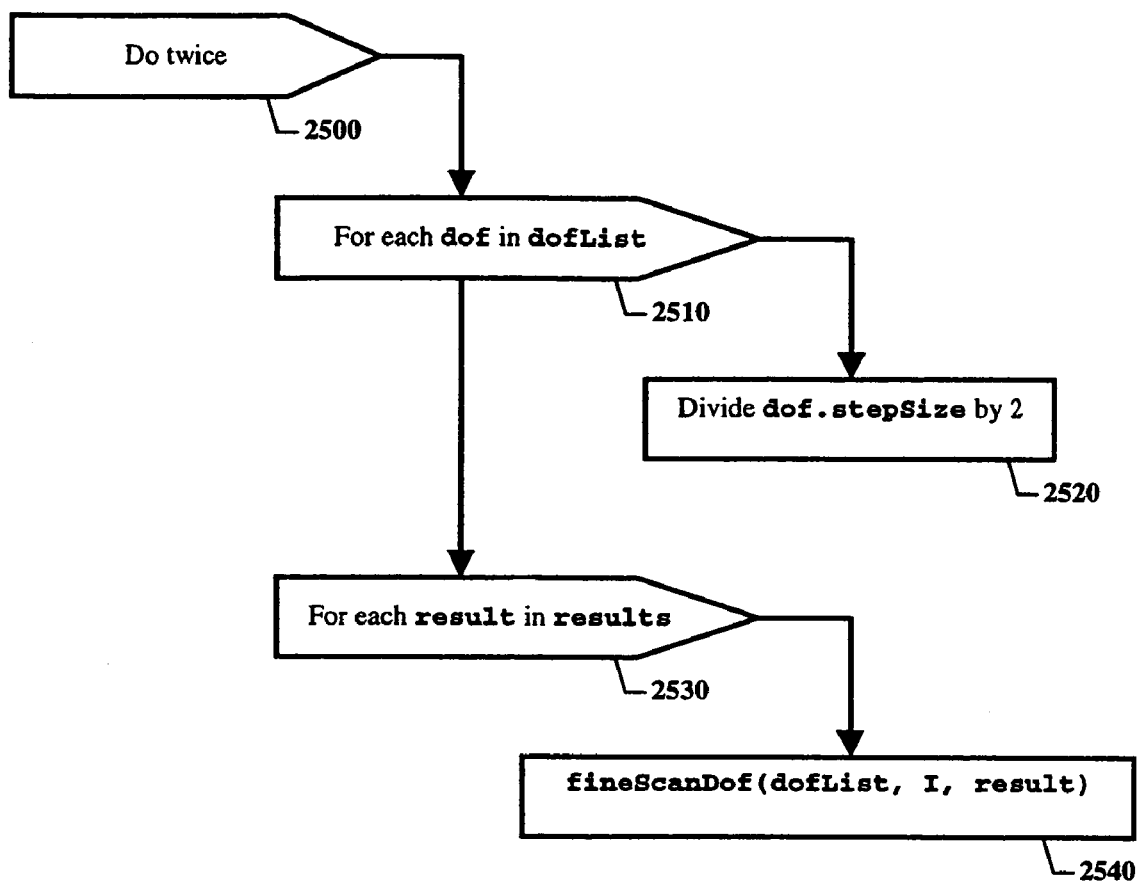
Figure 25 — Fine scan step 1940

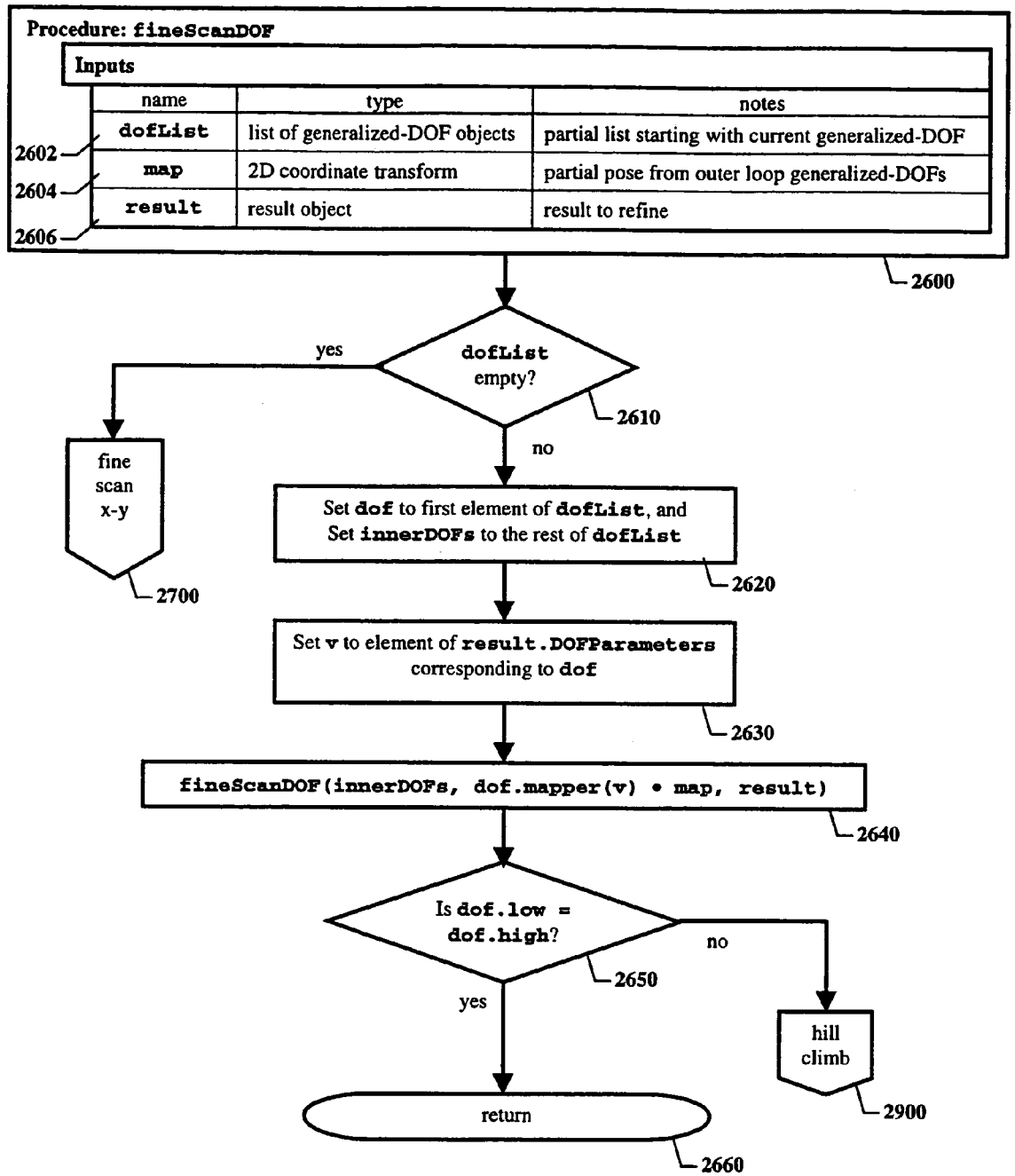
Figure 26 — Fine scan generalized-DOF

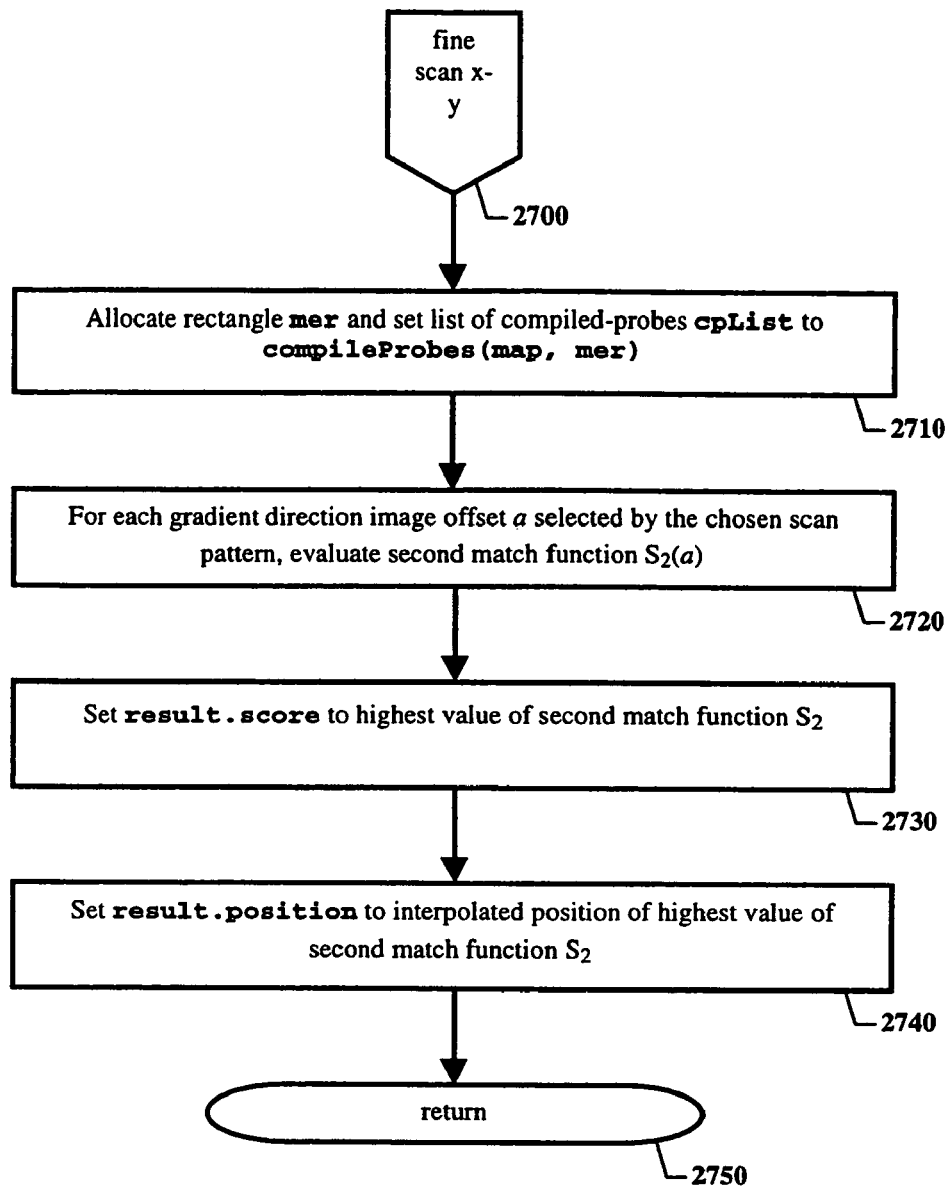
Figure 27 — Fine scan x-y
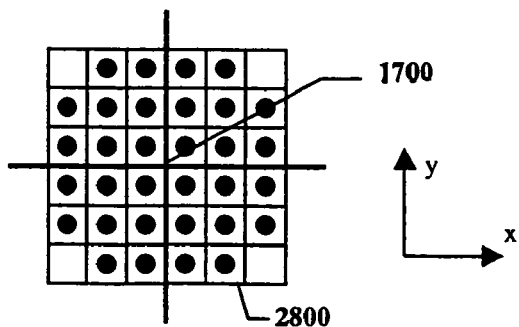
Figure 28 — Fine x-y scan pattern

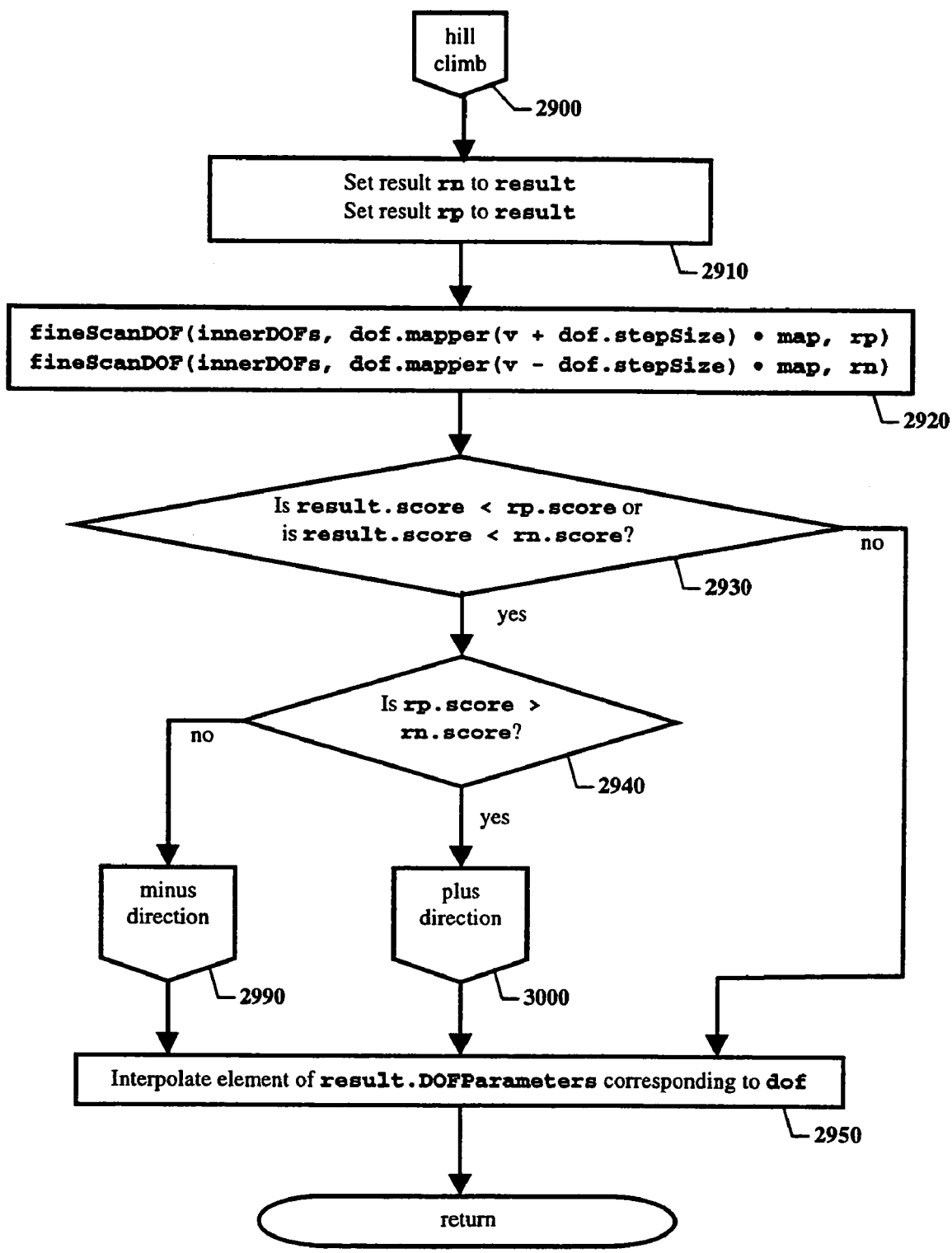
Figure 29 — Fine scan hill climbing

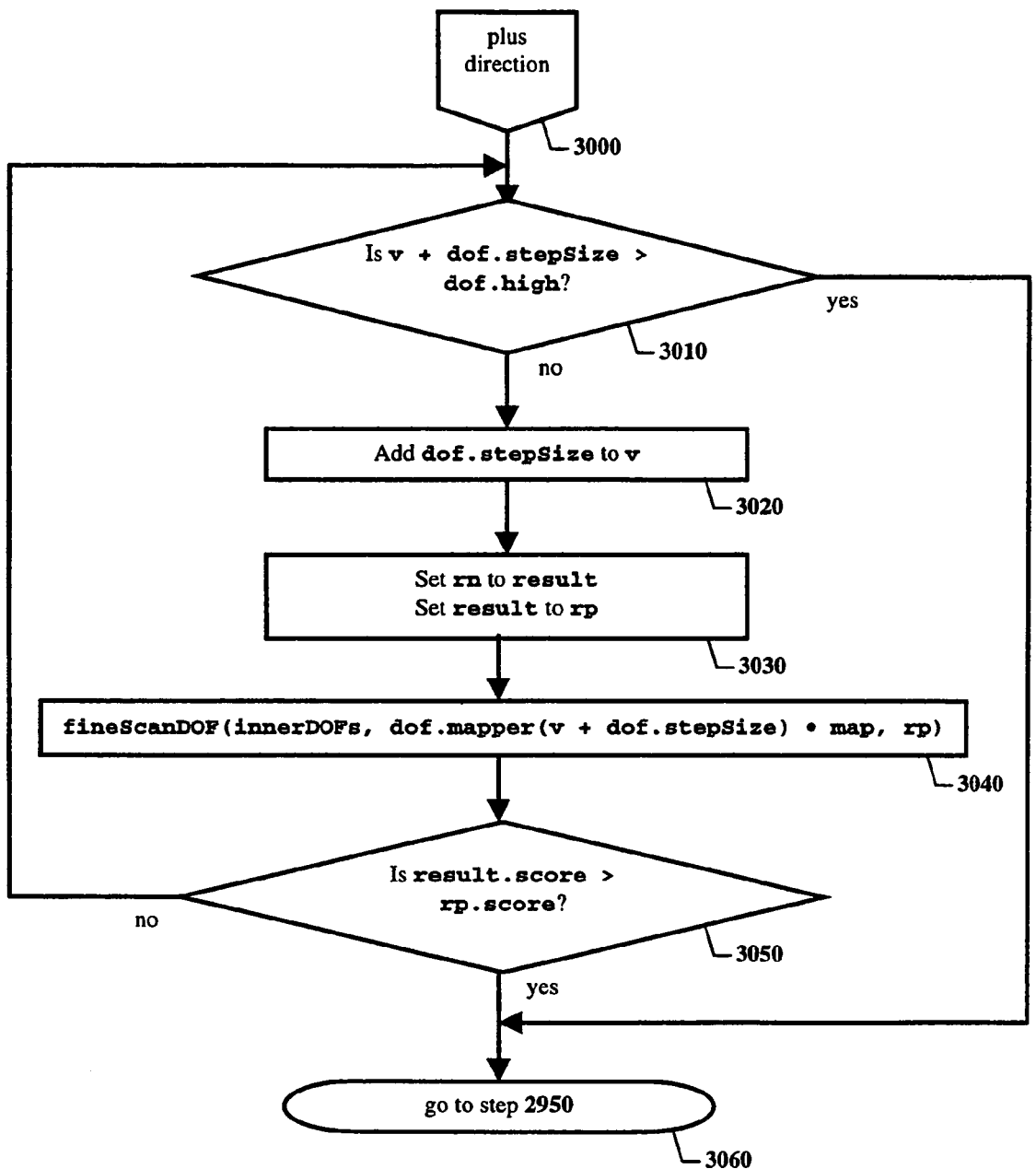
Figure 30 — Fine scan hill climbing, plus direction

METHOD FOR FAST, ROBUST, MULTI-DIMENSIONAL PATTERN RECOGNITION

CROSS-REFERENCE TO RELATED APPLICATIONS

This is a continuation of application Ser. No. 09/114,335, Filed Jul. 13, 1998 now U.S. Pat. No. 7,016,539, the contents of which is hereby incorporated by reference.

BACKGROUND OF THE INVENTION

Digital images are formed by many devices and used for many practical purposes. Devices include TV cameras operating on visible or infrared light, line-scan sensors, flying spot scanners, electron microscopes, X-ray devices including CT scanners, magnetic resonance imagers, and other devices known to those skilled in the art. Practical applications are found in industrial automation, medical diagnosis, satellite imaging for a variety of military, civilian, and scientific purposes, photographic processing, surveillance and traffic monitoring, document processing, and many others.

To serve these applications the images formed by the various devices are analyzed by digital devices to extract appropriate information. One form of analysis that is of considerable practical importance is determining the position, orientation, and size of patterns in an image that correspond to objects in the field of view of the imaging device. Pattern location methods are of particular importance in industrial automation, where they are used to guide robots and other automation equipment in semiconductor manufacturing, electronics assembly, pharmaceuticals, food processing, consumer goods manufacturing, and many others.

Another form of digital image analysis of practical importance is identifying differences between an image of an object and a stored pattern that represents the "ideal" appearance of the object. Methods for identifying these differences are generally referred to as pattern inspection methods, and are used in industrial automation for assembly, packaging, quality control, and many other purposes.

One early, widely-used method for pattern location and inspection is known as blob analysis. In this method, the pixels of a digital image are classified as "object" or "background" by some means, typically by comparing pixel gray-levels to a threshold. Pixels classified as object are grouped into blobs using the rule that two object pixels are part of the same blob if they are neighbors; this is known as connectivity analysis. For each such blob one determines properties such as area, perimeter, center of mass, principal moments of inertia, and principal axes of inertia. The position, orientation, and size of a blob is taken to be its center of mass, angle of first principal axis of inertia, and area, respectively. These and the other blob properties can be compared against a known ideal for proposes of inspection.

Blob analysis is relatively inexpensive to compute, allowing for fast operation on inexpensive hardware. It is reasonably accurate under ideal conditions, and well-suited to objects whose orientation and size are subject to change. One limitation is that accuracy can be severely degraded if some of the object is missing or occluded, or if unexpected extra features are present.

Another limitation is that the values available for inspection purposes represent coarse features of the object, and cannot be used to detect fine variations. The most severe limitation, however, is that except under limited and well-controlled conditions there is in general no reliable method for classifying pixels as object or background. These limitations forced developers to seek other methods for pattern location and inspection.

Another method that achieved early widespread use is binary template matching. In this method a training image is used that contains an example of the pattern to be located. The subset of the training image containing the example is thresholded to produce a binary pattern and then stored in a memory. At run-time, images are presented that contain the object to be found. The stored pattern is compared with like-sized subsets of the run-time image at all or selected positions, and the position that best matches the stored pattern is considered the position of the object. Degree of match at a given position of the pattern is simply the fraction of pattern pixels that match their corresponding image pixel.

Binary template matching does not depend on classifying image pixels as object or background, and so it can be applied to a much wider variety of problems than blob analysis. It also is much better able to tolerate missing or extra pattern features without severe loss of accuracy, and it is able to detect finer differences between the pattern and the object. One limitation, however, is that a binarization threshold is needed, which can be difficult to choose reliably in practice, particularly under conditions of poor signal-to-noise ratio or when illumination intensity or object contrast is subject to variation. Accuracy is typically limited to about one whole pixel due to the substantial loss of information associated with thresholding. Even more serious, however, is that binary template matching cannot measure object orientation and size. Furthermore, accuracy degrades rapidly with small variations in orientation and/or size, and if larger variations are expected the method cannot be used at all.

A significant improvement over binary template matching came with the advent of relatively inexpensive methods for the use of gray-level normalized correlation for pattern location and inspection. These methods are similar to binary template matching, except that no threshold is used so that the full range of image gray-levels are considered, and the degree of match becomes the correlation coefficient between the stored pattern and the image subset at a given position.

Since no binarization threshold is needed, and given the fundamental noise immunity of correlation, performance is not significantly compromised under conditions of poor signal-to-noise ratio or when illumination intensity or object contrast is subject to variation. Furthermore, since there is no loss of information due to thresholding, position accuracy down to about ¼ pixel is practical using well-known interpolation methods. The situation regarding orientation and size, however, is not much improved.

Another limitation of correlation methods is that in many applications object shading can vary locally and non-linearly across an object, resulting in poor correlation with the stored pattern and therefore failure to locate it. For example, in semiconductor fabrication the process step known as chemical mechanical planarization (CMP) results in radical, non-linear changes in pattern shading, which makes alignment using correlation impossible. As another example, in almost any application involving 3-dimensional objects, such as robot pick-and-place applications, shading will vary as a result of variations in angles of illumination incidence and reflection, and from shadows and mutual illumination. The effects are more severe for objects that exhibit significant specular reflection, particularly metals and plastics.

More recently, improvements to gray-level correlation have been developed that allow it to be used in applications where significant variation in orientation and/or size is expected. In these methods, the stored pattern is rotated and/ or scaled by digital image re-sampling methods before being matched against the image. By matching over a range of angles, sizes, and x-y positions, one can locate an object in the corresponding multidimensional space. Note that such methods would not work well with binary template matching, due to the much more severe pixel quantization errors associated with binary images.

One problem with these methods is the severe computational cost, both of digital re-sampling and of searching a space with more than 2 dimensions. To manage this cost, the search methods break up the problem into two or more phases. The earliest phase uses a coarse, subsampled version of the pattern to cover the entire search space quickly and identify possible object locations. Subsequent phases use finer versions of the pattern to refine the positions determined at earlier phases, and eliminate positions that the finer resolution reveals are not well correlated with the pattern. Note that variations of these coarse-fine methods have also been used with binary template matching and the original two-dimensional correlation, but are even more important with the higher-dimensional search space.

Even with these techniques, however, the computational cost is still high, and the problems associated with non-linear variation in shading remain.

Another pattern location method in common use is known as the Generalized Hough Transform (GHT). This method traces its origins to U.S. Pat. No. 3,069,654 [Hough, P.V.C., 1962], which described a method for locating parameterized curves such as lines or conic sections. Subsequently the method was generalized to be able to locate essentially arbitrary patterns. As with the above template matching and correlation methods, the method is based on a trained pattern. Instead of using gray levels directly, however, the GHT method identifies points along object boundaries using well-known methods of edge detection. A large array of accumulators, called Hough space, is constructed, with one such accumulator for each position in the multidimensional space to be searched. Each edge point in the image corresponds to a surface of possible pattern positions in Hough space. For each such edge point, the accumulators along the corresponding surface are incremented. After all image edge points have been processed, the accumulator with the highest count is considered to be the multidimensional location of the pattern.

The general performance characteristics of GHT are very similar to correlation. Computational cost rises very rapidly with number of dimensions, and although coarse-fine methods have been developed to improve performance, practical applications beyond 2 dimensions are almost nonexistent.

The edge detection step of GHT generally reduces problems due to non-linear variations in object contrast, but introduces new problems. Use of edge detectors generally increases susceptibility to noise and defocus. For many objects the edges are not sharply defined enough for the edge detection step to yield reliable results. Furthermore, edge detection fundamentally requires a binarization step, where pixels are classified as "edge" or "not edge", usually by a combination of thresholding and peak detection. Binarization, no matter what method is used, is always subject to uncertainty and misclassification, and will contribute failure modes to any method that requires it.

Terminology

The following terminology is used throughout the specification:

Object—Any physical or simulated object, or portion thereof, having characteristics that can be measured by an image forming device or simulated by a data processing device.

Image—A 2-dimensional function whose values correspond to physical characteristics of an object, such as brightness (radiant energy, reflected or otherwise), color, temperature, height above a reference plane, etc., and measured by any image-forming device, or whose values correspond to simulated characteristics of an object, and generated by any data processing device.

Brightness—The physical or simulated quantity represented by the values of an image, regardless of source.

Granularity—A selectable size (in units of distance) below which spatial variations in image brightness are increasingly attenuated, and below which therefore image features increasingly cannot be resolved. Granularity can be thought of as being related to resolution.

Boundary—An imaginary contour, open-ended or closed, straight or curved, smooth or sharp, along which a discontinuity of image brightness occurs at a specified granularity, the direction of said discontinuity being normal to the boundary at each point.

Gradient—A vector at a given point in an image giving the direction and magnitude of greatest change in brightness at a specified granularity at said point.

Pattern—A specific geometric arrangement of contours lying in a bounded subset of the plane of the contours, said contours representing the boundaries of an idealized image of an object to be located and/or inspected.

Model—A set of data encoding characteristics of a pattern to be found for use by a pattern finding method.

Training—The act of creating a model from an image of an example object or from a geometric description of an object or a pattern.

Pose—A mapping from pattern to image coordinates and representing a specific transformation and superposition of a pattern onto an image.

SUMMARY OF THE INVENTION

In one aspect the invention is a general-purpose method for determining the absence or presence of one or more instances of a predetermined pattern in an image, and determining the location of each found instance. The process of locating patterns occurs within a multidimensional space that can include, but is not limited to, x-y position (also called translation), orientation, and size. In another aspect the invention is a method for identifying differences between a predetermined pattern and a matching image subset. The process of identifying differences is called inspection.

To avoid ambiguity we will call the location of a pattern in a multidimensional space its pose. More precisely, a pose is a coordinate transform that maps points in a pattern to corresponding points in an image. In a preferred embodiment, a pose is a general 6 degree of freedom linear coordinate transform. The 6 degrees of freedom can be represented by the 4 elements of a 2×2 matrix, plus the 2 elements of a vector corresponding to the 2 translation degrees of freedom. Alternatively and equivalently, the 4 non-translation degrees of freedom can be represented in other ways, such as orientation, size, aspect ratio, and shear, or x-size, y-size, x-axis-angle, and y-axis-angle.

The results produced by the invention can be used directly, or can be further refined by multidimensional localization methods such as described in U.S. Pat. No. 6,658,145 entitled "Fast High-Accuracy Multi-Dimensional Pattern Inspection".

The invention uses a model that represents the pattern to be found. The model can be created from a training image or synthesized from a geometric description. The invention is a template matching method—the model is compared to an image at each of an appropriate set of poses, a match score is computed at each pose, and those poses that correspond to a local maximum in match score, and whose match scores are above a suitable accept threshold, are considered instances of the pattern in the image.

According to the invention, a model includes a set of data elements called probes. Each probe represents a relative position at which certain measurements and tests are to be made in an image at a given pose, each such test contributing evidence that the pattern exists at said pose. In one embodiment of the invention, each probe represents a measurement and test of gradient direction. In another embodiment, each probe represents a measurement and test of both gradient direction and magnitude. In a preferred embodiment, the probes represent different tests at different steps of the method. The gradient magnitude or direction to be tested by a probe is referred to as the gradient magnitude or direction under the probe.

In a preferred embodiment, a probe is defined by its position, direction, and weight. Each of these quantities are conceptually real numbers, although of course in any actual embodiment they would be represented as floating or fixed point approximations. Probe position is a point in a pattern coordinate system at which, after transforming to a image coordinate system using a given pose, a measurement and test is to be made. Probe direction is the expected gradient direction in pattern coordinates at the indicated position, which also must be transformed to image coordinates prior to use. Probe weight gives the relative importance of the probe in determining the presence and location of the pattern.

In a preferred embodiment, probe weights can be positive or negative. A negative weight indicates that a test showing similar gradient direction and sufficient gradient magnitude should count as evidence against the existence of the pattern at the specified pose.

Most points in an image contain little useful information about pattern position. Uniform regions, for example, contain no information about position, since brightness is locally independent of position. Generally the second or higher derivative of brightness must be non-zero in some direction for there to be useful information, and it has long been recognized in the art that the best information occurs along boundaries. Thus examining an image at every point for the purpose of pattern location is unnecessary as well as wasteful of memory and processing time.

In a preferred embodiment, a model includes a small set of probes placed at selected points along the boundaries represented by the corresponding pattern. The probes are uniformly spaced along segments of the boundaries characterized by a small curvature. The spacing between the probes is chosen so that a predetermined number of probes is used, except that fewer probes can be used to prevent the spacing from being set below some predetermined minimum value, and more probes can be used to prevent the spacing from being set above some predetermined maximum value. In a preferred embodiment, the said predetermined number of probes is 64.

The boundaries that appear in a given image are not absolute but depend on the granularity at which the image is interpreted. Consider for example a newspaper photograph. Over some range of very fine granularities, one perceives nothing but a pattern of dots of various sizes and separations. Over some range of coarser granularity, the dots cannot be resolved and one may perceive human facial features such as eyes, noses, and mouths. At even coarser granularity, one may perceive only human heads.

For an image sensor producing a digital image, granularity is limited by pixel size and sharpness of focus. Granularity may be increased above this limit (i.e. made coarser) by suitable image processing operations, and thus effectively controlled over a wide range. In a pattern locating system, choice of granularity affects speed, accuracy, and reliability. When suitable methods are used, pattern locating speed can be made to increase rapidly as granularity increases, which can be crucial for high speed applications where the pattern's pose can vary in more than 2 degrees of freedom. Pattern location accuracy, however, decreases as granularity increases. Pattern locating reliability, the ability to correctly identify patterns when they exist and to avoid misidentifying image subsets that are not instances of the pattern, may fall off if the granularity is too coarse to resolve key pattern features, and may fall off if the granularity is so fine that details are resolved that are inconsistent from instance to instance, such as surface texture or other random microstructure.

In a preferred embodiment of the invention, granularity is selectable over a wide range down to the limit imposed by the image sensor. In another preferred embodiment, a suitable granularity is automatically chosen during model training. In another preferred embodiment, at least two granularities are used, so that the speed advantages of the coarsest granularity and the accuracy advantages of the finest granularity can be obtained. In the preferred embodiment wherein at least two granularities are used, the model includes a separate set of probes for each granularity.

Granularity can be increased above the image sensor limit by a low-pass filtering operation, optionally followed by a sub-sampling operation. Methods for low-pass filtering and subsampling of digital images are well known in the art. Until recently, however, inexpensive, high speed methods that could be tuned over a wide range with no significant loss in performance were not available. In a preferred embodiment, the invention makes use of a constant-time second-order approximately parabolic filter, as described in U.S. Pat. No. 6,457,032, entitled "Efficient, Flexible Digital Filtering", followed by a non-integer sub-sampling step wherein brightness values spaced g pixels apart, horizontally and vertically, are linearly interpolated between the filtered pixel values for some value of g chosen at training time.

Methods for estimating image gradient magnitude and direction are well known in the art, but most methods in common use are either too slow or of insufficient accuracy to be suitable for the practice of the invention. For example, most commercially available gradient estimation methods can only resolve direction to within 45°, and only provide a crude estimate of magnitude. One notable exception is described in U.S. Pat. No. 5,657,403, herein incorporated by reference, although at the time of that patent specialized hardware was required for high speed operation. Recent advances in computer architecture and performance have made high speed, accurate gradient estimation practical on inexpensive hardware. In a preferred embodiment, the invention uses the well-known Sobel kernels to estimate the horizontal and vertical components of gradient, and the well-known CORDIC algorithm, as described, for example, in U.S. Pat. No. 6,408,109, entitled "Apparatus and Method for Detecting and Sub-Pixel Location of Edges in a Digital Image", herein incorporated by reference, for example, to compute gradient magnitude and direction. The Sobel kernels are applied either to the input image or to a filtered, sub-sampled image, as described above, so that the result is a gradient magnitude image and a gradient direction image that together provide image gradient information at uniformly spaced points, which mayor may not correspond to the pixels of the input image, and at a selectable granularity. In a preferred embodiment, the gradient magnitude and direction images are stored in a random access memory of a computer or other data processing device, in such a manner that the address difference between pixels in the horizontal direction is a first constant, and the address difference between pixels in the vertical direction is a second constant.

The method of the invention, which tests gradient direction at each of a small set (e.g. 64) of positions, offers many advantages over prior art methods of template matching. Since neither probe position nor direction are restricted to a discrete pixel grid, and since probes represent purely geometric information and not image brightness, they can be translated, rotated, and scaled much faster than digital image resampling methods and with less pixel grid quantization error. Furthermore, since probes are spaced along contours where a maximum amount of position information occurs, a small set of probes can be used so that processing time can be minimized.

Gradient direction is a much more reliable basis for pattern location than image brightness. Brightness may vary as a result of object surface reflectance, intensity of illumination, angles of illumination incidence and reflection, mutual illumination and shadows, sensor gain, and other factors. Gradient direction at boundaries is generally unaffected by these factors as long as the overall shape of the object is reasonably consistent. Furthermore, each individual test of gradient direction provides direct evidence of the presence or absence of a pattern at a given pose, and this evidence has absolute meaning that is independent of the conditions under which a given image was obtained. For example, one generally can conclude that a direction error of 3 degrees is a good match, and of 30 degrees is a poor match, without knowing anything about the pattern to be located or any of the above listed factors affecting the individual brightness values in any given image. By contrast, a test of image brightness is meaningless in itself-whether 3 brightness units of difference or 30 units of difference is good or bad can only be assessed in relation to the statistics of a large set of brightness values.

The method of the invention also offers many advantages over prior art methods based on the Hough transform. The high quality of the information provided by tests of gradient direction allows fewer points to be processed, resulting in higher speed. Sets of probes can be rotated and scaled more quickly and accurately than the edge point sets used by GHT methods. Hough methods including the GHT tend to be adversely affected by small variations in pattern shape, or edge position quantization error, where a shift in edge position by even one pixel will cause an undesirable spreading of the peak in Hough space. By contrast, gradient direction is generally consistent within a couple of pixels of a boundary, so that the effects of small variations in shape or quantization errors are generally insignificant. Loss of sharp focus can degrade the edge detection step required for Hough methods, whereas defocus has no effect on gradient direction. Hough transform methods, and all methods based on edge detection, fundamentally require a binarization step, where pixels are classified as "edge" or "not edge", and all such methods are subject to uncertainty and misclassification. The use of gradient direction by the invention requires no binarization or other classification to be applied.

A variety of match functions based on gradient direction, and optionally gradient magnitude and probe weight, can be used within the scope of the invention. In a first match function, probe positions having gradient direction errors below a first predetermined value are given a rating of 1.0, above a second predetermined value are given a rating of 0, and errors that fall between the said first and second values are given a rating proportionally between 0 and 1.0. The weighted sum of probe ratings, divided by the total weight of all probes, is the match score. With said first match function all probe weights are positive, since a negative weight probe cannot be considered to provide evidence against a pose unless the gradient magnitude is tested and found to be sufficiently strong. The first match function results in the highest possible speed, for two primary reasons. First, gradient magnitude is not used, which reduces both the calculations needed and the number of accesses to memory wherein gradient magnitude information would be stored. Second, due to the general consistency of gradient direction surrounding a boundary, the first match function tends to produce broad peaks in match score, which allows a relatively sparse set of poses to be evaluated.

In a first variation on said first match function probe weights are not used (i.e. probe weights are effectively all 1.0), which further increases the speed of operation. In a second variation on said first match function, the expected value of the weighted sum of the probe ratings on random gradient directions is subtracted from the actual weighted sum, with the total weight adjusted accordingly, so that a perfect match still gets a score of 1.0 but the expected value of the score on random noise is 0.

In a second match function, a direction rating factor is computed for each probe that is the same as the probe rating used by the first match function, and probes receive a rating that is the product of the direction rating factor and the gradient magnitude under the probe. The match score is the weighted sum of the probe ratings. With the second match function, probe weights can be positive or negative. The second match function produces sharper peaks in match score than the first, since gradient magnitude is at a maximum at a boundary and falls off sharply on either side. As a result pattern position can be determined more accurately with the second match function, but at a cost of lower speed since more calculations and memory accesses are needed and since a denser set of poses must be evaluated. Unlike the first match function which produces a score between 0 and 1.0, the second match function's score is essentially open-ended and dependent on boundary contrast. Thus while the score can be used to compare a pose to a neighboring pose to determine a peak in match score, it cannot in general be used to compare a pose to a distant pose or to provide a value that can be used reliably to judge whether or not an instance of the pattern is present in the image at a given pose.

In a third match function, a direction rating factor is computed for each probe identical to that of the second match function, and a magnitude rating factor is computed that is 1.0 for gradient magnitudes above a certain first value, 0 for magnitudes below a certain second value, and proportionally between 0 and 1.0 for values between said first and second values. Each probe receives a rating that is the product of the direction rating factor and the magnitude rating factor, and the match score is the weighted sum of the probe ratings divided by the total weight of all the probes. Probe weights can be positive or negative. In a preferred embodiment, the said first value is computed based on image characteristics at any pose for which the third match function is to be evaluated, so the third match function takes the longest to compute. Furthermore, peaks in match score are generally less sharp than for the second match function, so position is less accurate. The primary advantage of the third match function is that it produces a score that falls between 0 and 1.0 that can be used for comparison and to judge whether or not an instance of the pattern is present in the image at a given pose, and that said score takes into account gradient magnitude and allows negative probe weights.

In the aspect of the invention where inspection is to be performed, the score produced by the third match function is used to provide an overall measure of the quality of a specific instance of the pattern found in an image, and the individual probe ratings computed during evaluation of the third match function are used to provide more detailed information about differences between the found instance and the pattern.

In a preferred embodiment, the first match function, and using both the first and second variation, is used during a coarse scan step during which the entire multidimensional search space is evaluated with a relatively sparse set of poses. Poses that are coarse peaks, specifically those at which the first match score is a local maximum and above a predetermined accept threshold, are refined during a fine scan step that evaluates a small, dense set of poses surrounding each coarse peak. The fine scan step uses the second match function to achieve a precise position and to consider the evidence of negative weight probes. An interpolation between the pose resulting in the highest value of the second match function and its neighbors is considered the location of one potential instance of the pattern in the image. A scoring step evaluates the third match function at this final, interpolated pose to judge whether or not an instance of the pattern is actually present in the image at said pose by comparing the value of the third match function to an accept threshold.

In any specific embodiment of the invention the search space is defined by certain degrees of freedom that include the two translation degrees of freedom and some number, possibly zero, of non-translation degrees of freedom such as orientation and size. Many methods can be devised within the scope of the invention to generate the set of poses to be evaluated for purposes of pattern location. In a preferred embodiment, any specific pose is the result of specifying values for each degree of freedom. The set of poses to be evaluated during the coarse scan step is the result of generating all combinations of selected values for each degree of freedom. For this preferred embodiment, two distinct methods are used in combination to generate the set of poses, one for translation and one for non-translation degrees of freedom.

According to this preferred embodiment of the invention, for each combination of values of the non-translation degrees of freedom the probe positions and directions are transformed according to the said combination of values from pattern coordinates to an image coordinate system associated with the gradient magnitude and direction images. The resulting positions, which are relative positions since the translation degrees of freedom have not yet been included, are rounded to relative integer pixel coordinates and, using the horizontal and vertical address difference constants, converted to a single integer offset value that gives the relative position of the probe in either the gradient magnitude or direction image at poses corresponding to the said combination of non-translation degrees of freedom. The result is a new set of data elements called compiled probes that include relative image offset, transformed expected gradient direction, and weight.

According to this preferred embodiment of the invention, during the coarse step the compiled probes are used to evaluate the first match function at a set of translations corresponding to some regular tessellation. For any such translation that is a local maximum in first match score, and where said score is above a suitable accept threshold, a set of data called a result is allocated and added to a list of results. A translation is interpolated between the local maximum and its neighbors and stored in the newly-allocated result, along with an interpolated score. According to this preferred embodiment of the invention, a hexagonal tessellation is used along with methods for determining a local maximum and for interpolation on such a tessellation. In a less preferred variation on this embodiment, a conventional square tessellation is used, including well-known methods for determining the presence of a local maximum and for interpolating between said maximum and its neighbors.

According to this preferred embodiment of the invention, each non-translation degree of freedom is defined and described by a set of data and functions called a generalized-DOF. Each generalized-DOF includes a single real-valued (or floating point approximation) parameter that specifies its value, for example an orientation degree of freedom would have an angle parameter and a size degree of freedom would have a scale factor parameter. Each generalized-DOF includes a function that maps the parameter value to a corresponding 2-dimensional coordinate transform. For example, for an orientation generalized-DOF this function might include the matrix $$\begin{pmatrix} \cos(x) & -\sin(x) \\ \sin(x) & \cos(x) \end{pmatrix} \qquad (1)$$

where "x" is the parameter. Each generalized-DOF includes a low and high limit value that specifies the range of parameter values within which the pattern should be located for the degree of freedom, and which are set based on the requirements of the application to which the invention is being used. Each generalized-DOF includes a value that if non-zero specifies the period of cyclic degrees of freedom such as orientation (e.g., 360 if the parameter is in degrees). Each generalized-DOF includes a maximum step size value that specifies the maximum allowable separation between parameter values used to generate poses for the degree of freedom for the coarse scan step. In the preferred embodiment, the maximum step size for each generalized-DOF is determined from an analysis of the magnitude of motion of the probes in the expected gradient direction as the generalized-DOF parameter is varied. In a less preferred embodiment, the maximum step size is a fixed, predetermined value.

According to this preferred embodiment of the invention, for a given generalized-DOF if the difference between the high and low limit values, which is referred to as the parameter range, is not greater than the maximum step size, then the generalized-DOF parameter is not varied during the coarse step, but is instead set to the halfway point between the limits. If the parameter range is greater than the maximum step size, then an actual step size is computed such that the actual step size is not greater than the maximum and the range is an integer multiple of the actual step size. For the given generalized-DOF, the set of parameter values generated for the coarse scan step range from one-half of the actual step size below the low limit to one-half of the actual step size above the high limit, in increments of the actual step size. It can be seen that a minimum of three distinct parameter values are generated in this case.

The invention uses a set of nested loops during the coarse scan step to generate all combinations of parameter values of the generalized-DOFs in use, where each such loop corresponds to one generalized-DOF. Each loop steps the parameter value of the corresponding generalized-DOF over the range and using the actual step size as described above, generating a coordinate transform corresponding to each parameter value. In the innermost loop, the coordinate transforms corresponding to the current parameter values of all of the generalized-DOFs are composed to produce a single overall transform specifying all of the non-translation degrees of freedom as needed for the translation degrees of freedom as described above. Data specifying the values of the generalized-DOF parameters are added to the results lists produced during scanning of the translation degrees of freedom. At the end of each of the nested loops, the results lists are scanned to identify sets of results that correspond to the same instance of the pattern in the image at a consecutive sequence of parameter values of the generalized-DOF corresponding to the given nested loop. For each such set found, all but the peak result (the one with the highest score) are deleted, and the parameter value and score are interpolated between the peak result and its neighbors. All of the remaining (i.e. peak) results are concatenated to produce a single master results list representing the results of the coarse scan step.

During the fine scan step the pose of each result produced by the coarse scan step is refined one or more times. For each such refinement, all of the translation and non-translation degrees of freedom are analyzed and updated, using a revised actual step size for the generalized-DOFs that is one-half that of the previous refinement step. For the first refinement step, the revised actual step size for the generalized-DOFs is one-half that of the coarse scan step. As for the coarse scan step, two distinct methods are used in combination to generate a set of poses, one for translation and one for non-translation degrees of freedom.

For the translation degrees of freedom, compiled probes are generated as before using the composed coordinate transform that specifies the value all of the non-translation degrees of freedom. The second match function is evaluated at every pixel offset within a small, approximately circular region centered on the translation stored in the result being refined. A new translation is stored that is interpolated between the maximum value of the second match function and its neighbors.

The invention uses a set of nested loops during the fine scan step to generate certain combinations of parameter values of the generalized-DOFs in use, where each such loop corresponds to one generalized-DOF. For each such loop three parameter values are chosen to start—the current value stored in the result, a value lower by the current revised actual step size, and a value higher by the current revised actual step size. If the lower parameter value results in a second match score that is higher than the match scores resulting from the other two parameter values, further lower parameter values are generated in steps of the current revised actual step size, until either a parameter value is found that does not result in a higher second match score than the other parameter values, or the lower limit for this generalized-DOF is reached. If the lower limit is reached, the final parameter value is stored in the result for this generalized-DOF. If instead a peak second match value was found, the parameter value is interpolated between said peak and its neighbors and stored in the result. Similar steps are followed if at the start of the nested loop the higher parameter value results in a second match score that is higher than the match scores resulting from the other two parameter values.

Sometimes two or more results produced by the coarse scan step are duplicates that correspond to the same instance of the pattern in the image, differing only slightly in pose. ill a preferred embodiment of the invention, when results are found that overlap by more than some predetermined amount in each degree of freedom, the result with the highest score is kept and the other duplicates are deleted.

The steps associated with the generalized-DOFs for the coarse and fine scan steps can be realized by means of a computer program. Following conventional practice the nested loops described above can be coded directly based on the attributes of a predetermined set of generalized-DOFs. Such a conventional method of coding, however, results in duplication for each generalized-DOF of substantially similar code for both the coarse and fine scan steps, as well as other steps such as the determining of the maximum and actual step sizes, since the steps required for each generalized-DOF are basically the same with only minor differences in how the parameter value is used to produce a coordinate transform and whether or not the generalized-DOF is cyclic. Duplication with minor modifications of a significant amount of complex code for each generalized-DOF results in a computer program where debugging, modification, and maintenance are difficult and error-prone. Adding or removing specific generalized-DOFs, or changing the nesting order, would be particularly difficult and error-prone and could only be done at compile time.

One aspect of the invention is a solution to the problem of coding a method for scanning non-translation degrees of freedom for the purpose of pattern locating. The coding method requires no duplication of code, and allows non-translation degrees of freedom to be added and removed, and to have the nesting order changed, at run time. The invention is based on the so-called object oriented programming methodology that has recently become generally available in the form of programming languages such as C++ and Java, although the invention could be practiced using many conventional languages such as C and assembly language by simulating the appropriate object oriented features.

In a preferred embodiment, each generalized-DOF is represented by a C++ class that is derived from an abstract base class that specifies a fixed interface to any generalized-DOF and implements all functionality that is common to all generalized-DOFs. Any functionality that is specific to a generalized-DOF, including the function that maps the parameter value to a coordinate transform, is specified as a virtual function in the base class and overridden in each derived class for the specific generalized-DOF. Data that is specific to a generalized-DOF, such as the parameter limits, maximum and actual step sizes, and cyclic period value, can be held in data members of the base class. Data specifying fixed attributes of the generalized-DOF, such as the cyclic period value, can be initialized by the constructor of the derived class.

According to this preferred embodiment, a list of generalized-DOFs (instances of the derived classes) is used to specify the non-translation degrees of freedom to be scanned and the nesting order. The list can be constructed from available generalized-DOF classes at runtime. The nested loops of the coarse scan step are implemented by a single non-virtual member function of the base class, which is given a list of generalized-DOFs as one argument. The coarse scan function processes the generalized-DOF at the head of the list by generating the appropriate sequence of parameter values as described above, generating the corresponding coordinate transform, and then calling itself recursively on the remainder of the list of generalized-DOFs to implement loops nested within the current one. When the coarse scan function is finally passed a null list of generalized-DOFs, it calls another function to do the translation degrees of freedom. The nested loops of the fine scan step are handled similarly by another non-virtual member function of the base class.

The pattern location method of the invention is truly general purpose, because it has the following characteristics:

Essentially arbitrary patterns can be trained by example;

Variations in pattern location, orientation, and size can be tolerated and measured;

Pattern defects such as missing or unexpected features can be tolerated with no significant loss in accuracy;

Non-linear variations in shading can be tolerated;

Real-world imaging conditions such as defocus, video noise, and illumination variation can be tolerated; and Price/performance ratio is low enough for widespread use.

Prior to the present invention, there were no practical, truly general-purpose pattern location methods available.

BRIEF DESCRIPTION OF THE DRAWING

The invention will be more fully understood from the following detailed description, in conjunction with the accompanying figures, wherein:

FIG. 1 is a high-level block diagram of one embodiment of the invention;

FIG. 2 is a is block diagram of the steps for granularity control, gradient estimation, and boundary detection;

FIG. 3 is a flow chart of a preferred embodiment of the model training step of FIG. 1;

FIG. 4 is an illustration of an example of a portion of a boundary point list for a small subset of a training image;

FIGS. 5a, 5b, and 5c show an illustration of a portion of FIG. 4, showing the details of the connect step of the model training step of FIG. 3;

FIG. 6 is an illustration of the portion of FIG. 4, showing the details of the segment step of FIG. 3;

FIG. 7 is an illustration of a set of probes according to the invention to be included in a model resulting from the training step of FIG. 1;

FIG. 8 is an illustration of a synthetic model according to the invention for locating or inspecting a rounded rectangle pattern;

FIG. 9 is an illustration of various typographic and symbolic convention used in the specification;

FIG. 10 is an illustration of a data set that represents a model of FIG. 1;

FIG. 11 a is an illustration of a data set that represents a probe of FIG. 10;

FIG. 11 b is an illustration of a data set that represents a compiled probe generated from the probe of FIG. 11 a;

FIGS. 12a and 12b are flow charts illustrating the steps for converting a list of probe objects into a list of compiled-probe objects;

FIGS. 13a and 13b are illustrations of direction rating factor functions;

FIG. 13c is an illustration of a magnitude rating factor function;

FIG. 14 is an illustration of a data set that represents a generalized-DOF;

FIG. 15 is a table that details specific generalized-DOFs of FIG. 14 that can be used with the invention;

FIG. 16 is an illustration of the details of a list of generalized-DOFs used in a preferred embodiment of the invention;

FIG. 17 is an illustration of a data set that represents a result corresponding to an instance of a pattern in a run-time image;

FIGS. 18a, 18b, and 18c show an illustration of how position overlap is calculated for a pair of results to determine if they might be neighbors or duplicates;

FIG. 19 is a top-level flow chart of a preferred embodiment of run-time;

FIG. 20 is a flow chart of setting generalized-DOF elements;

FIGS. 21a, 21b, and 21c show a flow chart of a function that scans all of the generalized-DOFs on an input list, and returns a list of results describing poses representing possible instance of a pattern in a run-time image;

FIGS. 22a, and 22b show a flow chart of a function used to scan the translation degrees of freedom;

FIG. 23 is an illustration of four different preferred coarse scan patterns;

FIG. 24a shows peak detection rules used by a preferred embodiment of the invention;

FIG. 24b shows symbols to be used for interpolation on hexagonal scan patterns;

FIG. 25 is a flow chart illustrating the fine scan step of FIG. 19;

FIG. 26 is a flow chart illustrating the procedure for performing fine scans;

FIG. 27 is a flow chart illustrating the procedure of FIG. 26 for performing fine scans in the x-y degrees of freedom;

FIG. 28 is an illustration of a fine x-y scan pattern;

FIG. 29 is a flow chart of the hill climbing step of FIG. 26;

FIG. 30 is a flow chart of the plus direction step of FIG. 29; and

DETAILED DESCRIPTION OF THE PREFERRED EMBODIMENTS

Figure 31:
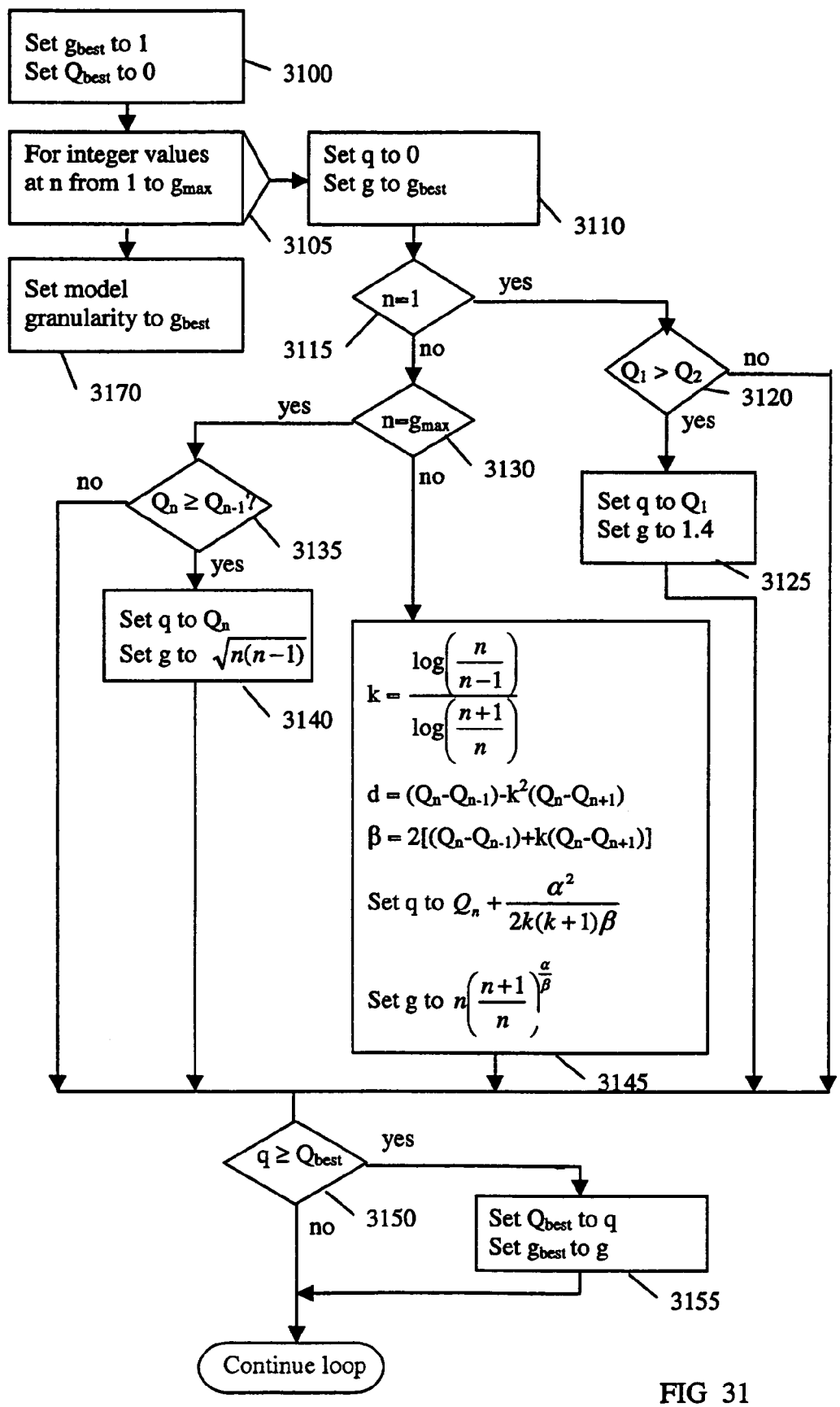
FIG. 31 is a flow chart illustrating how model granularity is selected based on ratings $Q_g$.

FIG. 1 is a high-level block diagram of one embodiment of the invention. A training image 100 containing an example of a pattern 105 to be located and/or inspected is presented. A training step 110 analyzes the training image and produces a model 120 for subsequent use. At least one runtime image 130 is presented, each such image containing zero or more instances of patterns 135 similar in shape to the training pattern 105.

For each run-time image a run-time step 140 analyzes the image 130, using the model 120, and the list of generalized-DOFs 150. As a result of the analysis, the run-time step produces a list 160 of zero or more results, each result corresponding to an instance of the trained pattern 105 in image 130 and containing a pose that maps pattern points to corresponding image points, and individual probe rating information for inspection purposes.

FIG. 2 shows a preferred embodiment of image processing steps used by the invention during training step 110 and run-time step 140 for granularity control, gradient estimation, and boundary detection. These steps process a source image 200, which can be either a training image or a run-time image.

A low-pass filter 210 and image sub-sampler 220 are used to control granularity by attenuating fine detail, such as noise or texture, in the source image that for a variety of reasons we wish to ignore. Methods for low-pass filtering and sub-sampling of digital images are well known in the art. In a preferred embodiment, a constant-time second-order approximately parabolic filter is used, as described in detail in U.S. Pat. No. 6,457,032, entitled "Efficient, Flexible Digital Filtering". The parabolic filter 210 has a single parameter s, not shown in the figure, that controls the response of the filter in both dimensions. In a preferred embodiment, a sub-sampler is used that can produce output pixels corresponding to non-integer positions of the input image by means of the well-known method of bilinear interpolation. The sub-sampler 220 is controlled by a single parameter g corresponding to the distance in pixels in both dimensions between the points of the input image to which the pixels of the output image should correspond. For example if g is 2.5 then output pixels correspond to input points (0,0), (2.5,0), (5,0), (0,2.5), (2.5,2.5), (2.5,5), (5,0), (5,2.5), (5,5), etc. Input points with non-integer coordinates are interpolated between the four surrounding pixels using bilinear interpolation.

For a preferred embodiment, the filter parameter s is tied to the sub-sample parameter g by the following formula:

$$s = \text{round}(2.15(g-1)) \quad (2)$$

Thus there is a single independent parameter g for control of the filter 210 and sub-sampler 220, which together constitute the steps used for granularity control, and therefore granularity is defined to be the value g, which is in units of source image pixels. Note that the minimum value of g is 1 pixel, which setting effectively disables the filter (since s is 0) and sub-sampler (since the spacing of output pixels is the same as input pixels), and which corresponds to the granularity limit imposed by the sensor.

The filtered, sub-sampled image is processed by a gradient estimation step 230 to produce an estimate of the x (horizontal) and y (vertical) components of image gradient at each pixel. A Cartesian-to-polar conversion step 240 converts the x and y components of gradient to magnitude and direction. Methods for gradient estimation and Cartesian-to-polar conversion are well-known in the art. In a preferred embodiment, the methods described in U.S. Pat. No. 6,408,109, entitled "Apparatus and Method for Detecting and Sub-Pixel Location of Edges in a Digital Image", herein incorporated by reference, are used. In a preferred embodiment, the source image 200 has 8 bits of gray-scale per pixel. The low-pass filter 210 produces a 16-bit image, taking advantage of the inherent noise-reduction properties of a low-pass filter. The gradient estimation step 230 uses the well-known Sobel kernels and operates on either a 16-bit filtered image, if the parameter s is set greater than 0 so as to enable the filter, or an 8-bit unfiltered image if the parameter s is set to 0 so as to disable the filter. The x and y components of gradient are always calculated to 16 bits to avoid loss of precision, and the gradient magnitude and direction are calculated to at least 6 bits using the well-known CORDIC algorithm.

The output of Cartesian-to-polar conversion step 240 is a gradient magnitude image 242 and a gradient direction image 244. These images are suitable for use by the run-time step 140, but further processing is required to identify boundary points for the training step 110. Methods for identifying points along image boundaries are well-known in the art. Any such method can be used for practice of the invention, whether based on gradient estimation or other techniques. In a preferred embodiment shown in FIG. 2, the methods described in detail in U.S. Pat. No. 6,408,109, entitled "Apparatus and Method for Detecting and Sub-Pixel Location of Edges in a Digital Image", herein incorporated by reference, are used. A peak detection step 250 identifies points where the gradient magnitude exceeds a noise threshold and is a local maximum along a 1-dimensional profile that lies in approximately the gradient direction, and produces a list of the grid coordinates (row and column number), gradient magnitude, and gradient direction for each such point. A sub-pixel interpolation step 260 interpolates the position of maximum gradient magnitude along said 1-dimensional profile to determine real-valued (to some precision) coordinates $(x_i, y_i)$ of the point. The result is a boundary point list 270 of points that lie along boundaries in the image, which includes the coordinates, direction, and magnitude of each point.

FIG. 3 shows a flow chart of a preferred embodiment of the model training step 110. A training image 100 containing an example of a pattern to be located and/or inspected is analyzed by a series of steps resulting in a model 120 containing a list of probes. Additional results of the training step are that a granularity value g is determined that is used both during the training step 110 and run-time step 140. Also, the pattern contrast is determined and stored in the model.

In the preferred embodiment shown in FIG. 3, a step 300 selects an appropriate value for the granularity control g and stores the value in the model 120. Generally lower values of g result in higher accuracy and higher values of g result in higher speed, so the tradeoff is application dependent. For any given pattern, there are limits beyond which the granularity may be too large (coarse) to resolve key pattern features or too small (fine) to attenuate inconsistent detail such as surface texture. In a preferred embodiment a user can enter a suitable granularity manually by viewing a display of boundary point list 270 superimposed on training image 100. In another preferred embodiment, the value g is set automatically based on an analysis of the training image 100 as described below.

As shown in FIG. 3 a boundary point detection step 310 processes the training image 100 to produce a list of points 270 that lie along boundaries in the training image. This step is shown in detail in FIG. 2 and described above. A connect step 320 connects boundary points to neighboring boundary points that have consistent directions, using rules further described below, to form chains by associating with each boundary point links to left and right neighbors along the boundaries, if any. A chain step 330 scans the connected boundary points to identify and catalog discrete chains. For each chain, the starting and ending points, length, total gradient magnitude, and whether the chain is open or closed is determined and stored.

A filter step 340 deletes weak chains. A variety of criteria can be used to identify weak chains. In a preferred embodiment, chains whose total gradient magnitude or average gradient magnitude are below some specified parameter are considered weak.

A segment step 350 divides chains into zones of low curvature called segments, separated by zones of high curvature called corners. Each boundary point is marked as a part of a segment or corner. Curvature can be determined by a variety of methods; in a preferred embodiment, a boundary point is considered a corner if its direction differs from that of either neighbor by more than 22.5 degrees.

A probe spacing step 360 analyzes the segments found by step 350 and determines a probe spacing that would result in all of the segments being covered by a predetermined target number of probes that are distributed evenly along the segments. The probe spacing is not allowed to fall beyond certain predetermined limits. In a preferred embodiment, the target number of probes is 64, the lower limit of probe spacing is 0.5 pixels, and the upper limit of probe spacing is 4.0 pixels.

A probe generation step 370 creates probes evenly spaced along the segments found by step 350, and stores them in the model 120.

A contrast step 380 determines the contrast of the pattern 105 in the training image 100 by using the run-time step 140 to obtain a result corresponding to the pattern 105, and extracting the contrast value from said result. Contrast is defined below.

FIG. 4 shows an example of a portion of a boundary point list 270 for a small subset of a training image 100 as might be produced by step 310. The boundary points are shown superimposed on a grid 410, which is a portion of the pixel grid of the image input to gradient estimation step 230 from which the boundary points were extracted. In a preferred embodiment using the steps of FIG. 2, as further described in U.S.

Pat. No. 6,408,109, entitled "Apparatus and Method for Detecting and Sub-Pixel Location of Edges in a Digital Image", herein incorporated by reference, no more than one boundary point will fall within any given grid element, and there will be no gaps in the boundary due to grid quantization effects. For example, the boundary point 400 falls within grid element 420, shaded gray in FIG. 4. The boundary point 400 has gradient direction and magnitude shown by vector 440. Also shown is a small straight-line section of pattern boundary 460 corresponding to the example boundary point 400 and normal to the gradient direction 440. This section of boundary is shown primarily to aid in understanding the figure. Its orientation and position along the gradient direction are significant, but its length is essentially arbitrary.

FIG. 5 shows details of the connect step 320 of the training step 110. FIG. 5a shows the same grid 410, the same example boundary points including example 400 with gradient 440, and the same example grid element 420, shaded light gray, as was shown in FIG. 4.

For every boundary point, the grid 410 is examined to identify neighboring grid elements that contain boundary points to which the boundary point should be connected. For the example boundary point 400 in grid element 420, the neighboring grid elements 500 are shown, shaded medium gray. The neighboring grid elements 500 are examined in two steps of four neighboring grid elements each, each step in a particular order, determined by the gradient direction 440 of the boundary point 400 corresponding to grid element 420.

In one step a left neighbor grid element 510 is identified, and a left link 515 is associated with the boundary point 400 identifying the boundary point 517 contained by grid element 510 as its left neighbor. In the other step a right neighbor grid element 520 is identified, and a right link 525 is associated with the boundary point 400 identifying the boundary point 527 contained by grid element 520 as its right neighbor. If a given neighbor cannot be found, a null link is associated. Note that "left" and "right" are defined arbitrarily but consistently by an imaginary observer looking along the gradient direction.

FIG. 5b shows the order in which neighboring grid elements are examined for a boundary point whose gradient direction falls between arrows 540 and 542, corresponding to a boundary tangent that falls between dotted lines 544 and 546. The sequence for identifying the left neighbor is +1, +2, +3, and +4. The first neighbor in said sequence that contains a boundary point, if any, is the left neighbor. Similarly, the sequence for identifying the right neighbor is −1, −2, −3, and −4.

FIG. 5c shows another example, where the gradient direction falls between arrows 560 and 562, corresponding to a boundary tangent that falls between dotted lines 564 and 566. The sequences of neighbors are as shown. The sequences for all other gradient directions are simply rotations of the two cases of FIGS. 5b and 5c.

Note that the sequences given in FIGS. 5b and 5c show a preference for orthogonal neighbors over diagonal neighbors, even when diagonal neighbors are "closer" to the direction of the boundary tangent. This preference insures that the chains will properly follow a stair-step pattern for boundaries not aligned with the grid axes. Clearly this preference is somewhat dependent on the specific details of how the boundary point detection step 310 chooses points along the boundary.

Once left and right links have been associated with all boundary points (some of said links may be null), a consistency check is performed. Specifically, the right neighbor of a boundary point's left neighbor should be the boundary point itself, and the left neighbor of a boundary point's right neighbor should also be the boundary point itself. If any links are found for which these conditions do not hold, those links are broken by replacing them with a null link. At the end of the connect step 320, only consistent links remain.

Many alternate methods can be used to establish boundaries within the spirit of the invention.

FIG. 6 shows details of the segment step 350, the probe spacing step 360, and the probe generation step 370. In the figure, boundary points 600, drawn as diamonds within shaded grid elements, have been marked by segment step 350 as belonging to corners, and boundary points 620, 622, 624, 626, and 640, drawn as circles within unshaded grid elements, have been marked as belonging to segments. The boundary points 620, 622, 624, and 626 belong to one segment to be explained in more detail, and the boundary points 640 belong to another segment and are shown for illustration and not further discussed. All of the boundary points of FIG. 6 are connected by left and right links as shown, for example 660, and form a portion of one chain.

Segment step 350 also determines an arc position for each boundary point along a segment, starting with 0 at the left end of the segment and increasing to the right by an amount equal to the distance between the boundary points along the segment. For example, boundary point 620 is at the left end of a segment and is at arc position 0.00 as shown. The right neighbor 622 of boundary point 620 is 1.10 pixels distant and is therefore at arc position 1.10. Similarly the right neighbor 624 of boundary point 622 is 1.15 pixels distant and is therefore at arc position 2.25. Finally, the right-most boundary point 626 along this segment is at arc position 3.20. The total arc length of a segment is defined to be the arc position of the right-most boundary point, in this example 3.20 pixels. Note that the distance between boundary points along a chain can be substantially larger or smaller than 1 pixel, particularly along diagonal boundaries where the boundary points tend to follow a stair-step pattern. By approximating true arc distance along the chain as described above, instead of considering the boundary points to be evenly spaced, grid quantization effects are substantially reduced.

Probe spacing step 360 determines a spacing value that would result in a predetermined target number of probes evenly distributed among the segments. The number of probes n that can be fit along a segment of arc length/at a probe spacing of s is given by the formula:

$$n = \text{floor}\left(\frac{l}{s}\right) + 1 \qquad (3)$$

In the example of FIG. 6 where the arc length is 3.2, one probe can fit if the spacing is greater than 3.2, two probes can fit if the spacing is greater than 1.6 but not greater than 3.2, and so on. Fewer than the target number of probes will be used to keep the spacing from falling below a predetermined lower limit, and more than the target number of probes will be used to keep the spacing from exceeding a predetermined upper limit.

Once a probe spacing value has been chosen by probe spacing step 360, the set of probes to be included in the model 120 are generated by probe generation step 370. In the example of FIG. 6, a probe spacing of 2.5 has been chosen, and applying equation 3 shows that two probes will fit along the example segment. The two probes are centered along the segment, so that the first probe location 680 is at arc position 0.35, and the second probe location 685 is at arc position 2.85. The position and direction of each probe are interpolated between the surrounding boundary points. In the example of FIG. 6, the first probe at arc position 0.35 is placed along the line segment connecting boundary points 620 and 622 and at a distance of 0.35 pixels from boundary point 620. The gradient direction of the first probe is proportionally 0.35/1.10 between the directions of boundary points 620 and 622. Similarly, the second probe at arc position 2.85 is placed along the line segment connecting boundary points 624 and 626 and at a distance of 0.60 pixels from boundary point 624. The gradient direction of the second probe is proportionally 0.60/0.95 between the directions of boundary points 624 and 626.

Probe positions and directions may be represented in any convenient coordinate system, which is referred to in this specification as pattern coordinates.

FIG. 7 shows the set of probes to be included in model 120, resulting from training step 110 shown in FIG. 1 and detailed in FIG. 3, for the pattern 105 of FIG. 1. The pattern 105 consists of 2 boundaries, the outside circular boundary 700 and the inside cross-shaped boundary 720. The boundary 700 results in one closed chain of boundary points containing one segment and no corners, since the curvature of the boundary at each point is sufficiently low. 32 probes, for example 710, are distributed evenly along boundary 700. The boundary 720 results in one closed chain of boundary points containing 12 segments and 12 corners. 32 probes, for example 730, are distributed evenly among the 12 segments of boundary 720. All probes in FIG. 7 have weight 1.0.

In some applications it is desirable to create a model 120 based on a geometric description of a known shape, rather than by example from a training image 100. This is referred to as synthetic training, and can be performed by a human designer or suitable software working from a geometric description such as CAD data. One advantage of synthetic training is that the model can be made essentially perfect, whereas any specific example of an object appearing in a training image may have defects and since the process of extracting boundary information, even from a high quality example, is subject to noise, grid quantization effects, and other undesirable artifacts. Another advantage of synthetic training by human designers is that the model designer can use application-specific knowledge and judgment to design the probes, including use of variable weights and negative weights, to achieve higher detection reliability.

FIG. 8 shows a human-designed model for locating or inspecting a rounded rectangle pattern using the invention. An ideal rounded rectangle 800 to be synthetically trained has boundary 805. 36 probes are placed along the boundary 805 as shown. 12 probes including examples 812 and 816 are placed along the top of the boundary 805, and 12 probes including examples 810 and 814 are placed along the bottom of the boundary 805. Each of these 24 probes placed along the top and bottom have weight 1.0, shown by the relative lengths of the probes. 20 of these 24 probes, including examples 810 and 812, point straight up or down, and the other 4, including examples 814 and 816, are rotated slightly due to the expected rounding of the corners.

6 probes including examples 822 and 826 are placed along the left of the boundary 805, and 6 probes including examples 820 and 824 are placed along the right of the boundary 805. Each of these 12 probes placed along the left and right have weight 2.0, shown by the relative lengths of the probes. 8 of these 12 probes, including examples 820 and 822, point straight left or right, and the other 4, including examples 824 and 826, are rotated slightly due to the expected rounding of the corners.

The use of weight 1.0 for the top and bottom, and weight 2.0 for the left and right, makes the total influence of each edge the same. The same effect could be achieved by adding 6 more probes each to the left and right sides, packing them together more densely, but this would result in 33% more probes to be processed for what may be little or no improvement in the quality of information extracted from the image. The use of variable positive weights allows the designer the flexibility to make that tradeoff.

It can be seen that any sufficiently long straight boundary in the run-time image will match almost perfectly any of the four sides of the model, even though such a straight boundary is not part of a rectangle. Similarly, any sufficiently long right-angle boundary in the run-time image will match almost perfectly fully one-half of the model, even though such a boundary is not part of a rectangle. This matching between the model and image features that are not part of the pattern to be located, which is substantial in this case due to the geometric simplicity of the pattern, significantly reduces the ability of the model to discriminate between true instances of the pattern and other image features. The problem is made more severe if the application calls for the model to be used over a wide range of angles. The problem can be mitigated by the use of negative weight probes.

In FIG. 8 imaginary lines 830, 832, 834, and 836 are drawn extending from the edges of the rounded rectangle 800. Probes with weights of −2.0, drawn with dashed lines and open arrow heads, and including examples 840, 842, 844, and 846, are placed along the imaginary lines as shown. Example negative weight probes 840, 842, 844, and 846 are placed along imaginary line 830, 832, 834, and 836 respectively. With this arrangement, any match function used by the invention that considers negative weight probes, such as the second and third match functions described in the summary section, will score approximately 0 against a sufficiently long straight boundary, and approximately 0.25 instead of 0.5 against a sufficiently long right-angle boundary.

Generalizing this example, one can see that a suitable arrangement of positive probes surrounded by negative probes along a line can be used to discriminate line segments from lines and rays. Furthermore, a suitable arrangement of positive probes bounded by negative probes on one side, along a line, can be used to discriminate rays from lines.

In the following paragraphs and associated figures describing in detail run-time step 140, certain typographic and symbolic conventions are used that are set forth in FIG. 9. Descriptions of named sets of data are presented in tabular format 900. A named set of data is analogous to a record, structure, or class as used by many conventional programming languages familiar to those skilled in the art. Such a set consists of a collection of named elements of various types. One or more instances of any given set may be used in a specific embodiment of the invention, as appropriate. A specific instance of a named set is called an object, in accord with the conventions of object-oriented programming, which usage can be distinguished by context from physical or simulated objects to be located by the invention. In the example table 900, the name of the set is given in box 905 as shown, and each element of the set occupies a row of the table 900. In each row the name of the element is given in column 910, the type of the element in column 915, and a descriptive summary of the element in column 920. Element names generally follow the conventions of common high-level programming languages for lexical program elements commonly referred to as identifiers. When an element's type is given as a real number, or as containing real numbers, the element is assumed to take on non-integral values and be represented in any specific embodiment by a fixed or floating point number of suitable but unspecified precision. When an element's type is given as a function of certain argument types and producing a certain value type, the element is assumed to be a function pointer or virtual member function as defined by common programming languages such as C and C++. The reader should understand that these descriptions of implementation are intended to be descriptive and not limiting, and that many suitable alternative implementations can be found within the spirit of the invention.

When flowcharts are used to express a sequence of steps, certain conventions are followed. A rectangle, for example 930, indicates an action be performed. A diamond, for example 940, indicates a decision to be made and will have two labeled arrows to be followed depending on the outcome of the decision.

A right-pointing pentagon, for example 950, indicates a that a sequence of loop steps are to be executed for each of a sequence of values of some variable. The loop steps are found by following an arrow, e.g. 952, extending from the point of the pentagon, and when the loop steps have been executed for the entire sequence of values, flow is to continue by following an arrow, e.g. 954, extending from the bottom of the pentagon.

An oval, for example 960, indicates a termination of a sequence of loop steps or a termination of a procedure. A down-pointing pentagon, for example 970, indicates a connection to a like-named pentagon on another figure.

At times a description in a flow chart or other text can be made more clearly and concisely in a form similar to that used in conventional programming languages. In these cases a pseudo-code will be used, which while not following precisely the syntax of any specific language will nevertheless be easily understood by anyone skilled in the art. Pseudo-code is always written in the bold, fixed-spaced font illustrated in rectangle 930. Pseudo-code is generally used for variables, references to elements of objects, simple arithmetic expressions, and procedure calls. Often the syntactic detail of programming languages obscures rather than reveals the workings of the invention, and in these cases English descriptions will be used instead of pseudo-code, for example as shown in diamond 940. In such cases implementation details can be filled in by those skilled in the art. In still other cases, particularly for vector and matrix operations, greatest clarity can be achieved using standard mathematical notation, which can represent compactly many arithmetic operations; the use of detailed pseudo-code or English would only obscure the intent.

FIG. 10 shows a data set that represents a model 120. Element probes 1000 is a list of probes created by training step 370. Element granularity 1010 is the granularity value g chosen during training step 300 and used during training step 310 to obtain the boundary points. Element contrast 1020 is the pattern contrast measured during training step 380.

FIG. 11a shows a data set 1190 that represents a probe. Element position 1100 is a 2-vector that specifies the position of the probe in pattern coordinates. Element direction 1110 specifies the gradient direction expected by the probe, again relative to the probe coordinate system. In a preferred embodiment, a binary angle is used to represent direction to simplify angle arithmetic using well-known methods. Element weight 1120 specifies the weight assigned to the probe, which can be positive or negative. In a preferred embodiment, zero weight probes are not used.

FIG. 11b shows a data set 1195 that represents a compiled probe. A list of compiled probes is generated from the probe list 1000 stored in model 120 based on a specific combination of generalized-DOF parameters that specify an overall coordinate transform representing the non-translation degrees of freedom. Element offset 1130 is the pixel address offset of the probe in the gradient magnitude image 242 and the gradient direction image 244 (i.e. the same offset applies to both images). Element direction 1140 is the expected gradient direction, mapped to image coordinates. Element weight 1150 is the probe weight, copied from the corresponding probe object and in some embodiments converted from a real to a scaled integer to take advantage of integer multiply hardware.

FIGS. 12a and 12b gives details of a function compileProbes 1200 that converts the list of probe objects 1000 stored in model 120 to a list of compiled-probe objects 1195. Starting on FIG. 12a, function compileProbes 1200 takes map input 1202 and probeMER input 1204 as shown, and returns a list of compiled-probe objects. Note that probeMER input 1204 is a reference to a rectangle to be set by compileProbes, and so may be considered an output or side-effect, but is listed as an input following the usual programming convention that a function can return only one value or object.

Step 1205 and step 1210 perform initialization as shown. Loop step 1215 specifies a sequence of steps for each probe object in the list of probe objects 1000 stored in model 120. Step 1220 sets up a new compiled-probe object. Step 1225 copies the weight 1150 from the corresponding probe object, and in some embodiments may convert it to a format more suited to efficient processing on the available hardware. Continuing to FIG. 12b, in step 1230, some definitions are made for the subsequent math. In step 1235, the probe position 1100 is mapped to image coordinates using the input coordinate transform 1202 and rounded to an integer image pixel offset in x (e.g., horizontal) and y (e.g., vertical), from which is computed an offset 1130 based on the address difference of pixels in the gradient magnitude image 242 and the gradient direction image 244. The use of a single offset value 1130, instead of the (x, y) pair, allows higher speed access to gradient magnitude or direction as the set of compiled probes are translated around the images.

In step 1240 the expected gradient direction 1110 is mapped to an image coordinate relative value 1140. The formula for the mapped direction 1140 effectively does the following, reading the vector and matrix operations 1242 right to left:

Construct a unit vector 1270 in the gradient direction, with respect to pattern coordinates, by computing the cosine and sine of the angle.

Rotate the unit vector 90° 1272 to get a direction along the boundary that contains the probe.

Map the rotated unit vector to image coordinates 1274 to get a boundary direction in image coordinates.

Rotate the mapped rotated unit vector −90° 1276 to get a direction normal to the boundary in image coordinates.

If the determinant of the transform matrix is negative, the transform changes the left-handedness or right-handedness of the coordinate system, so rotate the vector 180° 1278 because the −90° of the previous step should have been +90°.

Compute the angle of the resulting vector 1280 using the well-known version of the arctangent function of two arguments whose result is in the range 0° to 360°.

Note that in computing mapped expected gradient direction 1140 the boundary direction is mapped instead of the gradient direction. This is necessary to handle the general case where the transform matrix C is not orthonormal. If C is orthonormal, i.e. if $C_{11}=C_{22}$ and $C_{12}=-C_{21}$, then step 1240 can be replaced with a step that simply adds the constant $\arctan(C_{21}/C_{11})$ to the probe direction 1110.

Note as shown in step 1240 that these calculations can be simplified considerably 1290. In a preferred embodiment the arctangent function is computed using the well-known CORDIC method.

Step 1245 keeps track of the minimum enclosing rectangle in integer pixels of the mapped probes, for subsequent use by the invention to detect duplicate results by determining the extent to which pairs of results overlap. Note that the size and shape of the minimum enclosing rectangle will vary depending on the settings of the generalized-DOF parameters, and so must be recomputed for each such setting.

Step 1250 marks the end of the loop steps; control flows back to step 1215 on FIG. 12*a* to continue with the next probe. If there are no more probes, control flows to step 1255, which returns the list of compiled-probe objects to the caller of the compileProbes function 1200.

FIG. 13 gives details for the match functions used by the invention. FIGS. 13*a* and 13*b* show examples of direction rating factor functions. A direction rating factor is value between 0 and 1 that indicates degree of match between a probe's expected gradient direction 1140 and the actual gradient direction found in a gradient direction image 244 under the probe. A direction rating factor function produces a direction rating factor as a function of direction error, defined as an angle measured from the expected gradient direction to the actual gradient direction. Any of a variety of direction rating factor functions could in principal be used to practice the invention.

There are two general types of direction rating factor functions, called consider polarity and ignore polarity functions. The difference between the two types is in how they handle direction errors at and around 180°, which corresponds to a gradient direction opposite from what was expected, implying that the boundary is in the expected orientation but the dark-to-light transition of image brightness across the boundary is opposite in polarity from expected. The "consider polarity" functions return 0 at and around 180°, so that polarity reversals do not match the pattern, while the ignore polarity functions return 1 at and around 180°, so that polarity reversals do match the pattern. Choice between "consider polarity" and "ignore polarity" is application dependent, and so in a preferred embodiment, the user can select either type.

In a preferred embodiment the consider polarity direction rating factor function of FIG. 13*a* is used. The function is at 1 from 0° 1300 to 11.25° 1302, then falls in a straight line to 0 at 22.5° 1304, remains at 0 until 337.5° 1306, rises in a straight line to 1 at 348.75° 1308, and remains at 1 until 360° 1310 (which is the same as the 0° point 1300). In a preferred embodiment the corresponding ignore polarity direction rating factor function of FIG. 13*b* is used. The points 1320, 1322, 1324, 1326, 1328, and 1330 correspond exactly to the points 1300, 1302, 1304, 1306, 1308, and 1310, respectively, of FIG. 13*a*. The points 1332, 1334, 1336, and 1338 correspond to points 1328,1322, 1324, and 1326, respectively, but shifted 180°. Note that the points 1320 and 1330 have no corresponding points shifted 180°, since these points are an artifact of the decision to start the drawing at 0°.

FIG. 13*c* shows an example of a magnitude rating factor function. A magnitude rating factor is a value between 0 and 1 that indicates a degree of confidence that a particular pixel position lies along a boundary and therefore that a probe test made at said position would result in reliable evidence for, in the case of positive weight probes, or against, in the case of negative weight probes, the existence of an instance of the trained pattern 105 at the pose under test. A magnitude rating factor function produces a magnitude rating factor as a function of gradient magnitude. Any of a variety of magnitude rating factor functions could in principal be used to practice the invention.

In a preferred embodiment the magnitude rating factor function of FIG. 13*c* is used. The function is 0 at magnitude 0 1350, rises in a straight line to 1 at a point 1352 corresponding to a certain target magnitude further described below, and continues at 1 until the maximum magnitude 1354, which in the illustrated embodiment is 255.

The goal in the design of the example magnitude rating factor function of FIG. 13*c* is primarily to distinguish between noise and true boundaries. The intention is that an embodiment of the invention using this magnitude rating factor function be sensitive to the shape of boundaries but not overly sensitive to the contrast and sharpness of the boundaries. A separate target magnitude point 1352 is computed for each distinct pose (placement of probes), since global decisions about what is noise and what is signal are notoriously unreliable. If we consider only the set B of positive weight probes with a high direction rating factor, it is reasonable to assume that a majority of probes in B lie along a true boundary and not noise. The median gradient magnitude $m_{median}$ under the probes in B is a good guess as to a representative gradient magnitude value corresponding to the boundary. In a preferred embodiment we choose target point 1352 to have the value $0.7\ m_{median}$.

In the following let:
$p_i$ be the offset 1130 of the compiled probe 1195;
be the direction 1140 of the $i^{th}$ compiled probe 1195;
$w_i$ be the weight 1150 of the $i^{th}$ compiled probe 1195;
M(a) be the gradient magnitude at offset a in gradient magnitude image 242;
D(a) be the gradient direction at offset a in gradient magnitude image 244;
$R_{dir}(\ )$ be a direction rating factor function, for example the one in FIG. 13*a* or FIG. 13*b*; and
$R_{mag}(\ )$ be a magnitude rating factor function, for example the one in FIG. 13*c*.

With these definitions, it can be seen that for a set of compiled probes placed at offset a in gradient magnitude image 242 or gradient direction image 244, $M(a+p_i)$ is the gradient magnitude under compiled probe i
$D(a+p_i)$ is the gradient direction under compiled probe i
$D(a+p_i)-d_i$ is the direction error at compiled probe i In the following equations, a term of the form "x=y" or "x>y" is 1 if the expression is true and 0 otherwise, following the conventions of the C programming language. This is not standard algebraic notation, but tends to simplify and clarify the formulas.

To avoid having to set a threshold to decide whether or not a probe is a member of B, a probe's direction rating factor is used to specify a weighted membership value. For a specific set of compiled probes (i.e. corresponding to specific settings of the generalized-DOF parameters) a weighted histogram $H_a(m)$ of gradient magnitude for complied probes placed at image offset a is computed as follows:

$$H_a(m) = \Sigma_i \max(w_i, 0)(M(a+p_i)=m)R_{dir}(|D(a+p_i)-d_i|) \quad (4a)$$

Equation 4a states that each bin m of the histogram H is the sum of direction rating factors, weighted by probe weight $w_i$, for all positive weight probes where the gradient magnitude under the probe is m. From histogram H can be computed the median gradient magnitude by finding the value $m_{median}$ such that:

$$\sum_{i=0}^{m_{median}} H_a(i) = \sum_{i=m_{median}}^{255} H_a(i) \qquad (4b)$$

The first match function $S_{1a}$, used in the coarse scan step 1925 of FIG. 19, can now be defined as follows:

$$S_{1a}(a) = \frac{\sum_i \max(w_i, 0) R_{dir}(|D(a+p_i) - d_i|)}{\sum_i \max(w_i, 0)} \qquad (5a)$$

This gives the first match score at any offset a of the compiled probes. As can be seen from equation 5a, only positive weight probes are used. The first variation $S_{1b}$, which, to achieve higher execution speed doesn't use probe weight (except to select positive weight probes) is:

$$S_{1b}(a) = \frac{\sum_i (w_i > 0) R_{dir}(|D(a+p_i) - d_i|)}{\sum_i (w_i > 0)} \qquad (5b)$$

The first match function using the first and second variations $S_1$, which subtracts the expected value of the direction rating factor on random noise, and is used in a preferred embodiment, is:

$$S_1(a) = \frac{\sum_i (w_i > 0)[R_{dir}(|D(a+p_i) - d_i|) - N]}{(1-N) \sum_i (w_i > 0)} \qquad (5c)$$

where noise term N is given by:

$$N = \frac{1}{360} \int_0^{360} R_{dir}(\theta) \, d\theta \qquad (6)$$

Using the noise term in the first match function is important because, due to the higher computational cost, gradient magnitude is not used to filter out noise. Note that the computation of $S_1$ as specified by equation 5c can be arranged so that the use of N adds no per-probe cost. For the preferred "consider polarity" direction rating factor function of FIG. 13*a*, N=3/32. For the preferred "ignore polarity" direction rating factor function of FIG. 13*b*, N=3/16.

The second match function $S_2$ used in the fine scan step 1940 of FIG. 19 is:

$$S_2(a) = \sum_i w_i M(a+p_i) R_{dir}(|D(a+p_i) - d_i|) \qquad (7)$$

The third match function $S_3$ used in the scoring steps 1930 and 1945 is:

$$S_3(a) = \frac{\sum_i w_i R_{mag}(M(a+p_i)) R_{dir}(|D(a+p_i) - d_i|)}{\sum_i w_i} \qquad (8)$$

FIG. 14 shows a data set 1490, that represents a generalized-DOF. In a preferred embodiment using the C++ programming language, FIG. 14 describes an abstract base class that specifies the interface for any generalized-DOF. Specific generalized-DOFs, corresponding in a preferred embodiment to concrete derived classes, will be described below. In FIG. 14, elements low 1400 and high 1405 specify the range of parameter values to be searched, as appropriate for the application. If low≦high, the parameter value is fixed for this generalized-DOF—no searching is done, but the fixed parameter value contributes to all poses considered by run-time step 140 and returned in list of results 160. In a preferred embodiment the invention requires low≦high except for cyclic generalized-DOFs.

Element maxStepSize 1410 specifies the maximum allowable increment in parameter value for the coarse scan step 1925 or fine scan step 1940. In a preferred embodiment maxStepSize 1410 is chosen automatically for each generalized-DOF based on the geometry of the probes, as described below. Element maxStepSize 1410 should be set so that the pattern 105 will match sufficiently well against an instance in the run-time image 130 even if the pose is off by up to one-half maxStepSize 1410 in every generalized-DOF that does not have a fixed parameter value.

Element dupRange 1415 specifies a range of parameter values within which distinct results may be considered duplicates. Two results are duplicates if they overlap sufficiently in position (i.e. the translation degrees of freedom) and if for each generalized-DOF their respective parameter values are within the dupRange 1415 of that generalized-DOF.

Element start 1420 specifies the actual start of the range of parameter values to be searched, which extends half stepSize 1435 beyond the requested range given by low 1400 and high 1405 so that interpolation can be performed up to the limit of the requested range.

Element numCoarseSteps 1430 gives the number of steps in stepSize 1435 increments to be used during coarse scan step 1925. Element stepSize 1435 is derived from maxStepSize 1410 and the requested range from low 1400 to high 1405 such that stepSize 1435 is not greater than maxStepSize 1410 and there are an integral number of steps to cover a range that extends one-half step beyond low 1400 and high 1405. Note that if a generalized-DOF is cyclic and the range covers the entire cycle, then 2 fewer steps are needed because the ends of the range are coincident.

Element cycle 1440 specifies one cycle for cyclic generalized-DOFs (e.g., 360°, or 0 for non-cyclic generalized-DOFs). Adding or subtracting cycle 1440 to any parameter value has no effect on the pose. The element cycle 1440 allows cyclic and non-cyclic generalized-DOFs, which are much more similar than different, to share a large body of code with only minor special case handling in several places.

Element mapper 1445 is a function that converts a parameter value to an equivalent coordinate transform. In a preferred embodiment, mapper 1445 is a virtual function. Element mapper 1445 is the key to the generalized-DOF method, because the resulting coordinate transforms can be composed to produce a pose regardless of the type, number, and order of generalized-DOFs used by the invention in any given embodiment. In a preferred embodiment the coordinate transform produced by mapper 1445 includes a translation vector, but it is always 0.

Elements stepSizeMatrix 1450 and stepSizeFactor 1455 are used to compute maxStepSize 1410 based on the geometry of the probes and the nature of the generalized-DOF, as further described below. Element scaleFactor 1460, a virtual function in a preferred embodiment, computes the factor by which the pattern is scaled by this generalized-DOF (changed in size) at the middle of the search range between low 1400 and high 1405. This is used as a rough estimate of the change in scale from the training image 100 to the run-time image 130, so that certain parameters, such as granularity 1010, can be adjusted.

FIG. 15 is a table that details specific generalized-DOFs that can be used with the invention. Many other variations not shown can be devised based on the teachings disclosed herein. Each row of the table describes a specific generalized-DOF, while the columns generally specify values for specific elements.

Column 1500 describes the parameter used by the generalized-DOF. In a preferred embodiment, rotational generalized-DOFs, e.g. 1540 and 1545, use an angle parameter in degrees. Radians are not used because one cycle (i.e. $2\pi$) cannot be represented exactly in any practical device. Size-related generalized-DOFs use either a scale factor parameter, e.g. 1570, 1575, and 1580, or a logarithmic scale factor parameter, e.g. 1550, 1555, and 1560. Aspect ratio generalized-DOFs use either a ratio parameter, e.g. 1585, or a logarithmic ratio parameter, e.g. 1565.

Element cycle 1440 is set to 360° for rotational generalized-DOFs, e.g. 1540 and 1545, and 0 otherwise. Element stepSizeFactor 1455 is set to 180 hr to convert radians to degrees for rotational generalized-DOFs, e.g. 1540 and 1545, and 1 otherwise. Function element scaleFactor 1460 returns the scale factor at the geometric midpoint of the search range for uniform size-related generalized-DOFs, e.g. 1550 and 1570, the square root of the scale factor at the geometric midpoint of the search range for non-uniform size-related generalized-DOFs, e.g. 1555, 1560, 1575, and 1580, and 1 for non-size related generalized-DOFs. For non-uniform size-related generalized-DOFs, the square root-is a reasonable estimate of the overall effect when size is varying in one dimension but not the other.

For function element mapper 1445, only the 2×2 matrix component of the coordinate transform is shown; the vector translation component is 0. Element stepSizeMatrix 1450 is determined by taking the derivative $$\frac{d\,mapper(x)}{dx}$$

and evaluating the resulting matrix at parameter value x such that mapper(x) is the identity transform.

FIG. 16 shows details of the list of generalized-DOFs 150 used in a preferred embodiment of the invention. As described in the summary section, the list 150 specifies nested loops for the coarse scan step 1925 and fine scan step 1940. The list 150 specifies both the nesting order for scanning the search space and the order in which the coordinate transforms produced by the mapper functions 1445 are composed to get the overall pose for the non-translation degrees of freedom. For the preferred embodiment shown in FIG. 16, a log y size generalized-DOF 1560 is the first element of list 150, is the outermost loop in the scanning sequence, and its transform is applied first in mapping from pattern to image coordinates. Next is log x size generalized-DOF 1555, followed by log size 1550, and finally rotation 1540, which is the innermost loop in the scanning sequence, and its transform is applied last in mapping from pattern to image coordinates. Other orders are possible, and are chosen to suit the particular application.

There is a redundant degree of freedom among list 150 elements log y size 1560, log x size 1555, and log size 1550. These three generalized-DOFs cover only a two degree of freedom search space, which any of the three possible pairs are sufficient to cover. The use of these three, however, gives the user of the invention much greater flexibility in specifying the search space than if only two non-redundant generalized-DOFs were used. Specifically, the user has 7 sensible choices-holding all three fixed, allowing anyone to vary, and allowing any pair to vary.

FIG. 17 shows a data set that represents a result corresponding to an instance of a pattern 105 in a run-time image 130. A list of results 160 is the primary output of the invention. Element position 1700 specifies the position in image coordinates of the origin of the pattern coordinate system at the match pose, i.e. the pose corresponding to the instance of pattern 105 in run-time image 130 represented by the result. Element probeMER 1710 specifies the minimum enclosing rectangle in image coordinates of the probes at the match pose, and is used to determine whether or not two results overlap sufficiently in position to be considered possible duplicates.

Element score 1720 is the match score, which is refined and updated as run-time step 140 progresses. During coarse scan step 1925 it is set to a value interpolated among a set of values of first match function $S_1(a)$ of Equation 5c, evaluated at a corresponding set of offsets a in gradient direction image 244 that includes a local maximum of $S_1$ and its neighbors. Subsequently during the coarse scan step 1925, element score 1720 is refined by interpolating among neighboring results in each non-fixed generalized-DOF. During fine scan step 1940 it is set to second match function $S_2$ of Equation 7. During steps 1930 and 1945, score 1720 is set to the value of third match function $S_3$ of Equation 8.

Element contrast 1730 is set to the median gradient magnitude value $m_{median}$, as defined by equations 4a and 4b, and computed as part of determining target gradient magnitude point 1352 needed for third match function $S_3$.

Element DOFParameters 1740 is a list of generalized-DOF parameters corresponding to generalized-DOF list 150 and specifying the non-translation degrees of freedom of the pose represented by the result. Element DOFIndices 1750 is a list of step indices corresponding to generalized-DOF list 150. A step index for a generalized-DOF is an integer between 0 and numCoarseSteps −1 that indicates a specific step during the coarse scan step 1925 for said generalized-DOF. Element DOFIndices 1750 is used to identify results that are neighbors along a generalized-DOF, as further described below.

FIG. 18 shows how position overlap is calculated for a pair of results to determine if they might be neighbors or duplicates. Overlap is a value between 0 and 1 inclusive that indicates degree of position overlap (i.e. overlap in the translation degrees of freedom) between two results.

In FIG. 18a, rectangle 1800 is the element probeMER 1710 of a first result, with center point 1802 at distance $w_1$ 1804 from the left and right edge and distance $h_1$ 1806 from the top and bottom edge. Similarly, rectangle 1810 is the element probeMER 1710 of a second result, with center point 1812 at distance w$_2$ 1814 from the left and right edge and distance h$_2$ 1816 from the top and bottom edge.

Since in general the minimum enclosing rectangles are of different shapes, the relative positions d$_x$ 1818 and d$_y$ 1808 of the center points 1802 and 1812 as shown in FIG. 18b are used instead of area of intersection to determine overlap. The formula for overlap is the product of an x overlap term and a y overlap term, as follows:

$$\left[\max\left(1 - \frac{d_x}{w_1 + w_2}, 0\right)\right] \cdot \left[\max\left(1 - \frac{d_y}{h_1 + h_2}, 0\right)\right] \quad (9)$$

FIG. 18c shows examples of overlap 1.0 1820, overlap 0.5 1825 and 1835, overlap 0.25 1840, and overlap 0.0 1830 and 1845.

FIG. 19 is a top-level flow chart of a preferred embodiment of run-time step 140. Step 1900 sets pseudo-code identifiers model and dofList to model 120 and list of generalized-DOFs 150, respectively, for reference by subsequent pseudo-code.

Step 1905 determines the "nominal" scale factor $s_{nominal}$ of the set of ranges of parameters of all the generalized-DOFs. This is a crude estimate of the typical scale factor of the non-translation poses generated by list of generalized-DOFs 150, and is most useful when the range of scale factors is small and significantly different from 1.0, i.e. the patterns are expected to be significantly larger or smaller in run-time image 130 than training image 100. The value $s_{nominal}$ is the product, over generalized-DOF elements 1490 of dofList 150, of all values scaleFactor 1460 of FIG. 14.

Step 1910 computes run-time granularity $g_{run}$ as the product of training granularity model granularity 1010 and $s_{nominal}$ but not less than 1.0. Step 1915 processes run-time image 130 to obtain gradient magnitude image 242 and gradient direction image 244, following the steps of FIG. 2, and using run-time granularity $g_{run}$.

Step 1920 determines, for each generalized-DOF element 1490 of dofList 150, settings for maxStepSize 1410, start 1420, numCoarseSteps 1430, and stepSize 1435.

In a preferred embodiment, maxStepSize 1410 is computed from the geometry of the probes and the number of non-fixed generalized-DOFs. In the following, let:

p$_i$ be the position vector 1100 of the probe 1190;

(x$_i$, y$_i$) be the components of the position vector 1100 of the i$^{th}$ probe 1190;

θ$_i$ be the direction 1110 of the i$^{th}$ probe 1190;

u$_i$ be a unit vector in direction 1110 of the i$^{th}$ probe 1190;

w$_i$ be the weight 1120 of the i$^{th}$ probe 1190;

n be the number of generalized-DOFs on dofList 150 that are not fixed, i.e. where low 1400 does not equal high 1405;

M be a stepSizeMatrix 1450 of a generalized-DOF 1490; and f be a stepSizeFactor 1455 of a generalized-DOF 1490.

Define the center of projection c=(c$_x$, c$_y$) of a list of probes 1000 as the point that minimizes the sum of squared distance between lines, passing through the probes positions normal to the gradient direction, and said point. The center of projection is similar to center of mass of a set of points, except that center of projection considers the probes to provide information in only one degree of freedom, the gradient direction, instead of 2 degrees of freedom as for a normal point. Center of projection can be computed as follows:

$$r_i = x_i \cos(\theta_i) + y_i \sin(\theta_i) \quad (10)$$

$$c_x = \frac{\sum_i r_i \cos(\theta_i) \sum_i \sin^2(\theta_i) - \sum_i r_i \sin(\theta_i) \sum_i \cos(\theta_i)\sin(\theta_i)}{\sum_i \cos^2(\theta_i) \sum_i \sin^2(\theta_i) - \left(\sum_i \cos(\theta_i)\sin(\theta_i)\right)^2}$$

$$c_y = \frac{\sum_i r_i \sin(\theta_i) \sum_i \cos^2(\theta_i) - \sum_i r_i \cos(\theta_i) \sum_i \cos(\theta_i)\sin(\theta_i)}{\sum_i \cos^2(\theta_i) \sum_i \sin^2(\theta_i) - \left(\sum_i \cos(\theta_i)\sin(\theta_i)\right)^2}$$

For each generalized-DOF element 1490 of dofList 150, maxStepSize 1410 is computed as follows:

$$b = \sqrt{\frac{\sum_i w_i \cdot [u_i \cdot (M(p_i - c))]^2}{\sum_i w_i}} \quad (11)$$

$$maxStepSize = \frac{f \cdot \min\left(\frac{1.5}{b}, 0.2\right)}{\sqrt{n}} \quad (12)$$

Equation 11 computes a baseline b in units of distance that is a measure of the sensitivity of the probes to motion induced by the generalized-DOFs parameter. For example, a circular boundary would have probes pointing radially that would be very sensitive to size changes but insensitive to rotation. In the equation, probe position vectors p 1100, relative to center of projection c, are adjusted depending on the specific generalized-DOF by matrix M 1450, and then the dot product with unit vector u in the probe direction 1110 is taken. In the example of a circular boundary, for a size generalized-DOF, e.g. 1550 or 1570, M is such that the said dot product gives the radius of the circle, and baseline b also becomes the radius of the circle. For a rotation generalized-DOF such as 1540, M is such that the said dot product gives 0. In equation 12, the bigger the baseline b, the more sensitive is the pattern to changes in the parameter of the generalized-DOF, and so the smaller the step size should be. The constants 1.5 and 0.2 are used in a preferred embodiment, although other constants can be used to obtain similar performance in other applications. The step size is further reduced by the square root of the number of generalized-DOFs that can vary, since if the pose can be off in more degrees of freedom simultaneously then the step sizes must be smaller.

Once maxStepSize 1410 is set, elements start 1420, numCoarseSteps 1430, and stepSize 1435 are set as shown in FIG. 20 and described below.

Step 1925 does the coarse scan of the entire search space, producing a preliminary list of results 160 for further processing. Note that the second argument I is the identity transform. Coarse scan step 1925 is described in more detail below.

Step 1930 evaluates the third match function S$_3$ (equation 8) for each element of results 160, at the pose determined by coarse scan step 1925. The purpose of step 1930 is to qualify each result as being sufficiently high in score to be worth running the fine scan step 1940. Step 1930 is reasonably fast since only one pose is evaluated for each result.

Step 1935 discards both weak results and duplicate results. In a preferred embodiment, a weak result is one whose score 1720 is below some fraction of a global accept threshold chosen to be suitable for the application. For step 1935, said fraction is 0.75 —only results substantially weaker than the accept threshold are discarded, since the fine scan step 1940 might improve the score. In a preferred embodiment a pair of results are considered duplicates if their overlap value, as described in FIG. 18, is at least 0.8, and if their lists of generalized-DOF parameters DOFParameters 1740 agree to within dupRange 1415 for all generalized-DOFs on dofList 150. For all duplicate pairs in results 160, the member of the pair with the lower score 1720 is discarded.

Step 1940 does the fine scan on each remaining result in results 160, as further described below. Step 1940 establishes the final position 1700, probeMER 1710, and DOFParameters 1740 for each result 1790.

Step 1945 evaluates the third match function $S_3$ (equation 8) for each element of results 160, at the pose determined by fine scan step 1940. Step 1945 establishes the final score 1720 and contrast 1730 for each result 1790. Step 1945 also stores individual probe ratings, which are the product of magnitude rating factor $R_{mag}$ and direction rating factor $R_{dir}$ from equation 8, in result element 1760.

Step 1950 repeats step 1935 to discard weak and duplicate results. For step 1950, however, weak results are defined to be those whose score 1720 is below 0.9 of the global accept threshold.

FIG. 20 provides more details on the setting of generalized-DOF elements start 1420, numCoarseSteps 1430, and stepSize 1435 in step 1920. Step 2000 determines if the requested range of parameter values between low 1400 and high 1405 is sufficiently large to require coarse scanning. If the range from low 1400 to high 1405 is not greater than maxStepSize 1410, then no coarse scanning is required and so numCoarseSteps 1430 is set to 1 in step 2005, and start 1420 is set to the midpoint of the range in step 2010.

If coarse scanning is required, numCoarseSteps 1430 is set in step 2020 to be the range divided by maxStepSize 1410, but rounded up to the nearest integer. Note that this is not yet the final value for numCoarseSteps, because boundary conditions must be considered. The actual step size stepSize 1435 is then set in step 2025 to be the range divided by numCoarseSteps. The result of steps 2020 and 2025 is that stepSize 1435 is the smallest value that can cover the range in the same integral number of steps as can be done by maxStepSize 1410.

Step 2030 tests to see if the generalized-DOF is cyclic and if the requested range covers the full cycle. If so, start 1420 is set to low 1400 in step 2040—in this case it doesn't really matter where the scan starts. The value of numCoarseSteps 1430 computed in step 2020 is correct, because the range has no end points. If the requested range is not a full cycle (including non-cyclic generalized-DOFs), start 1420 is set one-half step below low 1400 in step 2050, and numCoarseSteps 1430 is increased by two in step 2060 to cover the end points.

FIG. 21a is a flow chart of a function coarseScanDOF 2100 that scans all of the generalizedDOFs on input list dofList 2102, and returns a list of results 1790 describing poses representing possible instances of pattern 105 in run-time image 130. Function coarseScanDOF 2100 is a recursive function-it operates on an outermost generalized-DOF which is the first element of input list 2102, and calls itself to operate on the inner generalized-DOFs represented by the rest of the list. At each level of the recursion a partial pose is constructed by composing a current mapper 1445 transform with the input map 2104 constructed by recursion levels representing outer generalized-DOFs, and passing said partial pose along to recursion levels representing inner generalized-DOFs. At the outermost level in step 1925 the identity transform is provided for input map 2104. At the innermost level, when step 2110 determines that input dofList 2102 is null, the non-translation portion of the pose is complete and the procedure coarseScanXY 2200 of FIG. 22a is called in step 2112 to scan the translation degrees of freedom.

If input dofList 2102 is not null, step 2114 extracts the first element representing the current generalized-DOF, and the rest of the list representing inner generalized-DOFs. An empty results list is allocated in step 2116. Loop step 2118 executes search loop 2130 for a sequence of values of a step index. Each iteration of loop search 2130 scans one parameter value of the current generalized-DOF. When the scanning is complete, loop step 2120 executes peak loop 2160 for every result found by scan loop 2118. Each iteration of peak loop 2160 determines whether a result is a peak—a local maximum in the current generalized-DOF—and if so, interpolates it, otherwise marks it for deletion. Step 2122 actually deletes all results marked for deletion, and finally step 2124 returns the list of remaining results.

FIG. 21b is a flow chart of search loop 2130. Step 2140 computes the parameter value corresponding to the current step index. Step 2142 is the recursive call to coarseScanDOF 2100 that scans the inner generalized-DOFs. Note the second argument, which composes the current mapper transform with map input 2104. Loop steps 2144, 2146, 2148, and 2150 add the current step index and parameter value to the beginning of elements DOFIndices 1750 and DOFParameters 1740 in every result 1790 returned by recursive step 2142. Finally, in step 2151 the list of results returned by recursive step 2142 is added to the end of results and in step 2154 the search loop continues to the next index at step 2118 of FIG. 21a.

FIG. 21c is a flow chart of peak loop 2160, which operates on an specific result r. Steps 2170 and 2172 search results for a previous and next neighbor of r, respectively. A neighbor of r is a result whose step index for the current generalized-DOF, which is the first element of DOFIndices 1750, differs by exactly 1 from that of r, whose step indices for all inner generalized-DOFs, which are the second and subsequent elements if any of DOFIndices 1750, differs by no more than 1 from that of r, and whose overlap value with r (equation 9) is at least 0.8. For cyclic generalized-DOFs where the scan range covers the full cycle, step index differences are considered modulo numCoarseSteps 1430. A previous neighbor is a neighbor where the current step index difference is −1, and a next neighbor is a neighbor where the current step index difference is +1.

Step 2174 determines if result r is a peak (local maximum in score) compared to its neighbors. Note that if a previous or next neighbor was not found, its score is assumed to be 0. If not, r is marked for deletion in step 2176. If so, the parameter value is interpolated in step 2178, and, if both a previous and next neighbor were found, the score is interpolated in step 2180, and then the loop is continued in step 2182.

The following 3-point parabolic interpolation functions are used:

$$InterPos(l,c,r) = \frac{r-l}{4c - 2(l+r)} \quad (13)$$

$$InterPos(l, c, r) = c + \frac{(r-l)^2}{16c - 8(l+r)}$$

The interpolated parameter value is obtained by adding: stepSize * InterpPos(prevResult.score, r. score, nextResult.score to the current value. The interpolated score is: InterpScore(prevResult. score, r. score, nextResult. score)

FIG. 22a is a flow chart of a function coarseScanXY 2200 used by coarseScanDOF 2100 to scan the translation degrees of freedom. In takes one input map 2202 that specifies the non-translation portion of the pose, and returns a list of results 1790 representing potential instances of pattern 105 in runtime image 130 at poses corresponding to map 2202.

Step 2210 allocates an empty list of results. Step 2212 compiles list of probes 1000 using function compileProbes 1200 resulting in a list of compiled probes 1195 and a minimum enclosing rectangle of the probes. Step 2214 evaluates first match function $S_1(a)$ at a subset of possible offsets a in gradient magnitude image 244, as selected by a scan pattern described below. Only image offsets a such that all of the compiled probes, each placed at its offset 1130 relative to a, contained in said image 244, are evaluated by step 2214.

Loop step 2216 iterates over the scores evaluated in step 2214, and step 2218 examines the scores and looks for local maxima above a noise threshold. In a preferred embodiment, the noise threshold is set to 0.66 of the global accept threshold. Detection of local maxima is described below. When a local maximum above the noise threshold is found, new result loop 2240 is executed; otherwise, control flows to step 2220 and then back to 2216. When all the scores have been examined by step 2218, control passes to step 2222 which returns any results found.

FIG. 22b is a flow chart of new result loop 2240, which is executed whenever a local maximum in score above the noise threshold is found by step 2218. Step 2242 allocates a new result 1790. Step 2244 initializes the values by setting position 1700 to an interpolated position of the maximum score, score 1720 to an interpolated score, probeMER 1710 to the minimum enclosing rectangle computed by compileProbes 1200, offset by the interpolated position of the maximum score, and lists DOFParameters 1740 and DOFIndices 1750 to empty lists.

Step 2246 searches the results found so far for a duplicate of the new result. In a preferred embodiment, a duplicate is a result with overlap value (equation 9) of at least 0.8. Steps 2248 and 2250 select among three cases. If no duplicate was found, step 2252 adds the new result to the list. If a duplicate was found with a score lower than the new result, step 2254 replaces the duplicate with the new result. If a duplicate was found with a score not lower than the new result, step 2256 discards the new result. Finally, step 2258 transfers control back to step 2216 to continue looking for local maxima.

FIG. 23 shows coarse x-y scan patterns used by step 2214 in a preferred embodiment. In each example the dots indicate relative positions to be evaluated. Traditionally template matching systems have evaluated a match score at every position, or in a square pattern of sub-sampled positions, and the same may be done in a less preferred embodiment of the invention. The patterns shown in FIG. 23, called hexagonal scan patterns due to the shape of the neighborhoods, e.g. 2304, 2314, 2324, and 2334, are both more efficient and more flexible than a square or any other pattern method. With hexagonal patterns it is possible to evaluate a fraction of possible positions, i.e. ½ for example 2300, ¼ for example 2310, ⅙ for example 2320, and ⅑ for example 2330, that is not restricted to reciprocals of perfect squares, as for square subsampling patterns, and not significantly anisotropic, as for rectangular sub-sampling patterns. For a given fraction of positions, the worst case distance from any point in the plane to the nearest evaluated point is less for the hexagonal pattern than for any other pattern. Since the grid itself is square it is only possible to approximate a hexagonal pattern, but the worst case distance is still very close to optimum. In a preferred embodiment, the ¼ pattern 2310 is used.

FIG. 23 shows example evaluated points 2302, 2312, 2322, and 2332, and corresponding neighborhoods 2304, 2314, 2324, and 2334 for use by peak detection step 2218 and interpolation step 2244.

FIG. 24a shows peak detection rules used by a preferred embodiment for step 2218. Evaluated point 2400, with neighborhood 2405 corresponding schematically to any hexagonal neighborhood, e.g., 2304, 2314, 2324, and 2334, is considered a local maximum if its score is greater than or equal to the scores of neighbors 2410, 2415, and 2420, and greater than the scores of neighbors 2425, 2430, and 2435.

FIG. 24b gives symbols to be used for interpolation on hexagonal scan patterns, as is used in step 2244. Evaluated score at local maximum z 2440, with neighborhood 2445 corresponding schematically to any hexagonal neighborhood, e.g., 2304, 2314, 2324, and 2334, has neighboring scores in a first grid direction $x_p$ 2450 and $x_n$ 2465, in a second grid direction $u_p$ 2455 and $u_n$ 2470, and a third grid direction $v_p$ 2460 and $v_n$ 2475. For each grid direction a three-point parabolic interpolation is computed as follows:

$$r_x = \mathrm{InterpPos}(x_n, z, x_p)$$

$$r_u = \mathrm{InterpPos}(u_n, z, u_p)$$

$$r_y = \mathrm{InterpPos}(v_n, z, v_p) \quad (14)$$

Construct lines 2480, 2482, and 2484 normal to grid directions x, u, and v respectively, and at a distance $r_x$, $r_u$, and $r_y$, respectively from local maximum 2440 in the direction of $x_p$ 2450, $u_p$ 2455, and $v_p$ 2460 respectively. The interpolated position 2490 is the point that minimizes the sum squared distance between lines 2480, 2482, and 2484 and point 2490. In the example, $r_x$ and $r_u$ are negative and $r_v$ is positive. The offset (Δx, Δy) of interpolated point 2490 from the local maximum point 2440 is given by:

$$\begin{pmatrix} \Delta x \\ \Delta y \end{pmatrix} = J \begin{pmatrix} r_x \\ r_u \\ r_v \end{pmatrix} \quad (15)$$

where 2×3 matrix J is:

| Pattern | J |
|---|---|
| ½ 2300 | $\frac{1}{2}\begin{pmatrix} 2 & 1 & -1 \\ 0 & 1 & 1 \end{pmatrix}$ |
| ¼ 2310 | $\frac{1}{35}\begin{pmatrix} 50 & 25 & -25 \\ 0 & 42 & 42 \end{pmatrix}$ |
| ⅙ 2320 | $\frac{1}{22}\begin{pmatrix} 39 & 24 & -15 \\ -3 & 32 & 35 \end{pmatrix}$ |
| ⅑ 2330 | $\frac{1}{96}\begin{pmatrix} 207 & 117 & -90 \\ -21 & 169 & 190 \end{pmatrix}$ |

The interpolated score is:

max(InterpScore ($x_n$, z, $x_p$), InterpScore ($u_n$, z, $u_p$), InterpScore ($v_n$, z, $v_p$)).

In a less preferred embodiment using a hexagonal scan pattern, interpolation is accomplished by fitting an elliptical paraboloid to scores 2440, 2450, 2455, 2460, 2465, 2470, 2475, and defining the position and height of the extremum of said elliptical paraboloid to be the interpolated position and score.

FIG. 25 is a top level flow chart of fine scan step 1940. Loop step 2500 does some number of iterations of refinement, where each iteration refines all of the results and the step size is halved each time. In a preferred embodiment, two iterations are done. Loop steps 2510 and 2520 halve the step size for each generalized-DOF on dofList 150. Loop steps 2530 and 2540 call procedure fineScanDOF 2600 for each result. Note that the second argument Ito fineScanDOF 2600 is the identity transform.

FIG. 26 is a flow chart of procedure fineScanDOF 2600, with inputs dofList 2602, map 2604, and result 2606. Function fineScanDOF 2600 is a recursive function—it operates on an outermost generalized-DOF which is the first element of input list 2602, and calls itself to operate on the inner generalized-DOFs represented by the rest of the list. At each level of the recursion a partial pose is constructed by composing a current mapper 1445 transform with the input map 2604 constructed by recursion levels representing outer generalized-DOFs, and passing said partial pose along to recursion levels representing inner generalized-DOFs. At the outermost level in step 2540 the identity transform is provided for input map 2604. At the innermost level, when step 2610 determines that input dofList 2602 is null, the non-translation portion of the pose is complete and control flows to fine scan x-y step 2700 to scan the translation degrees of freedom.

If input dofList 2602 is not null, step 2620 extracts the first element representing the current generalized-DOF, and the rest of the list representing inner generalized-DOFs. Step 2630 fetches the current value of the parameter corresponding to the current generalized-DOF from list DOFParameters 1740 in the result 2606 being refined. Step 2640 calls fineScanDOF 2600 recursively to scan the inner generalized-DOFs for poses corresponding to the current parameter setting of the current generalized-DOF. Step 2650 tests to determine if the current generalizedDOF is fixed, and if so step 2660 returns, otherwise control flows to hill climb step 2900.

FIG. 27 is a flow chart of the translation portion of the fine scan step 1940. Step 2710 makes a list of compiled probes based on the non-translation degrees of freedom specified by input map 2604. Step 2720 evaluates second match function $S_2$ at a set of offsets surrounding the current position 1700 of result, determined by fine scan pattern 2800. Step 2730 stores the highest match score found in step 2720 in element score 1720 of result. Step 2740 sets position 1700 of result to the position of the highest match score, interpolated between north-south (y) neighbors, and east-west (x) neighbors, using InterpPos (equation 13). Step 2750 returns from procedure fineScanDOF 2600.

FIG. 28 shows the fine scan pattern 2800 used in a preferred embodiment. 32 offsets are evaluated surrounding the current best position 1700.

FIG. 29 is a flow chart of hill climb step 2900, used for non-fixed generalized-DOFs. In step 2910 two temporary results rp (plus direction) and rn (minus direction) are allocated and initialized to input result 2606. Step 2920 evaluates poses at plus and minus one step size from the current parameter value. Step 2930 tests to see if the score improves in either the plus or minus direction. If not, control flows to interpolate step 2950. If so, step 2940 tests to see which direction is better, plus or minus. If the plus direction is better (has higher score), control flows to plus direction step 3000. If the minus direction is better, control flows to minus direction step 2990. Once plus direction step 3000 or minus direction step 2990 finishes, step 2950 interpolates the parameter value by adding stepSize * InterpPos(rn.score, result. score, rp.score) to the appropriate parameter value in list DOFParameters 1740 of result 1790.

FIG. 30 is a flow chart of plus direction step 3000. Step 3010 tests to see if stepping in the plus direction would exceed the high limit 1405 of the search range. If so, control flows to ending step 3060. If not, step 3020 steps the generalized-DOF parameter in the plus direction. Step 3030 shifts the temporary results over by one step, and step 3040 evaluates a new set of poses in the plus direction. Step 3050 tests to see if the score at the new parameter value is greater than the previous best score, and if so control flows back to step 3010 to continue scanning in the plus direction. If not, scanning terminates at step 3060, and control flows back to step 2950.

Minus direction step 2990 is identical in form to plus direction step 3000, with obvious modifications to scan in the other direction. Details are not shown.

In a preferred embodiment, granularity 1010 is chosen automatically during training step 300 based on an analysis of pattern 105. The portion of training image 100 corresponding to pattern 105 is processed to extract boundary points 270 at a set of granularities according to FIG. 2, and each resulting boundary point list 270 is processed according to FIGS. 4, 5, and 6, corresponding to steps 320, 330, 340, and 350, to produce, for each boundary point, a left and right neighbor, to produce chains, to discard weak chains, and to determine the total arc length of each chain.

In the following, for any given boundary point list 270 and associated chains at some granularity g, let:

Pr be the position vector of the $r^{th}$ boundary point.

$x_r$, $x_r$ be the components of $p_r$.

$d_r$ be the gradient direction of the $r^{th}$ boundary point.

$M_r$ be the gradient magnitude of the $r^{th}$ boundary point.

$u_r$ be the unit vector in the gradient direction $d_r$.

a be the area of pattern 105 in pixels.

$l_r$ be the arc length of the chain, which is the sum of the arc lengths of all the chain segments, containing the $r^{th}$ boundary point.

An estimate of a suitable granularity $g_{est}$ is made using the formula:

$$g_{est} = \sqrt{\frac{\sqrt{a}}{8}} \qquad (16)$$

A set of integer granularities in the range 1 to $g_{max}$, inclusive, is analyzed, where $$g_{max} = \text{floor}(\sqrt{2} \cdot g_{est}) \qquad (17)$$

For each granularity g in the above range, an overall rating $Q_g$ is computed. The formulas for the rating $Q_g$ have the following goals:

To prefer granularities closer to $g_{est}$.

To prefer that boundary points be spread out, covering more area.

To prefer longer chains.

To prefer smaller curvature along the chains.

To prefer stronger gradient magnitudes.

To prefer that boundary points not be near other parallel boundaries.

To normalize the rating so that ratings at different granularities can be compared.

Define a curvature rating function of neighboring boundary points r and j as follows:

$$C(r, j) = 1 - \min\left[\frac{\max(|d_r - d_j|_{360} - 16.875°, 0)}{11.25°}\right] \quad (18)$$

In this formula, the absolute difference of the two gradient directions is taken module 360°, so that the result is positive and in the range 0-180°. The curvature rating is 1 for direction differences less than 16.875°, 0 for direction differences above 28.125°, and proportionally between 0 and 1 for differences between 16.875° and 28.125°.

Define a parallel magnitude value $e_r$ whose purpose is to estimate the gradient magnitude of boundaries close to and parallel to the $r^{th}$ boundary point. Let $G_r$ be a set of boundary points found approximately along a line passing through boundary point r and in gradient direction $d_r$. Define $$e_r = \sum_{j \in G_r} M_j \cdot P(r, j) \cdot D(r, j) \quad (19)$$

so that $e_r$ is the sum over all boundary points j in $G_1$ of the product of gradient magnitude $M_j$, a parallel rating P(r,j) and a distance rating D(r,j), where $$P(r, j) = 1 - \min\left[\frac{\max(|d_r - d_j|_{180} - 11.25°, 0)}{11.25°}, 1\right] \quad (20)$$

$$D(r, j) = 1 - \min\left[\frac{\max(|u_r \cdot (p_r - p_j)| - 1.0, 0)}{4.0}, 1\right] \quad (21)$$

Parallel rating P(r,j) is similar to curvature rating C(r,j), except that the absolute difference of gradient direction is taken module 180°, and ranges from 0° to 90°.

Distance rating D(r,j) is based on the distance between boundary points r and j in gradient direction $d_r$. This is the effect of the dot product shown. Distances smaller than 1 pixel get a rating of 1.0, greater than 5 pixels get a rating of 0, and proportionally in between.

Define a weight $W_r$ for the $r^{th}$ boundary point.

$$W_r = l_r^{0.25} \cdot C(r,\text{left}) \cdot C(r,\text{right}) \cdot \max(m_r - e_r, 0)$$

where "left" and "right" identify the left and right neighbors of the $r^{th}$ boundary point along the chain, respectively. The weight $W_r$ is the gradient magnitude $m_r$, but discounted for near by parallel magnitudes $e_r$, further discounted for excessive left or right curvature ratings, and enhanced based on chain length according to a power law. In a preferred embodiment the power is 0.25.

Now define the overall rating $$Q_g = g^{1.625} e^{-\left|\log\left(\frac{g}{g_{est}}\right)\right|} I \quad (22)$$

where I is boundary point moment of inertia:

$$I = \sqrt{\sum_r w_r x_r^2 + \sum_r w_r y_r^2 - \frac{\left(\sum_r w_r x_r\right)^2 + \left(\sum_r w_r y_r\right)^2}{\sum_r w_r}} \quad (23)$$

The moment of inertia factor takes into account the spread of the boundary points and their weights, which in turn take into account chain length, curvature, gradient magnitude, and parallel boundaries. The factor $$e^{-\left|\log\left(\frac{g}{g_{est}}\right)\right|} \quad (24)$$

discounts (or attenuates) the moment of inertia based on the ratio of g to the estimated granularity $g_{est}$. The factor $$g^{1.625} \quad (25)$$

compensates for the fact that all distances scale by g so that number of boundary points scales by $g^2$, moment of inertia by $g^2$, and arc length $l^{0.25}$ scales by $g^{0.25}$, for total scale by $g^{3.25}$. The square root in the formula for 1 makes the scale factor $g^{1.625}$.

FIG. 31 is a flow chart showing how model granularity 1010 is selected based on ratings $Q_g$. In step 3100 a granularity $g_{best}$ and rating $Q_{best}$ are initialized. Loop step 3105 scans all integer values of granularity n in the range 1 to $g_{max}$, inclusive. For each loop interaction, variables q and g are initialized in step 3110. The loop looks for maxima of Q, interpolates both rating and granularity at the maxima, and then chooses the interpolated granularity at the maximum with the highest interpolated rating.

Steps 3115, 3120, and 3125 handle the case where n is 1, the smallest granularity considered. Step 3120 tests to see if n=1 is a maximum, and if so step 3125 is the "interpolation" for this case.

Steps 3130, 3135, and 3140 handle the case where n is the largest granularity considered. Step 3135 tests for a maximum, and step 3140 is the "interpolation".

Steps 3143 and 3145 handle the case where n is neither the smallest nor largest granularity considered, and so a 3-point interpolation can be done. Step 3143 tests for a maximum. The formulas shown for step 3145 implement a 3-point parabolic interpolation similar to InterpPos and InterpScore, except that the domain of the parabola is log granularity instead of the usual linear scale.

Steps 3150 and 3155 replace $Q_{best}$ and $g_{best}$ with q and g if a better rating q has been found, and step 3160 continues the loop at step 3105.

When the loop is finished, step 3170 sets model granularity 1010 to the interpolated granularity $g_{best}$ at the maximum with highest rating $Q_{best}$.

Other modifications and implementations will occur to those skilled in the art without departing from the spirit and the scope of the invention as claimed. Accordingly, the above description is not intended to limit the invention except as indicated in the following claims.

What is claimed is:

1. A method of training a model pattern for use in probe-based pattern matching, the method comprising:
providing a processor that performs the steps of:
obtaining a description of an object as at least one boundary;

selecting a subset of boundary segments along the at least one boundary for probe placement based on curvature along the subject of boundary segments; and placing probes along the selected boundary segments.

2. The method of claim 1, wherein each probe indicates boundary direction at a point along the at least one boundary.

3. The method of claim 1, wherein obtaining a description of an object as at least one boundary includes:

forming a chain of boundary points.

4. The method of claim 1, wherein a corner of a boundary is a boundary zone having positions that are not selected for probe placement.

5. The method of claim 1, wherein placing probes along the reliable selected boundary segments includes:

placing a number of probes with predetermined spacing along the reliable selected boundary segment.

6. The method of claim 1, wherein placing probes along the selected boundary segments includes:

placing a predetermined number of probes with equal spacing along the selected boundary segments.

7. The method of claim 6, wherein the predetermined number of probes is 64.

8. The method of claim 6, wherein a minimum spacing between probes is enforced.

9. The method of claim 6, wherein a maximum spacing between probes is enforced.

10. The method of claim 6, wherein both a minimum spacing and a maximum spacing is enforced.

11. The method of claim 1, wherein obtaining a description of an object as at least one boundary includes:

choosing an appropriate granularity.

12. The method of claim 1, wherein obtaining a description of an object as at least one boundary includes:

processing a training image to obtain boundary points.

13. The method of claim 1, wherein obtaining a description of an object as at least one boundary includes:

processing a CAD description to obtain boundary points.

14. The method of claim 3, wherein forming a chain of boundary points includes:

connecting neighboring boundary points that have consistent directions; and organizing connected boundary points into chains of boundary points.

15. The method of claim 14, further including:

removing short chains of boundary points.

16. The method of claim 14, further including:

removing weak chains of boundary points.

17. The method of claim 1, wherein selecting reliable boundary segments along the at least one boundary includes:

dividing chains of boundary points into segments of low curvature separated by corners of high curvature.

18. The method of claim 12, wherein processing a training image to obtain boundary points includes:

detecting boundary points in the training image.

19. The method of claim 14, wherein organizing connected boundary points into chains of boundary points includes:

for each chain, storing starting and ending points, length, total gradient magnitude, and whether the chain is open or closed.

20. The method of claim 16, wherein removing weak chains of boundary points includes:

removing chains of boundary points having a total gradient magnitude that is below a parameter.

21. The method of claim 16, wherein removing weak chains of boundary points includes:

removing chains of boundary points having an average gradient magnitude that is below a parameter.

22. The method of claim 1, wherein using curvature along a boundary includes:

determining whether a direction of a boundary point differs from that of either neighbor by more than 22.5 degrees.

23. The method of claim 1, wherein placing probes along the selected boundary segments includes:

placing a target number of probes with equal spacing along the selected boundary segments, such that probe spacing is not allowed to fall beyond predetermined limits.

24. The method of claim 23, wherein the target number of probes is 64.

25. The method of claim 23, wherein the predetermined limits include:

probe spacing cannot fall below 0.5 pixels; and probe spacing cannot be greater than 4.0 pixels.

26. A method of training a model pattern for use in probe-based pattern matching, the method comprising:

providing a processor that performs the steps of:

detecting boundary points in a training image of an object;

forming a chain of boundary points so as to provide at least one boundary;

selecting only boundary segments of low curvature along the at least one boundary for probe placement; and placing a target number of probes along the selected boundary segments.

27. The method of claim 26, wherein each probe indicates boundary direction at a point along the at least one boundary.

28. The method of claim 26, wherein the target number of probes is 64.

29. The method of claim 26, wherein both a minimum and a maximum spacing between probes is enforced.

30. The method of claim 26, wherein detecting boundary points includes:

choosing an appropriate granularity.

31. The method of claim 26, wherein detecting boundary points in a training image of an object is replaced by:

processing a CAD description of an object to obtain boundary points.

32. The method of claim 26, wherein forming a chain of boundary points includes:

connecting neighboring boundary points that have consistent directions; and organizing connected boundary points into chains of boundary points.

33. The method of claim 32, further including:

removing weak chains of boundary points.

34. The method of claim 33, wherein removing weak chains of boundary points includes:

removing chains of boundary points having an average gradient magnitude that is below a parameter.

35. The method of claim 1 wherein the step of selecting boundary segments includes selecting less than all boundary segments.

36. The method of claim 1 wherein the step of selecting boundary segments includes selecting boundary segments of low curvature and rejecting boundary segments of high curvature.

37. A method of training a model pattern for use in probe-based pattern matching, the method comprising:

providing a processor that performs the steps of:

obtaining a description of an object as at least one boundary wherein the boundary includes a plurality of boundary portions;

selecting a subset of the plurality of boundary portions as selected boundary segments where the subset includes less than all of the plurality of boundary portions; and placing probes along the selected boundary segments.

38. A computer program product, tangibly embodied in a non-transitory computer readable medium, the computer program product comprising instructions being operable to cause a data processing apparatus to:
- obtain a description of an object as at least one boundary;
- select a subset of boundary segments along the at least one boundary for probe placement based on curvature along the subject of boundary segments; and
- place probes along the selected boundary segments.

39. The product of claim 38, wherein a corner of a boundary is a boundary zone having positions that are not selected for probe placement.

40. The product of claim 38, further comprising:
removing short chains of boundary points.

41. The product of claim 38, further comprising:
removing weak chains of boundary points.

42. The product of claim 38, wherein selecting reliable boundary segments along the at least one boundary includes:
dividing chains of boundary points into segments of low curvature separated by corners of high curvature.

* * * * *